US010171759B2

(12) United States Patent
Sekiguchi et al.

(10) Patent No.: US 10,171,759 B2
(45) Date of Patent: Jan. 1, 2019

(54) IMAGING DEVICE, METHOD FOR CONTROLLING IMAGING DEVICE, IMAGING SYSTEM, AND METHOD FOR CONTROLLING IMAGING SYSTEM

(71) Applicant: JVC KENWOOD CORPORATION, Yokohama-shi, Kanagawa (JP)

(72) Inventors: Satoru Sekiguchi, Yokohama (JP); Takayoshi Sasao, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 351 days.

(21) Appl. No.: 15/212,814

(22) Filed: Jul. 18, 2016

(65) Prior Publication Data

US 2016/0330385 A1  Nov. 10, 2016

Related U.S. Application Data

(63) Continuation of application No. PCT/JP2015/050724, filed on Jan. 14, 2015.

(30) Foreign Application Priority Data

| Feb. 6, 2014 | (JP) | ................................. 2014-021002 |
| Feb. 6, 2014 | (JP) | ................................. 2014-021004 |
| Mar. 26, 2014 | (JP) | ................................. 2014-063134 |

(51) Int. Cl.
| *H04N 5/33* | (2006.01) |
| *H04N 5/235* | (2006.01) |
| *H04N 9/31* | (2006.01) |
| *H04N 5/225* | (2006.01) |
| *H04N 5/232* | (2006.01) |

(Continued)

(52) U.S. Cl.
CPC ............. *H04N 5/332* (2013.01); *G03B 15/02* (2013.01); *H04N 5/04* (2013.01); *H04N 5/2256* (2013.01);

(Continued)

(58) Field of Classification Search
CPC ..... H04N 5/332; H04N 5/2354; H04N 5/2256
See application file for complete search history.

(56) References Cited

U.S. PATENT DOCUMENTS 4,477,814 A * 10/1984 Brumbaugh ........... H01Q 21/20
342/53
4,961,110 A * 10/1990 Nakamura ............... A61B 1/05
348/629

(Continued)

FOREIGN PATENT DOCUMENTS

| JP | H8-130748 A | 5/1996 |
| JP | 2011-50049 A | 3/2011 |
| JP | 2013243589 A | 12/2013 |

OTHER PUBLICATIONS

International Bureau of WIPO, Translation of the Written Opinion of the International Searching Authority for PCT/JP2015/050724 (dated Apr. 21, 2015) (Year: 2015).*

(Continued)

*Primary Examiner* — David N Werner
(74) *Attorney, Agent, or Firm* — Nath, Goldberg & Meyer; Jerald L. Meyer

(57) ABSTRACT

A first projection controller of an imaging device controls a first infrared projector, capable of projecting infrared light with multiple wavelengths, to selectively project the infrared light with the multiple wavelengths. An imaging unit of the imaging device images an object in a state where the first infrared projector projects the infrared light. A synchronous signal transmitter transmits outward a synchronous signal for synchronizing a timing of projecting infrared light from a second infrared projector controlled by a second projection controller included in another imaging device other than the imaging device, with a timing of projecting the infrared light from the first infrared projector controlled by the first projection controller.

12 Claims, 42 Drawing Sheets

(51) Int. Cl.
  *H04N 5/04* (2006.01)
  *H04N 5/247* (2006.01)
  *H04N 9/04* (2006.01)
  *G03B 15/02* (2006.01)
  *H04N 7/18* (2006.01)

(52) U.S. Cl.
  CPC ....... *H04N 5/2351* (2013.01); *H04N 5/23245* (2013.01); *H04N 5/247* (2013.01); *H04N 9/045* (2013.01); *H04N 9/3147* (2013.01); *H04N 9/3179* (2013.01); *H04N 9/3194* (2013.01); *H04N 7/18* (2013.01)

(56) References Cited

U.S. PATENT DOCUMENTS

| | | | | |
|---|---|---|---|---|
| 5,685,637 | A * | 11/1997 | Chapman | B64D 47/04 362/228 |
| 7,474,399 | B2 * | 1/2009 | Nilson | G01N 21/6456 356/317 |
| 2012/0212619 | A1 * | 8/2012 | Nagamune | H04N 5/2256 348/164 |
| 2013/0002882 | A1 * | 1/2013 | Onozawa | H04N 5/2353 348/164 |

OTHER PUBLICATIONS

SIPO, Notification to Grant Patent Right for Invention, Application 201580005174.X (Year: 2017).*
PCT/ISA/237 dated Apr. 21, 2015 in corresponding International Application No. PCT/JP2015/050724.

* cited by examiner

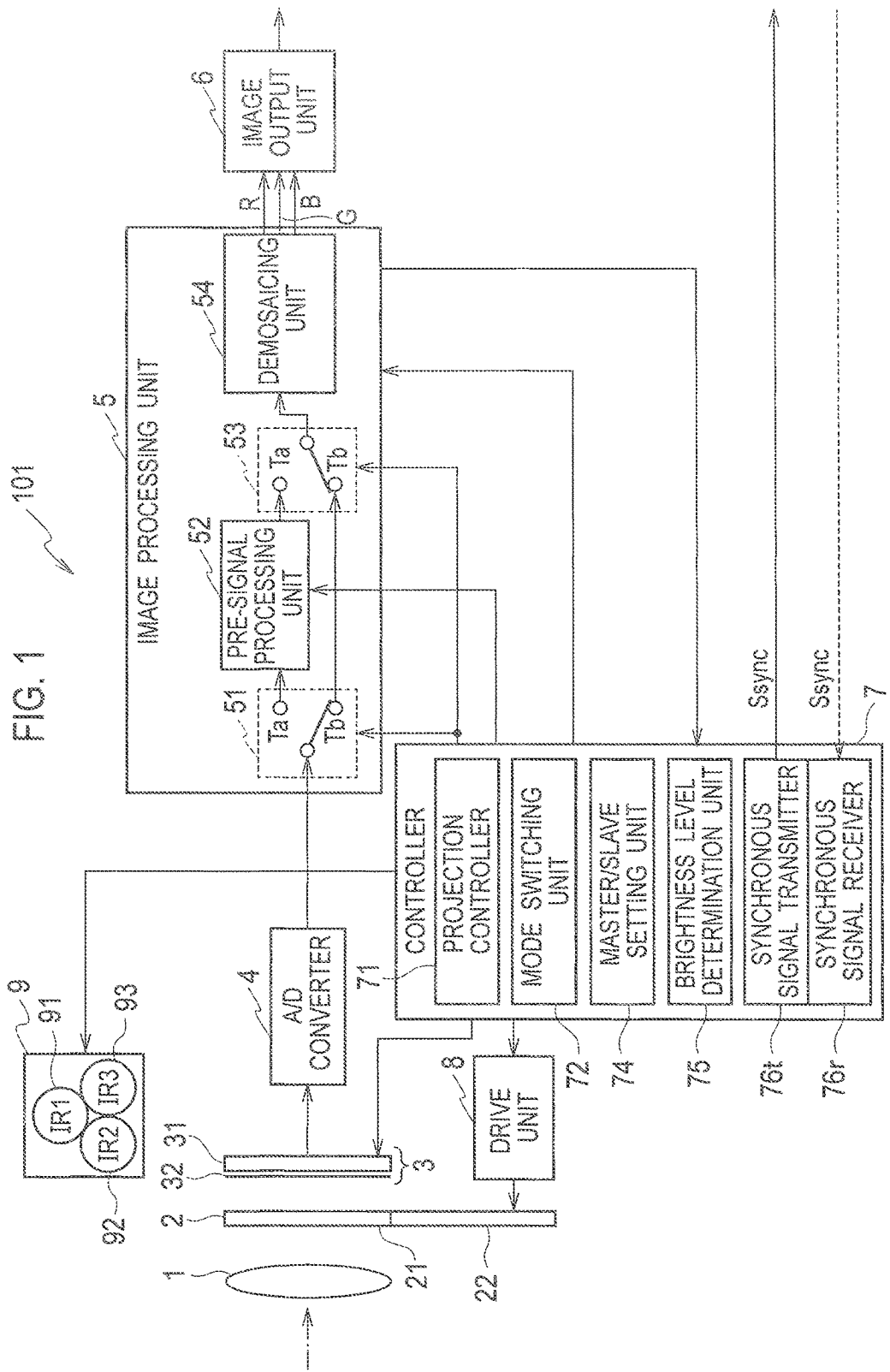

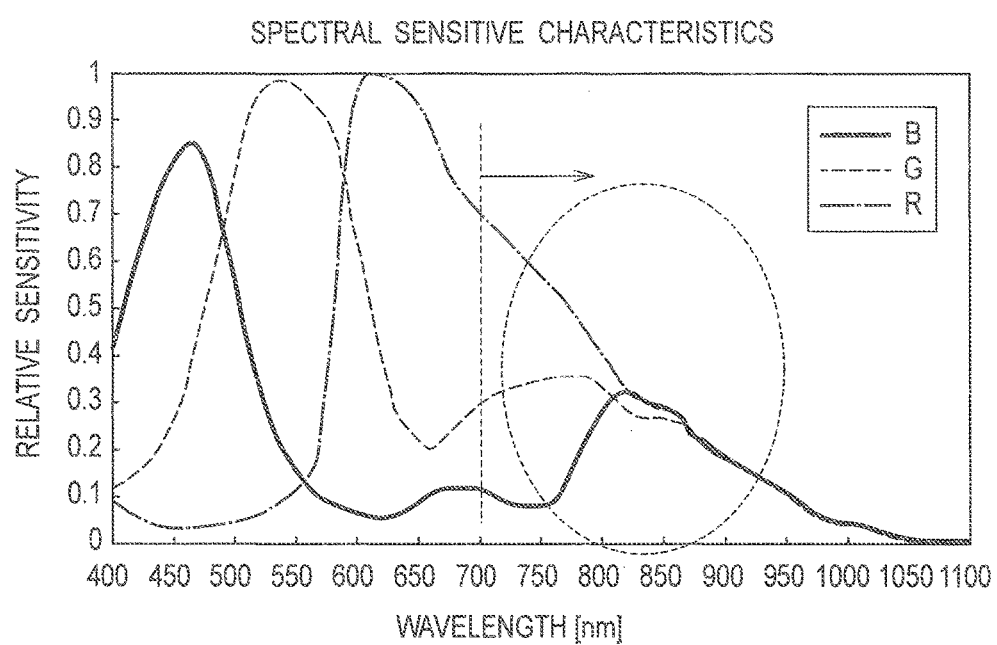

FIG. 13 (a)
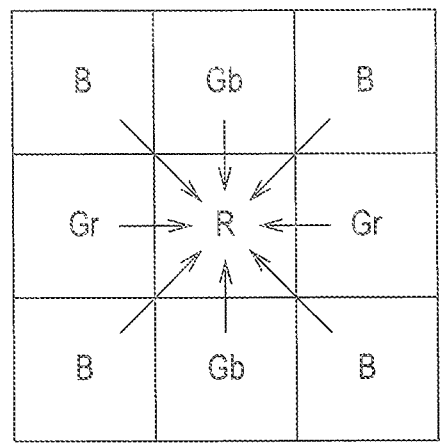
(b)
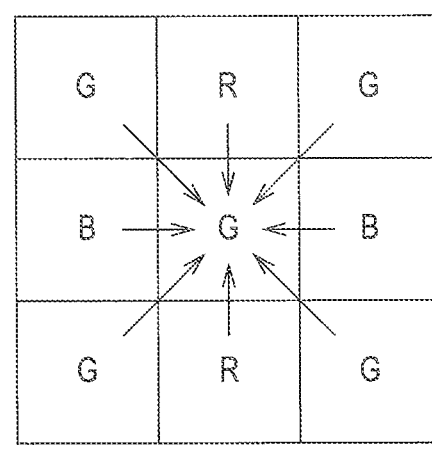
(c)
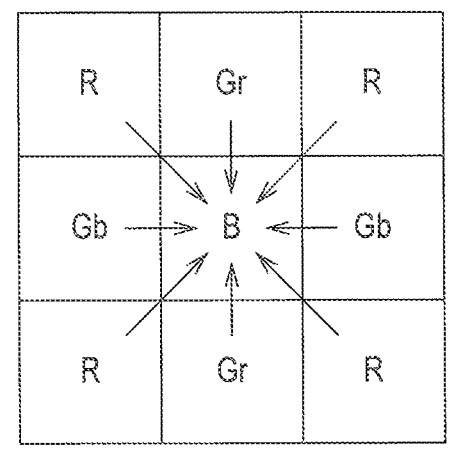

FIG. 14

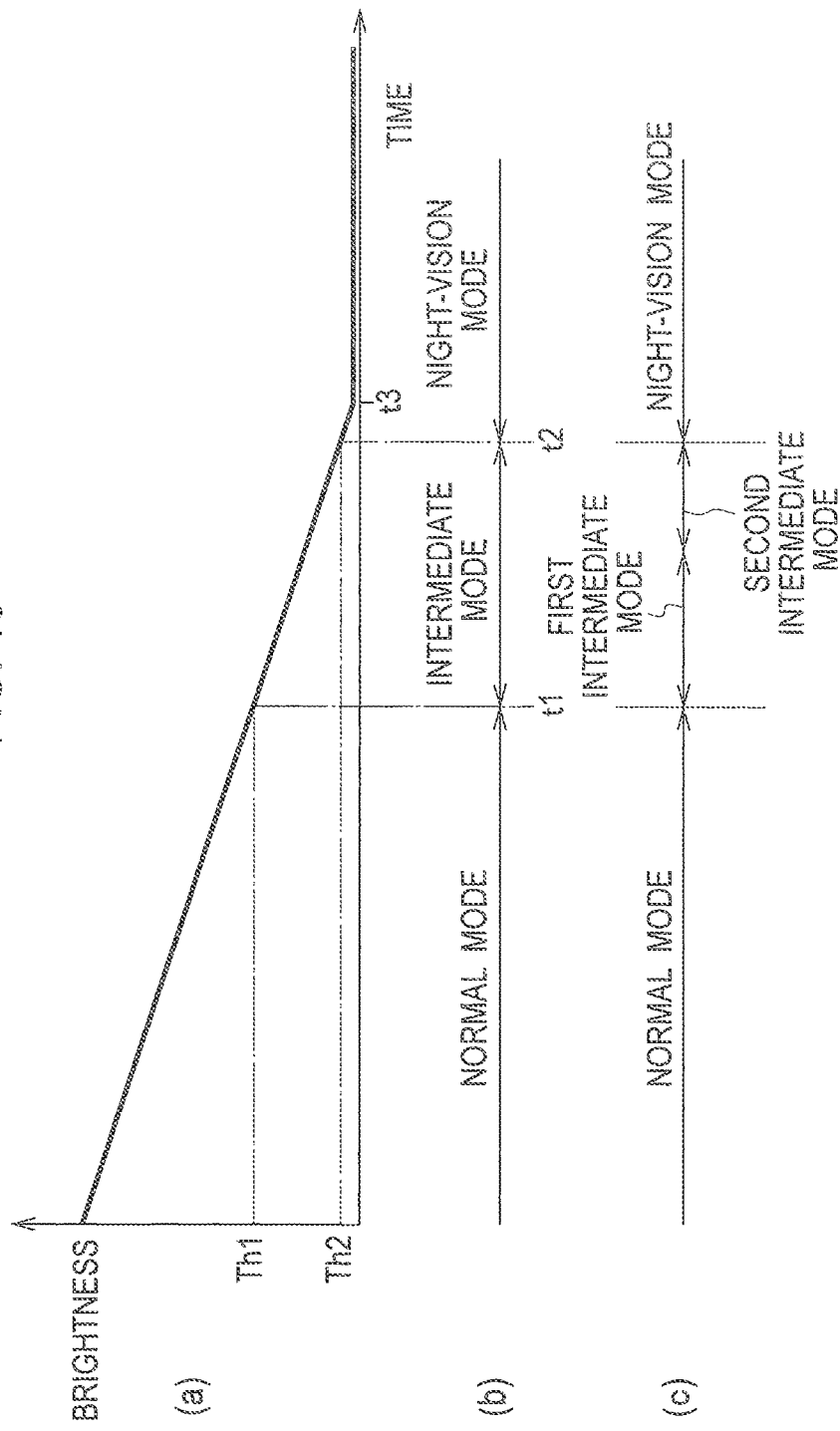

FIG. 20

| | INFRARED PROJECTOR 9 | PRE-SIGNAL PROCESSING UNIT 52 | | | DEMOSAICING UNIT 54 |
|---|---|---|---|---|---|
| | | SURROUNDING PIXEL ADDING UNIT 521 | SAME-POSITION PIXEL ADDING UNIT 522 | SYNTHESIZING UNIT 523 | |
| NORMAL MODE | OFF | INACTIVATED | INACTIVATED | INACTIVATED | ACTIVATED |
| FIRST INTERMEDIATE MODE | ON | INACTIVATED | ACTIVATED | ACTIVATED | |
| SECOND INTERMEDIATE MODE | ON | INACTIVATED | INACTIVATED | ACTIVATED | |
| FIRST NIGHT-VISION MODE | ON | ACTIVATED | ACTIVATED | ACTIVATED | |
| SECOND NIGHT-VISION MODE | ON | ACTIVATED | INACTIVATED | ACTIVATED | |

FIG. 34

| | | | | | | | |
|---|---|---|---|---|---|---|---|
| | | | IR1 | | | | |

(a) PROJECTION FROM INFRARED PROJECTOR 9 OF MASTER IMAGING DEVICE 101M

| FIR3(DARK) | FIR1(BRIGHT) | FIR2(DARK) | FIR3(DARK) |
|---|---|---|---|

(b) FRAMES GENERATED BY SLAVE IMAGING DEVICE 101S WHEN IMAGING (PHASE CORRESPONDENCE)

| FIR2 (DARK) | FIR3(SLIGHTLY DARK) | FIR1(SLIGHTLY BRIGHT) | FIR2(DARK) | FIR3(SLIGHTLY DARK) |
|---|---|---|---|---|

(c) FRAMES GENERATED BY SLAVE IMAGING DEVICE 101S WHEN IMAGING (SLIGHT PHASE DELAY)

| FIR3(DARK) | FIR1(SLIGHTLY BRIGHT) | FIR2(SLIGHTLY DARK) | FIR3(DARK) | FIR1(BRIGHT) |
|---|---|---|---|---|

(d) FRAMES GENERATED BY SLAVE IMAGING DEVICE 101S WHEN IMAGING (SLIGHT PHASE ADVANCE)

FIG. 36

(a) PROJECTION FROM INFRARED PROJECTOR 9 OF SLAVE IMAGING DEVICE 101S

| IR1 | | |
|---|---|---|

(b) FRAMES GENERATED BY MASTER IMAGING DEVICE 101M WHEN IMAGING (PHASE CORRESPONDENCE)

| FIR3(DARK) | FIR1(BRIGHT) | FIR2(DARK) | FIR3(DARK) |
|---|---|---|---|

(c) FRAMES GENERATED BY MASTER IMAGING DEVICE 101M WHEN IMAGING (SLIGHT PHASE DELAY)

| FIR2 (DARK) | FIR3(SLIGHTLY DARK) | FIR1(SLIGHTLY BRIGHT) | FIR2(DARK) | FIR3(SLIGHTLY DARK) |
|---|---|---|---|---|

(d) FRAMES GENERATED BY MASTER IMAGING DEVICE 101M WHEN IMAGING (SLIGHT PHASE ADVANCE)

| FIR3 (DARK) | FIR1(SLIGHTLY BRIGHT) | FIR2(SLIGHTLY DARK) | FIR3(DARK) | FIR1 (BRIGHT) |
|---|---|---|---|---|

FIG. 43

(a) PROJECTION FROM INFRARED PROJECTOR 9 OF MASTER IMAGING DEVICE 104M

| | IR1 | |
|---|---|---|

(b) FRAMES GENERATED BY SLAVE IMAGING DEVICE 104S WHEN IMAGING (PHASE CORRESPONDENCE)

| FIR3(DARK) | FIR1(BRIGHT) | FIR2(DARK) | FIR3(DARK) |
|---|---|---|---|

(c) FRAMES GENERATED BY SLAVE IMAGING DEVICE 104S WHEN IMAGING (SLIGHT PHASE DELAY)

| FIR2(DARK) | FIR3(SLIGHTLY DARK) | FIR1(SLIGHTLY BRIGHT) | FIR2(DARK) | FIR3(SLIGHTLY DARK) |
|---|---|---|---|---|

(d) FRAMES GENERATED BY SLAVE IMAGING DEVICE 104S WHEN IMAGING (GREAT PHASE ADVANCE)

| FIR1(DARK) | FIR2(SLIGHTLY BRIGHT) | FIR3(SLIGHTLY DARK) | FIR1(DARK) |
|---|---|---|---|

IMAGING DEVICE, METHOD FOR CONTROLLING IMAGING DEVICE, IMAGING SYSTEM, AND METHOD FOR CONTROLLING IMAGING SYSTEM

CROSS REFERENCE TO RELATED APPLICATION

This application is a Continuation of PCT Application No. PCT/JP2015/050724, filed on Jan. 14, 2015, and claims the priority of Japanese Patent Applications No. 2014-021002 filed on Feb. 6, 2014, No. 2014-021004 filed on Feb. 6, 2014, and No. 2014-063134 filed on Mar. 26, 2014, the entire contents of all of which are incorporated herein by reference.

BACKGROUND

The present disclosure relates to an imaging device, a method for controlling an imaging device, an imaging system, and a method for controlling an imaging system.

There is known a method for imaging an object under the condition that almost no visible light is available, such as during nighttime, by radiating infrared light onto the object from an infrared projector and imaging infrared light reflected by the object. This imaging method is effective in a case where lighting fixtures for radiating visible light cannot be used.

However, since an image obtained by imaging the object by this method is a monochromatic image, it is difficult to identify the object from the monochromatic image depending on circumstances. If a color image can be captured even under the condition that no visible light is available, the performance of identifying the object can be improved. For example, it is expected that surveillance cameras can capture color images under the condition that no visible light is available in order to improve performance for identifying objects.

Japanese Unexamined Patent Application Publication No. 2011-050049 (Patent Document 1) describes an imaging device capable of capturing color images under the condition that no visible light is available. The imaging device described in Patent Document 1 uses an infrared projector. Incorporating the technique described in Patent Document 1 into a surveillance camera can capture a color image of an object so as to improve the identification of the object.

SUMMARY

The imaging device disclosed in Patent Document 1 sequentially projects three kinds of infrared light having different wavelengths from an infrared projector so as to image an object.

A surveillance system (an imaging system) images an object to be monitored by use of a plurality of surveillance cameras. It may be possible to use the imaging device disclosed in Patent Document 1 for each of the surveillance cameras to constitute the surveillance system.

When the plural imaging devices individually project infrared light, however, different kinds of infrared light having different wavelengths are mixed together, which prevent the imaging devices from capturing color images, while exhibiting preferable color reproduction performance.

A first aspect of the embodiments provides an imaging device including: a first projection controller configured to control a first infrared projector, capable of projecting infrared light with multiple wavelengths, to selectively project the infrared light with the multiple wavelengths; an imaging unit configured to image an object in a state where the first infrared projector projects the infrared light; and a synchronous signal transmitter configured to transmit outward a synchronous signal for synchronizing a timing of projecting infrared light from a second infrared projector controlled by a second projection controller included in another imaging device other than the imaging device, with a timing of projecting the infrared light from the first infrared projector controlled by the first projection controller.

A second aspect of the embodiments provides an imaging device including: a first projection controller configured to control a first infrared projector, capable of projecting infrared light with multiple wavelengths, to selectively project the infrared light with the multiple wavelengths; an imaging unit configured to image an object in a state where the first infrared projector projects the infrared light; and a synchronous signal receiver configured to receive a synchronous signal for synchronizing a timing of projecting the infrared light from the first infrared projector controlled by the first projection controller with a timing of projecting infrared light from a second infrared projector controlled by a second projection controller included in another imaging device other than the imaging device, wherein the first projection controller controls the first infrared projector in accordance with the synchronous signal received by the synchronous signal receiver.

A third aspect of the embodiments provides a method for controlling a plurality of imaging devices included in an imaging system, the method including the steps of: synchronizing timings of selectively projecting infrared light from each infrared projector of the respective imaging devices; and imaging an object in a state where the imaging devices each selectively project the infrared light.

BRIEF DESCRIPTION OF THE DRAWINGS

FIG. 1 is a block diagram showing an overall configuration of an imaging device according to at least one embodiment.

FIG. 2 is a view showing an example of an array of filter elements in a color filter used in the imaging device according to the embodiment.

FIG. 3 is a characteristic diagram showing spectral sensitive characteristics of wavelengths and relative sensitivities of light of three primary colors in an imaging unit included in the imaging device according to the embodiment.

FIG. 13 is a view for describing the processing of adding surrounding pixels when the imaging device according to the embodiment is operating in the night-vision mode.

FIG. 14 is a view showing frames on which the processing of adding surrounding pixels is performed.

FIG. 19 is a view for describing an example of mode switching in the imaging device according to each embodiment.

FIG. 20 is a view showing conditions of the respective members when the imaging device according to each embodiment is set to the respective modes.

FIG. 34 is a view for describing a first example of the operations of the master and slave devices when the imaging devices according to the first to third embodiments are set to a timing adjusting mode.

FIG. 36 is a view for describing a second example of the operations of the master and slave devices when the imaging devices according to the first to third embodiments are set to the timing adjusting mode.

FIG. 43 is a view for describing the operations of the master and slave devices when the imaging devices according to the fourth to sixth embodiments are set to the timing adjusting mode.

DETAILED DESCRIPTION

Figure 4:
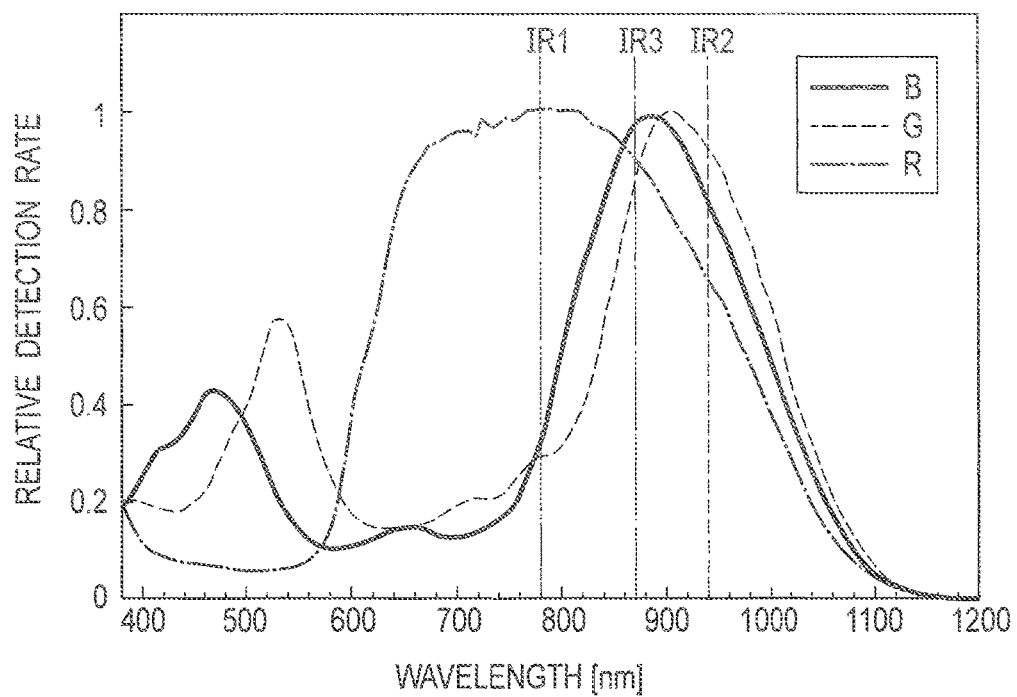
FIG. 4 is a characteristic diagram showing a relationship between wavelengths and relative detection rates when multiplying, by a light receiving sensitivity of silicon, a reflectance of light of each primary color obtained from a particular substance.

Hereinafter, imaging devices according to embodiments, a method for controlling the imaging devices, an imaging system, and a method for controlling the imaging system will be described with reference to appended drawings.

<Configuration of Imaging Device According to First Embodiment>

First, the entire configuration of an imaging device according to the embodiment is described below with reference to FIG. 1. The imaging device according to the embodiment shown in FIG. 1 is capable of capturing images in three modes including a normal mode suitable for imaging in a state where sufficient visible light is present such as during the day, a night-vision mode suitable for imaging in a state where almost no visible light is present such as at night, and an intermediate mode suitable for imaging in a state where visible light is slightly present.

The night-vision mode and the intermediate mode are both infrared projecting modes for capturing images while projecting infrared light, under the condition that the amount of visible light is small. The infrared projecting mode may only include the night-vision mode. The embodiment will be exemplified by an imaging device as the preferable example, capable of imaging in three modes, including the intermediate mode.

As shown in FIG. 1, a light indicated by the dash-dotted line reflected by an object is collected by an optical lens 1. Visible light enters the optical lens 1 under the condition that visible light is present sufficiently, and infrared light emitted from an infrared projector 9 described below and reflected by the object enters the optical lens 1 under the condition that almost no visible light is present.

In the state where visible light is slightly present, mixed light including both the visible light and the infrared light emitted from the infrared projector 9 and reflected by the object, enters the optical lens 1.

Although FIG. 1 shows only one optical lens 1 for reasons of simplification, the imaging device actually includes a plurality of optical lenses.

An optical filter 2 is interposed between the optical lens 1 and an imaging unit 3. The optical filter 2 includes two members; an infrared cut filter 21 and a dummy glass 22. The optical filter 2 is driven by a drive unit 8 in a manner such that the infrared cut filter 21 is inserted between the optical lens 1 and the imaging unit 3 or such that the dummy glass 22 is inserted between the optical lens 1 and the imaging unit 3.

The imaging unit 3 includes an imaging element 31 in which a plurality of light receiving elements (pixels) are arranged in both the horizontal direction and the vertical direction, and a color filter 32 in which filter elements of red (R), green (G) or blue (B) corresponding to the respective light receiving elements are arranged. The imaging element 31 may be either a charge coupled device (CCD) or a complementary metal oxide semiconductor (CMOS).

In the color filter 32, for example, the filter elements of each of R, G, and B are arranged in a pattern called a Bayer array, as shown in FIG. 2. The Bayer array is an example of predetermined arrays of the filter elements of R, G and B. In FIG. 2, each of the filter elements of G in each line held between the filter elements of R is indicated by Gr, and each of the filter elements of G held between the filter elements of B is indicated by Gb.

The Bayer array has a configuration in which the horizontal lines alternating the filter elements of R with the filter elements of Gr and the horizontal lines alternating the filter elements of B with the filter elements of Gb are aligned alternately with each other in the vertical direction.

FIG. 3 shows spectral sensitive characteristics of wavelengths and relative sensitivities of R light, G light, and B light in the imaging unit 3. The maximum value of the relative sensitivities is normalized to 1. When the imaging device is operated in the normal mode, infrared light having a wavelength of 700 nm or greater is required to be blocked in order to capture fine color images with visible light.

The drive unit 8 is thus controlled by a controller 7 to drive the optical filter 2 in such a manner as to insert the infrared cut filter 21 between the optical lens 1 and the imaging unit 3.

As is apparent from FIG. 3, the imaging unit 3 shows the sensitivities in the area where the infrared light having the wavelength of 700 nm or greater is present. Therefore, when the imaging device is operated in the intermediate mode or in the night-vision mode, the drive unit 8 is controlled by the controller 7 to drive the optical filter 2 in such a manner as to remove the infrared cut filter 21 from between the optical lens 1 and the imaging unit 3 and insert the dummy glass 22 therebetween.

When the dummy glass 22 is inserted between the optical lens 1 and the imaging unit 3, the infrared light having the wavelength of 700 nm or greater is not blocked. Thus, the imaging device can obtain information of each of R, G, and B by using the sensitivities in the oval region surrounded by the broken line in FIG. 3. The reason the dummy glass 22 is inserted is to conform the optical path length obtained when the dummy glass 22 is used to the optical path length obtained when the infrared cut filter 21 is used.

The infrared projector 9 includes projecting portions 91, 92, and 93 for projecting infrared light with wavelengths IR1, IR2, and IR3, respectively. In the case of the intermediate mode or the night-vision mode, a projection controller 71 in the controller 7 controls the projecting portions 91, 92, and 93 so as to selectively project the infrared light with the respective wavelengths IR1, IR2, and IR3 in a time division manner.

A silicon wafer is used in the imaging element 31. FIG. 4 shows a relationship between wavelengths and relative detection rates when a reflectance at each wavelength is multiplied by a light receiving sensitivity of silicon in a case where a material consisting of each of the colors R, G, and B is irradiated with white light. The maximum value of the relative detection rates in FIG. 4 is also normalized to 1.

For example, as shown in FIG. 4, in the infrared light area, the reflected light with the wavelength of 780 nm has a strong correlation with the reflected light of the material with color R, the reflected light with the wavelength of 870 nm has a strong correlation with the reflected light of the material with color B, and the reflected light with the wavelength of 940 nm has a strong correlation with the reflected light of the material with color G.

Thus, according to the present embodiment, the wavelengths IR1, IR2, and IR3 of infrared light projected from the projecting portions 91, 92, and 93 are set to 780 nm, 940 nm, and 870 nm, respectively. These values are examples for the wavelengths IR1, IR2, and IR3, and other wavelengths other than 780 nm, 940 nm, and 870 nm may also be employed.

The projecting portion 91 radiates the infrared light with the wavelength IR1 on an object, and an image signal obtained, in a manner such that light reflected by the object is captured, is assigned to an R signal. The projecting portion 93 radiates the infrared light with the wavelength IR2 on the object, and an image signal obtained, in a manner such that light reflected by the object is captured, is assigned to a G signal. The projecting portion 92 radiates the infrared light with the wavelength IR3 on the object, and an image signal obtained, in a manner such that light reflected by the object is captured, is assigned to a B signal.

Accordingly, in the intermediate mode or in the night-vision mode, a color similar to that obtained when the object is imaged in the normal mode in the state where visible light is present, can also be reproduced theoretically.

Alternatively, the wavelength IR1 of 780 nm may be assigned to the R light, the wavelength IR3 of 870 nm may be assigned to the G light, and the wavelength IR2 of 940 nm may be assigned to the B light, although in this case the color image would possess a color tone different from the actual color tone of the object. The wavelengths IR1, IR2, and IR3 may be assigned optionally to the R light, the G light, and the B light.

According to the present embodiment, the wavelengths IR1, IR2, and IR3 are assigned to the R light, the G light, and the B light, respectively, by which the color tone of the object can be reproduced most finely.

The controller 7 controls an imaging operation of the imaging unit 3, and the respective components in an image processing unit 5. Image signals of images captured by the imaging unit 3 are subjected to A/D conversion by an A/D converter 4, and are then input into the image processing unit 5. The imaging unit 3 and the A/D converter 4 may be integrated together. The image processing unit 5 and the controller 7 may also be integrated together.

The controller 7 includes a mode switching unit 72 that switches between the normal mode, the intermediate mode, and the night-vision mode. The mode switching unit 72 switches the operations in the image processing unit 5 as appropriate to correspond to the normal mode, the intermediate mode, and the night-vision mode, as described below. The mode switching unit 72 can also select a timing adjusting mode for adjusting the timing of projecting the infrared light with the wavelengths of IR1, IR2, and IR3 from the infrared projector 9.

The controller 7 includes a master/slave setting unit 74 for determining which imaging device 101 serves as a master device or a slave device, when the imaging system according to the embodiment includes a first imaging device 101 and a second imaging device 101.

The master/slave setting unit 74 may choose the master device or the slave device with a mechanical switch and store the setting conditions of the master device or the slave device as chosen. Alternatively, the master/slave setting unit 74 may choose the master device or the slave device through a menu and store the setting conditions of the master device or the slave device as chosen.

The controller 7 has a configuration to synchronize the timings (phases) of projecting the infrared light with the respective wavelengths IR1, IR2, and IR3 from the respective infrared projectors 9 of the first and second imaging devices 101. In particular, the controller 7 includes a brightness level determination unit 75, a synchronous signal transmitter 76t, and a synchronous signal receiver 76r.

When the first imaging device 101 serves as the master device, the synchronous signal transmitter 76t transmits the synchronous signal Ssync based on a reference clock to the second imaging device 101. The synchronous signal Ssync is, for example, a signal based on the timing of projecting the infrared light in the first imaging device 101. The synchronous signal receiver 76r is in an inactive state at this time.

When the first imaging device 101 serves as the slave device, the synchronous receiver 76r receives the synchronous signal Ssync transmitted from the second imaging device 101 serving as the master device. The synchronous signal transmitter 76t is in an inactive state at this time. The synchronous signal receiver 76r does not necessarily receive the synchronous signal Ssync directly from the imaging device as the master device, and may receive the signal via another device.

The operations of the brightness level determination unit 75, the synchronous signal transmitter 76t, and the synchronous signal receiver 76r will be described in detail below.

The image processing unit 5 includes switches 51 and 53, a pre-signal processing unit 52, and a demosaicing unit 54. The switches 51 and 53 may be physical switches or logical switches for switching the pre-signal processing unit 52 between an active state and an inactive state. The controller 7 receives an image signal output from the image processing unit 5 in order to detect the brightness of the image being captured.

Figure 5:
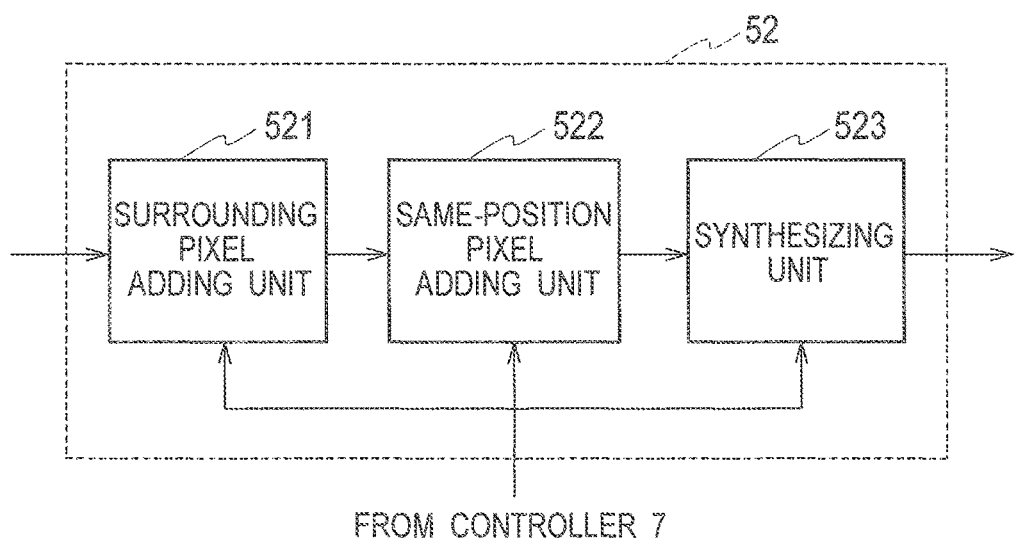
FIG. 5 is a block diagram showing an example of a specific configuration of a pre-signal processing unit 52 shown in FIG. 1.

As shown in FIG. 5, the pre-signal processing unit 52 includes a surrounding pixel adding unit 521, a same-position pixel adding unit 522, and a synthesizing unit 523.

The image processing unit 5 generates data for the respective three primary colors R, G, and B, and supplies the data to the image output unit 6. The image output unit 6 outputs the data for the three primary colors in a predetermined format to a display unit (not shown) or the like.

The image output unit 6 may directly output signals of the three primary colors R, G, and B, or may convert the signals of the three primary colors R, G, and B into luminance signals and color signals (or color difference signals) before outputting. The image output unit 6 may output composite image signals. The image output unit 6 may output digital image signals or output image signals converted into analog signals by a D/A converter.

Next, the operations of each of the normal mode, the intermediate mode, and the night-vision mode are described in more detail below.

<Normal Mode>

In the normal mode, the controller 7 directs the drive unit 8 to insert the infrared cut filter 21 between the optical lens 1 and the imaging unit 3. The projection controller 71 turns off the infrared projector 9 to stop projecting infrared light.

Image signals captured by the imaging unit 3 are converted into image data as digital signals by the A/D converter 4, and then input into the image processing unit 5. In the normal mode, the mode switching unit 72 connects the switches 51 and 53 to the respective terminals Tb.

Figure 6:
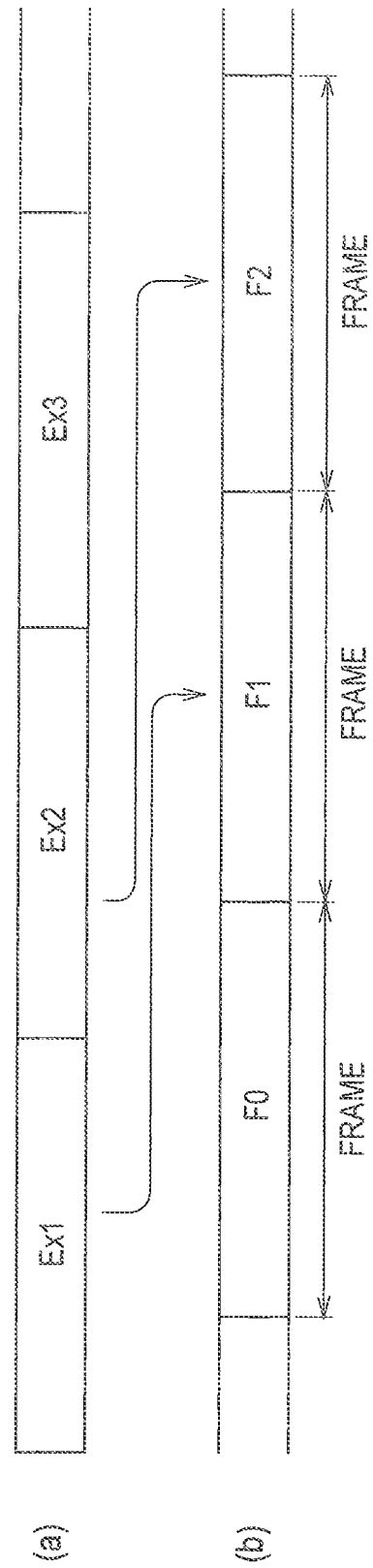
FIG. 6 is a view showing a relationship between exposures and frames of image signals when the imaging device according to the embodiment is operating in the normal mode.

Item (a) of FIG. 6 shows exposures Ex1, Ex2, Ex 3, etc . . . of the imaging unit 3. Although the actual exposure time varies depending on the condition such as a shutter speed, each of the exposures Ex1, Ex2, Ex 3 denotes the maximum exposure time.

Item (b) of FIG. 6 shows the timing at which each of frames of the image signals is obtained. Frame F0 of the image signals is obtained based on an exposure (not shown) prior to the exposure Ex1 after a predetermined period of time. Frame F1 of the image signals is obtained based on the exposure Ex1 after a predetermined period of time. Frame F2 of the image signal is obtained based on the exposure Ex2 after a predetermined period of time. The same operations are repeated after the exposure Ex3. A frame frequency of the image signals is, for example, 30 frames per second.

The frame frequency of the image signals that may be determined as appropriate is that such as 30 frames per second or 60 frames per second in the NTSC format, and 25 frames per second or 50 frames per second in the PAL format. Alternatively, the frame frequency of the image signals may be 24 frames per second, which is used for movies.

The image data of each frame output from the A/D converter 4 is input into the demosaicing unit 54 via the switches 51 and 53. The demosaicing unit 54 subjects the image data of each input frame to demosaicing. The image processing unit 5 subjects the data to other types of image processing, such as white balance correction and gain correction in addition to the demosaicing, and outputs data of the three primary colors R, G, and B.

Figure 7:
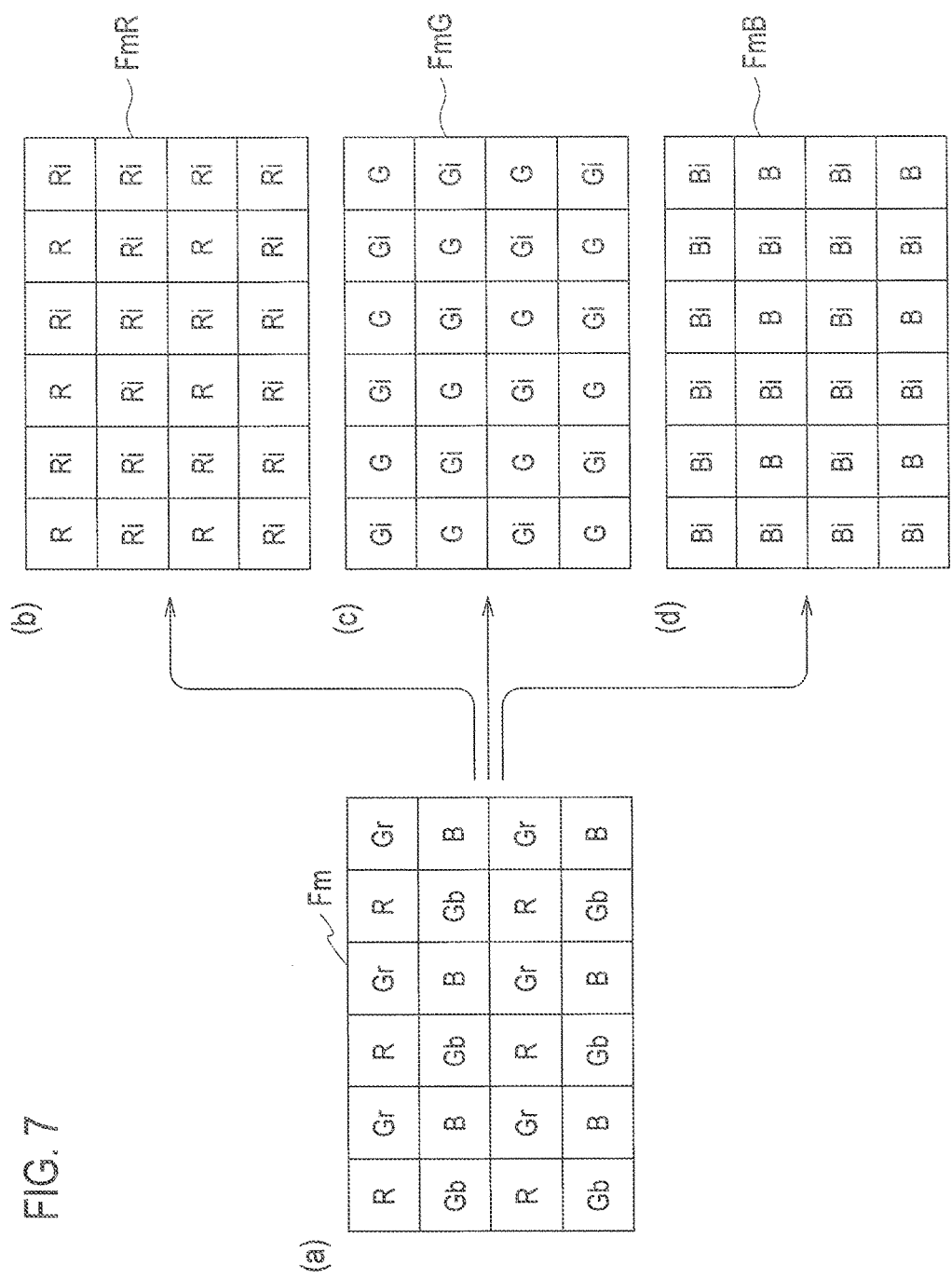
FIG. 7 is a view for describing demosaicing when the imaging device according to the embodiment is operating in the normal mode.

The demosaicing in the demosaicing unit 54 is described below with reference to FIG. 7. Item (a) of FIG. 7 shows an arbitrary frame Fm of image data. The frame Fm is composed of pixels in an effective image period. The number of the pixels is, for example, 640 horizontal pixels and 480 vertical pixels in the VGA standard. For reasons of simplification, the number of the pixels in the frame Fm is greatly decreased so as to schematically show the frame Fm.

The image data generated by the imaging unit 3 having the Bayer array is data in which pixel data for R, G, and B are mixed in the frame Fm. The demosaicing unit 54 computes pixel data for R for pixel positions where no pixel data for R is present by use of the surrounding pixel data for R, so as to generate interpolated pixel data Ri for R. The demosaicing unit 54 generates R frame FmR in which all pixels in one frame shown in item (b) of FIG. 7 are composed of the pixel data for R.

The demosaicing unit 54 computes pixel data for G for pixel positions where no pixel data for G is present by use of the surrounding pixel data for G, so as to generate interpolated pixel data Gi for G. The demosaicing unit 54 generates G frame FmG in which all pixels in one frame shown in item (c) of FIG. 7 are composed of the pixel data for G.

The demosaicing unit 54 computes pixel data for B for pixel positions where no pixel data for B is present by use of the surrounding pixel data for B, so as to generate interpolated pixel data Bi for B. The demosaicing unit 54 generates B frame FmB in which all pixels in one frame shown in item (d) of FIG. 7 are composed of the pixel data for B.

The demosaicing unit 54 is only required to use at least the pixel data for R when interpolating the pixel data for R, use at least the pixel data for G when interpolating the pixel data for G, and use at least the pixel data for B when interpolating the pixel data for B. Alternatively, the demosaicing unit 54 may interpolate the pixel data for each of R, G, and B to be generated by use of the pixel data of the different colors in order to improve the accuracy of the interpolation.

Since the imaging unit 3 further includes pixels outside the effective image period, pixel data for each of R, G, and B can be interpolated with regard to the pixels located along the edges of top and bottom, left and right.

The R frame FmR, the G frame FmG and the B frame FmB generated by the demosaicing unit 54 are output as the data for the three primary colors R, G, and B. Although the pixel data for each of R, G, and B was described per frame in FIG. 7 for ease of explanation, the pixel data for each of R, G, and B is actually output sequentially per pixel.

<Intermediate Mode: First Intermediate Mode>

In the intermediate mode (first intermediate mode and second intermediate mode described below), the controller 7 directs the drive unit 8 to insert the dummy glass 22 between the optical lens 1 and the imaging unit 3. The projection controller 71 turns on the infrared projector 9 to project infrared light. The mode switching unit 72 connects the switches 51 and 53 to the respective terminals Ta.

Figure 8:
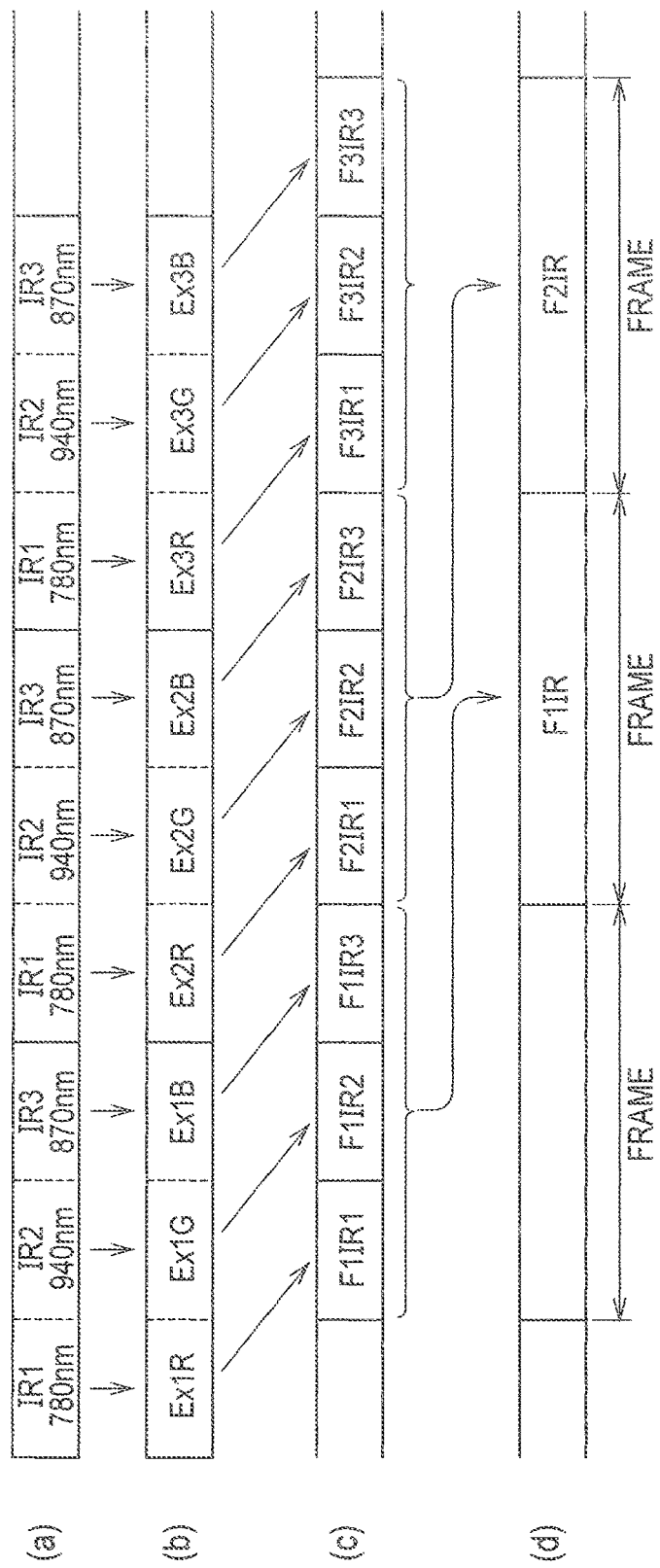
FIG. 8 is a view schematically showing a relationship between exposures and frames of image signals when the imaging device according to the embodiment is operating in the intermediate mode and in the night-vision mode.

Item (a) of FIG. 8 shows a state where infrared light is projected from the infrared projector 9. The controller 7 divides one frame period of the normal mode into three so as to control the projecting portions 91, 92, and 93 to sequentially project infrared light in this order, for example.

In the example of item (a) of FIG. 8, the infrared light with the wavelength IR1 (780 nm) is radiated on the object in the first ⅓ period of the one frame. The infrared light with the wavelength IR2 (940 nm) is radiated on the object in the second ⅓ period of the one frame. The infrared light with the wavelength IR3 (870 nm) is radiated on the object in the last ⅓ period of the one frame. The order of radiation of the infrared light with the respective wavelengths IR1, IR2, and IR3 is optional. However, for the following reasons, the case in which the wavelength IR2 is located in the middle, and the wavelengths IR1, IR2, and IR3 are arranged in this order, is most preferable.

As shown in item (b) of FIG. 8, exposure Ex1R which has a strong correlation with R light is executed by the imaging unit 3 at the point where the infrared light with the wavelength IR1 is being projected. Exposure Ex1G which has a strong correlation with G light is executed by the imaging unit 3 at the point where the infrared light with the wavelength IR2 is being projected. Exposure Ex1B which has a strong correlation with B light is executed by the imaging unit 3 at the point where the infrared light with the wavelength IR3 is being projected.

Note that, since an image is captured in the intermediate mode in a state where visible light is slightly present, visible light and infrared light projected from the infrared projector 9 coexist. Therefore, in the intermediate mode, exposures Ex1R, Ex1G, Ex1B, Ex2R, Ex2G, Ex2B, etc . . . , are each obtained in a manner such that exposure of visible light and exposure of infrared light are combined together.

As shown in item (c) of FIG. 8, frame F1IR1 corresponding to the exposure Ex1R, frame F1IR2 corresponding to the exposure Ex1G, and frame F1IR3 corresponding to the exposure Ex1B are obtained based on the exposures Ex1R, Ex1G, and Ex1B after a predetermined period of time.

Further, frame F2IR1 corresponding to the exposure Ex2R, frame F2IR2 corresponding to the exposure Ex2G, and frame F2IR3 corresponding to the exposure Ex2B are obtained based on the exposures Ex2R, Ex2G, and Ex2B after a predetermined period of time. The same operations are repeated after the exposures Ex3R, Ex3G, and Ex3B.

The frame frequency of the imaging signals in item (c) of FIG. 8 is 90 frames per second. In the intermediate mode, one frame of the image signals in the normal mode is subjected to time division so as to project the infrared light with the respective wavelengths IR1 to IR3. Thus, in order to output the image signals in the same format as the normal mode, the frame frequency of the imaging signals in item (c) of FIG. 8 is three times as many as that in the normal mode.

As described below, based on the imaging signals of the three frames in item (c) of FIG. 8, one frame of image signals is generated, having a frame frequency of 30 frames per second, as shown in item (d) of FIG. 8. For example, frame F1IR is generated based on the frames F1IR1, F1IR2, and F1IR3. Frame F2IR is generated based on the frames F2IR1, F2IR2, and F2IR3.

The operation of generating the image signals of each frame in item (d) of FIG. 8 in the intermediate mode, based on the imaging signals of the three frames in item (c) of FIG. 8, is described in detail below.

The image data for the respective frames, corresponding to the imaging signals shown in item (c) of FIG. 8 output from the A/D converter 4, is input into the pre-signal processing unit 52 via the switch 51.

Figure 9:
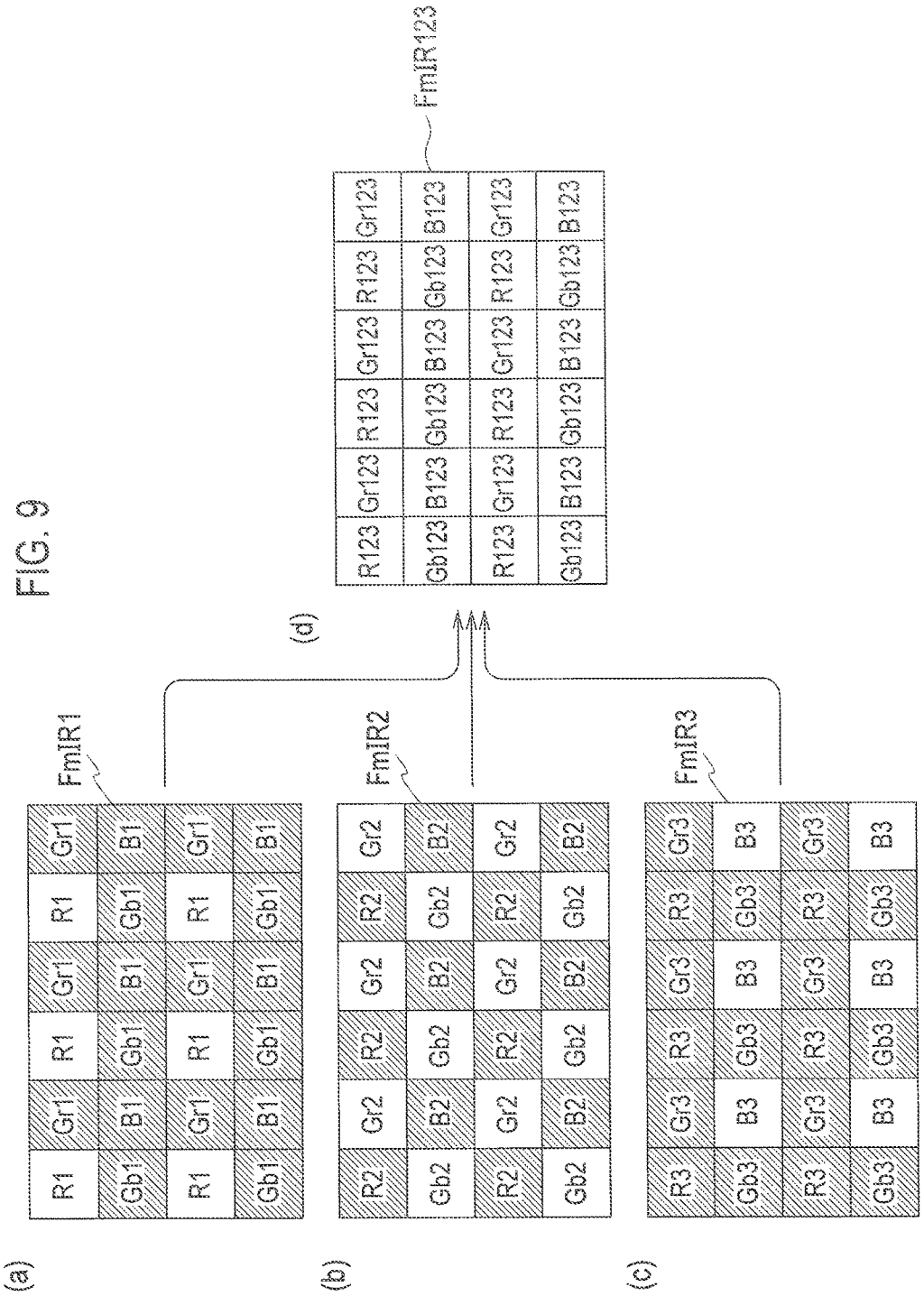
FIG. 9 is a view for describing pre-signal processing when the imaging device according to the embodiment is operating in the first intermediate mode.

Pre-signal processing in the pre-signal processing unit 52 is described below with reference to FIG. 9. Item (a) of FIG. 9 shows an arbitrary frame FmIR1 of image data generated at the point where the infrared light with the wavelength IR1 is being projected. The pixel data for each of R, B, Gr, and Gb in the frame FmIR1 is indicated with an index "1" indicating that all data is generated in the state where the infrared light with the wavelength IR1 is projected.

Item (b) of FIG. 9 shows an arbitrary frame FmIR2 of image data generated at the point where the infrared light with the wavelength IR2 is being projected. The pixel data for each of R, B, Gr, and Gb in the frame FmIR2 is indicated with an index "2" indicating that all data is generated in the state where the infrared light with the wavelength IR2 is projected.

Item (c) of FIG. 9 shows an arbitrary frame FmIR3 of image data generated at the point where the infrared light with the wavelength IR3 is being projected. The pixel data for each of R, B, Gr, and Gb in the frame FmIR3 is indicated with an index "3" indicating that all data is generated in the state where the infrared light with the wavelength IR3 is projected.

Since the frame FmIR1 shown in item (a) of FIG. 9 includes the image data generated in the state where the infrared light with the wavelength IR1 having a strong correlation with R light is projected, the pixel data for R is pixel data corresponding to the projected infrared light, and the pixel data for B and G are pixel data not corresponding to the projected infrared light. The hatching added to the pixel data for each of B, Gr, and Gb represents that the pixel data does not correspond to the projected infrared light.

Since the frame FmIR2 shown in item (b) of FIG. 9 includes the image data generated in the state where the infrared light with the wavelength IR2 having a strong correlation with G light is projected, the pixel data for G is pixel data corresponding to the projected infrared light, and the pixel data for R and B are pixel data not corresponding to the projected infrared light. The hatching added to the pixel data for each of R and B represents that the pixel data does not correspond to the projected infrared light.

Since the frame FmIR3 shown in item (c) of FIG. 9 includes the image data generated in the state where the infrared light with the wavelength IR3 having a strong correlation with B light is projected, the pixel data for B is pixel data corresponding to the projected infrared light, and the pixel data for R and G are pixel data not corresponding to the projected infrared light. The hatching added to the pixel data for each of R, Gr, and Gb represents that the pixel data does not correspond to the projected infrared light.

The same-position pixel adding unit 522 in the pre-signal processing unit 52 individually adds the pixel data for each of R, Gr, Gb, and B located at the same pixel positions according to the following formulae (1) to (3) so as to generate added pixel data R123, Gr123, Gb123, and B123. In the intermediate mode, the surrounding pixel adding unit 521 in the pre-signal processing unit 52 is inactive.

$$R123 = ka \times R1 + Kb \times R2 + kc \times R3 \quad (1)$$

$$G123 = kd \times G1 + Ke \times G2 + kf \times G3 \quad (2)$$

$$B123 = kg \times B1 + Kh \times B2 + ki \times B3 \quad (3)$$

In the formulae (1) to (3), R1, G1, and B1 are pixel data for R, G, and B in the frame FmIR1, R2, G2, and B2 are pixel data for R, G, and B in the frame FmIR2, and R3, G3, and B3 are pixel data for R, G, and B in the frame FmIR3. In addition, ka to ki are predetermined coefficients. The data G123 in the formula (2) is either Gr123 or Gb123.

The same-position pixel adding unit 522 adds the hatched pixel data for each of R, Gr, Gb, and B to the pixel data for each of R, Gr, Gb, and B located at the same pixel positions not hatched.

In particular, the same-position pixel adding unit 522 adds, to the pixel data for R located in the frame FmIR1, the pixel data for R located at the same pixel positions in each of the frames FmIR2 and FmIR3, so as to generate the added pixel data R123 according to the formula (1). That is, the same-position pixel adding unit 522 only uses the pixel data in the region corresponding to the red color filter in the light receiving elements and generates the added pixel data R123 for red.

The same-position pixel adding unit 522 adds, to the pixel data for Gr, Gb located in the frame FmIR2, the pixel data for Gr, Gb located at the same pixel positions in each of the frames FmIR1 and FmIR3, so as to generate the added pixel data G123 according to the formula (2). That is, the same-position pixel adding unit 522 only uses the pixel data in the region corresponding to the green color filter in the light receiving elements and generates the added pixel data G123 for green.

The same-position pixel adding unit 522 adds, to the pixel data for B located in the frame FmIR3, the pixel data for B located at the same pixel positions in each of the frames FmIR1 and FmIR2, so as to generate the added pixel data B123 according to the formula (3). That is, the same-position pixel adding unit 522 only uses the pixel data in the region corresponding to the blue color filter in the light receiving elements and generates the added pixel data B123 for blue.

The synthesizing unit 523 in the pre-signal processing unit 52 generates frame FmIR123 of synthesized image signals shown in item (d) of FIG. 9 based on the respective added pixel data R123, Gr123, Gb123, and B123 generated at the respective pixel positions.

More particularly, the synthesizing unit 523 selects the added pixel data R123 in the frame FmIR1, the added pixel data Gr123 and Gb123 in the frame FmIR2, and the added pixel data B123 in FmIR3, and synthesizes the respective added pixel data. The synthesizing unit 523 thus generates the frame FmIR123 of the synthesized image signals.

As described above, the synthesizing unit 523 generates the frame FmIR123 in which the respective added pixel data R123, Gr123, Gb123, and B123 are arranged so as to have the same array as the filter elements in the color filter 32.

In the first intermediate mode, the image data in the frame FmIR123 are generated in such a manner as to use the pixel data not hatched and the pixel data hatched.

The reason the same-position pixel adding unit 522 adds the respective pixel data located at the same pixel positions is that, since an image is captured in the intermediate mode in the state where visible light is present, although the amount thereof is small, the hatched pixel data contains the components of the respective colors based on the exposure by the visible light. Therefore, the respective pixel data located at the same pixel positions are added to each other so that the sensitivity to the respective colors can be improved.

When the amount of visible light is relatively large in the state where visible light and infrared light coexist, the exposure by the visible light is predominant. In such a case, the image data in the frame FmIR123 mainly contains the components based on the image signals exposed by the visible light. When the amount of infrared light is relatively large in the state where infrared light and visible light coexist, the exposure by the infrared light is predominant. In such a case, the image data in the frame FmIR123 mainly contains the components based on the image signals exposed by the infrared light.

When the amount of visible light is relatively small, the coefficients ka, kb, and kc in the formula (1) preferably fulfill the relationship of ka>kb, kc, the coefficients kd, ke, and kf in the formula (2) preferably fulfill the relationship of kf>kd, ke, and the coefficients kg, kh, and ki in the formula (3) preferably fulfill the relationship of kh>kg, ki. This is because the wavelength IR1 has a strong correlation with the R light, the wavelength IR2 has a strong correlation with the G light, and the wavelength IR3 has a strong correlation with the B light.

Accordingly, the pixel data for R can be the main data in the frame FmIR1, the pixel data for G can be the main data in the frame FmIR2, and the pixel data for B can be the main data in the frame FmIR3.

The image data in the frame FmIR123 output from the pre-signal processing unit 52 is input into the demosaicing unit 54 via the switch 53. The demosaicing unit 54 subjects the input image data in the frame FmIR123 to demosaicing in the same manner as in the normal mode. The image processing unit 5 subjects the image data to other types of image processing, such as white balance correction and gain correction in addition to the demosaicing, and outputs the data for the three primary colors R, G, and B.

Figure 10:
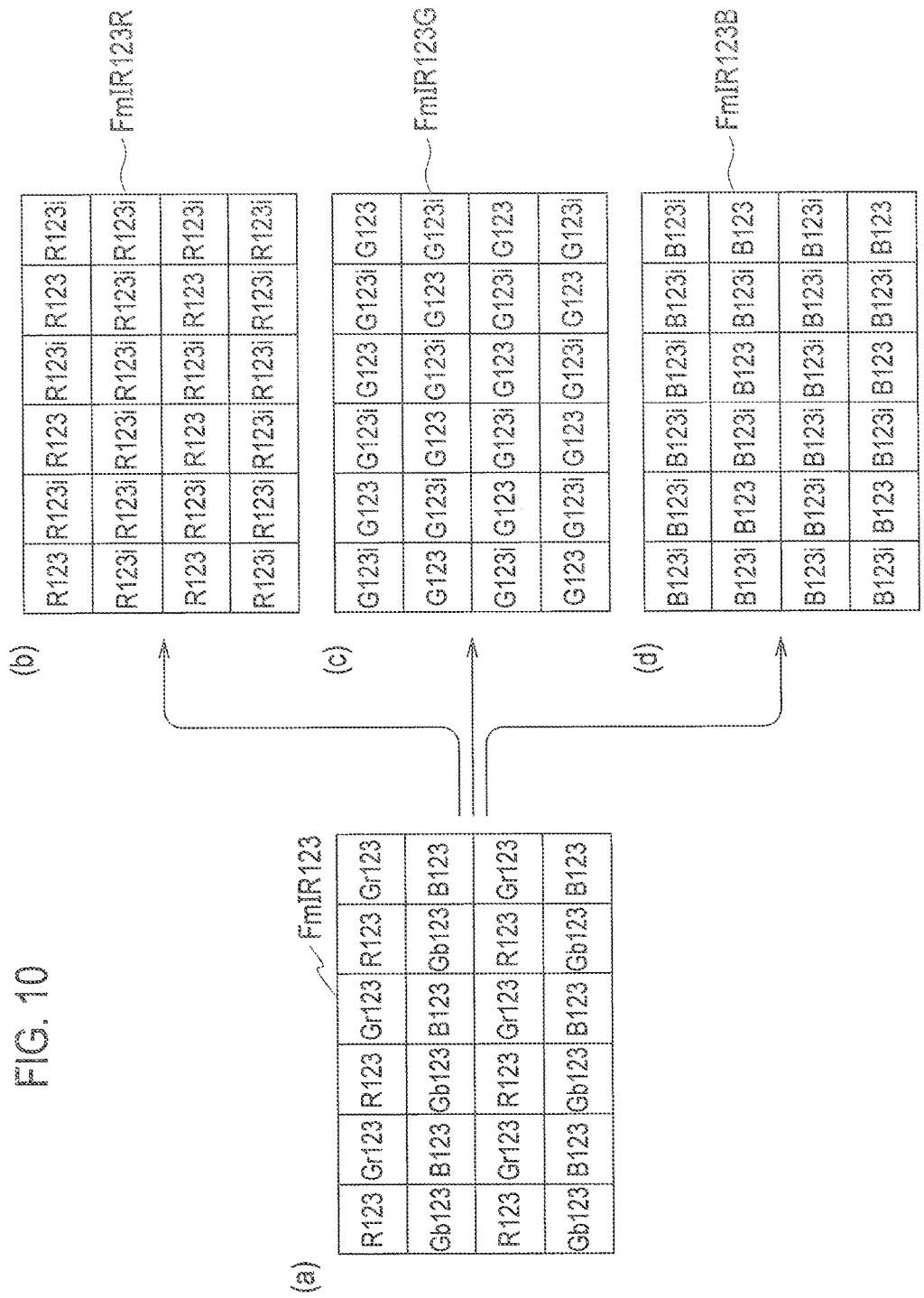
FIG. 10 is a view for describing demosaicing when the imaging device according to the embodiment is operating in the first intermediate mode.

The demosaicing in the demosaicing unit 54 is described below with reference to FIG. 10. Item (a) of FIG. 10 shows the frame FmIR123. The demosaicing unit 54 computes pixel data for R for pixel positions where no pixel data for R is present by use of the surrounding pixel data for R, so as to generate interpolated pixel data R123$i$ for R. The demosaicing unit 54 generates R frame FmIR123R in which all pixels in one frame shown in item (b) of FIG. 10 are composed of the pixel data for R.

The demosaicing unit 54 computes pixel data for G for pixel positions where no pixel data for G is present by use of the surrounding pixel data for G, so as to generate interpolated pixel data G123$i$ for G. The demosaicing unit 54 generates G frame FmIR123G in which all pixels in one frame shown in item (c) of FIG. 10 are composed of the pixel data for G.

The demosaicing unit 54 computes pixel data for B for pixel positions where no pixel data for B is present by use of the surrounding pixel data for B, so as to generate interpolated pixel data B123$i$ for B. The demosaicing unit 54 generates B frame FmIR123B in which all pixels in one frame shown in item (d) of FIG. 10 are composed of the pixel data for B.

As is apparent from the operation of the demosaicing unit 54 in the normal mode shown in FIG. 7 and the operation of the demosaicing unit 54 in the intermediate mode shown in FIG. 10, the both operations are substantially the same. Thus, the operation of the demosaicing unit 54 does not differ between the normal mode and the intermediate mode.

The pre-signal processing unit 52 is only required to be activated in the intermediate mode except for the surrounding pixel adding unit 521, while the pre-signal processing unit 52 is inactivated in the normal mode. The normal mode and the intermediate mode may share the signal processing unit such as the demosaicing unit 54 in the image processing unit 5.

<Intermediate Mode: Second Intermediate Mode>

Figure 11:
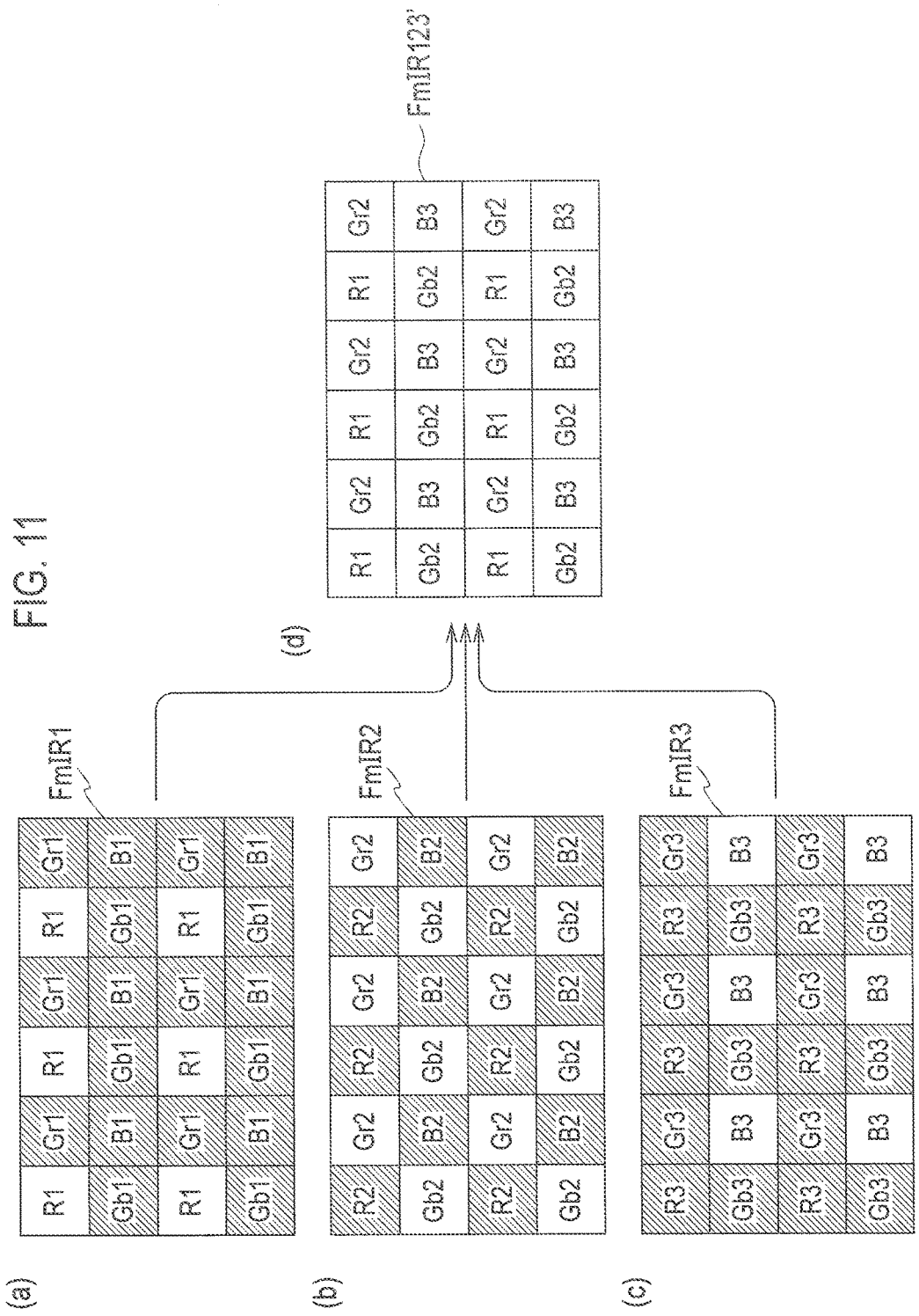
FIG. 11 is a view for describing pre-signal processing when the imaging device according to the embodiment is operating in the second intermediate mode.
Figure 12:
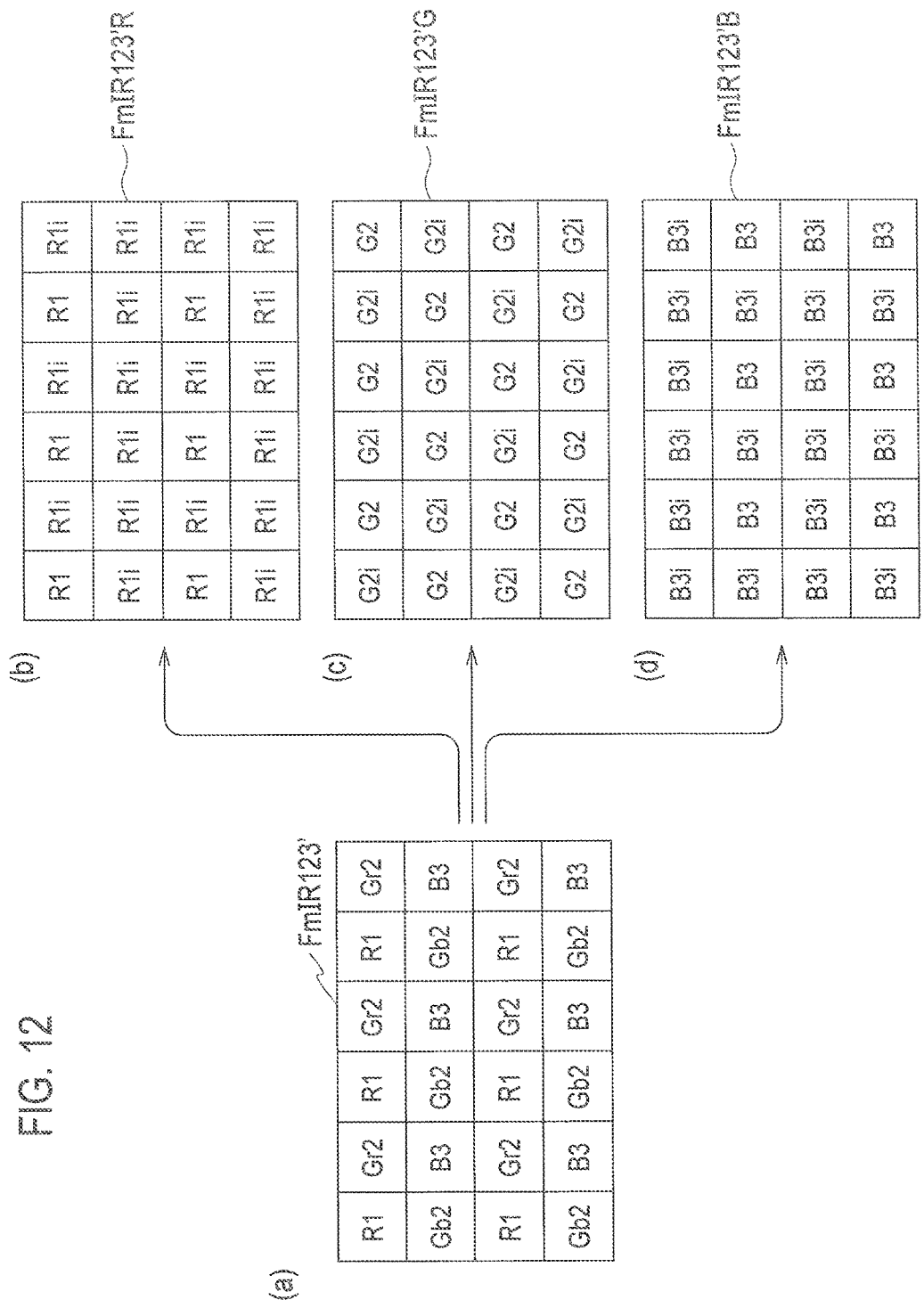
FIG. 12 is a view for describing demosaicing when the imaging device according to the embodiment is operating in the second intermediate mode.

Operations in the second intermediate mode are described below with reference to FIG. 11 and FIG. 12. Note that the same operations as those in the first intermediate mode are not described in the second intermediate mode. The frame FmIR1, the frame FmIR2, and the frame FmIR3 shown in items (a) to (c) in FIG. 11 are the same as the frame FmIR1, the frame FmIR2, and the frame FmIR3 shown in items (a) to (c) in FIG. 9.

The synthesizing unit 523 selects pixel data R1 for R in the frame FmIR1, pixel data Gr2 and Gb2 for G in the frame FmIR2, and pixel data B3 for B in FmIR3, and synthesizes the respective pixel data. The synthesizing unit 523 thus generates frame FmIR123' of the synthesized image signals shown in item (d) of FIG. 11.

That is, the frame FmIR123' is image data in which the pixel data for R, Gr, Gb, and B not hatched in each of the frames FmIR1, FmIR2, and FmIR3 are collected in one frame.

Thus, the frame FmIR123' contains the pixel data for red only using the pixel data in the region corresponding to the red color filter in the state where the infrared light with the wavelength IR1 is projected, the pixel data for green only using the pixel data in the region corresponding to the green color filter in the state where the infrared light with the wavelength IR2 is projected, and the pixel data for blue only using the pixel data in the region corresponding to the blue color filter in the state where the infrared light with the wavelength IR3 is projected.

As described above, the synthesizing unit 523 generates the frame FmIR123' in which the respective pixel data R1, Gr2, Gb2, and B3 are arranged so as to have the same array as the filter elements in the color filter 32.

In the second intermediate mode, the same-position pixel adding unit 522 defines the coefficient Ka in the formula (1) as 1 and the other coefficients Kb and Kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data for R in the frame FmIR1, the values of the pixel data for Gr and Gb in the frame FmIR2, and the value of the pixel data for B in the frame FmIR3 each remain as is.

Accordingly, the synthesizing unit 523 can generate the frame FmIR123' by selecting the pixel data for R in the frame FmIR1, the pixel data for Gr and Gb in the frame FmIR2, and the pixel data for B in the frame FmIR3, in the same manner as the operations in the first intermediate mode.

In the second intermediate mode, the pre-signal processing unit 52 only uses the pixel data (the pixel data not hatched) generated in the state where the infrared light for generating the pixel data with the same color is projected so as to generate the frame FmIR123'.

According to the second intermediate mode, although the sensitivity or color reproduction performance decreases compared with the first intermediate mode, the calculation processing can be simplified or the frame memory can be reduced.

The demosaicing in the demosaicing unit 54 is described below with reference to FIG. 12. Item (a) of FIG. 12 shows the frame FmIR123'. The demosaicing unit 54 computes pixel data for R for pixel positions where no pixel data for R is present by use of the surrounding pixel data for R, so as to generate interpolated pixel data R$1i$ for R. The demosaicing unit 54 generates R frame FmIR123'R in which all pixels in one frame shown in item (b) of FIG. 12 are composed of the pixel data for R.

The demosaicing unit 54 computes pixel data for G for pixel positions where no pixel data for G is present by use of the surrounding pixel data for G, so as to generate interpolated pixel data G$2i$ for G. The demosaicing unit 54 generates G frame FmIR123'G in which all pixels in one frame shown in item (c) of FIG. 12 are composed of the pixel data for G.

The demosaicing unit 54 computes pixel data for B for pixel positions where no pixel data for B is present by use of the surrounding pixel data for B, so as to generate interpolated pixel data B$3i$ for B. The demosaicing unit 54 generates B frame FmIR123'B in which all pixels in one frame shown in item (d) of FIG. 12 are composed of the pixel data for B.

Accordingly, in the intermediate mode, the pixel data for red is generated from the pixel data obtained from the region corresponding to the red color filter in the light receiving elements, the pixel data for green is generated from the pixel data obtained from the region corresponding to the green color filter in the light receiving elements, and the pixel data for blue is generated from the pixel data obtained from the region corresponding to the blue color filter in the light receiving elements.

<Night-Vision Mode: First Night-Vision Mode>

In the night-vision mode (first night-vision mode and second night-vision mode described below), the controller 7 directs the drive unit 8 to insert the dummy glass 22 between the optical lens 1 and the imaging unit 3, as in the case of the intermediate mode. The projection controller 71 turns on the infrared projector 9 to project infrared light. The mode switching unit 72 connects the switches 51 and 53 to the respective terminals Ta.

The general operations in the night-vision mode are the same as those shown in FIG. 8. However, since an image is captured in the night-vision mode in a state where almost no visible light is present, the exposures Ex1R, Ex1G, Ex1B, Ex2R, Ex2G, Ex2B, etc . . . , shown in item (b) of FIG. 8 are assumed to be exposure only by infrared light.

Under the condition that there is almost no visible light but only infrared light, the characteristics of the respective filter elements in the color filter 32 do not differ from each other. Thus, the imaging unit 3 can be considered as a single-color imaging device.

Therefore, in the night-vision mode, the surrounding pixel adding unit 521 in the pre-signal processing unit 52 adds surrounding pixel data to all pixel data in order to improve the sensitivity of infrared light.

More particularly, when the R pixel is the target pixel as shown in item (a) of FIG. 13, the surrounding pixel adding unit 521 adds, to the pixel data for R as the target pixel, the pixel data of the surrounding eight pixels of G (Gr, Gb) and B.

While the pixel data for red is generated from the pixel data obtained from the region corresponding to the red color filter in the light receiving elements in the intermediate mode, the pixel data for red is generated, in the night-vision mode, from the pixel data obtained from a wider region than the region in the intermediate mode. The respective examples shown in items (a) to (d) of FIG. 13 use the pixel data obtained from the region of the nine pixels including the target pixel.

When the Gr pixel is the target pixel as shown in item (b) of FIG. 13, the surrounding pixel adding unit 521 adds, to the pixel data for Gr as the target pixel, the pixel data of the surrounding eight pixels of R, Gb, and B. The target pixel G shown in item (b) of FIG. 13 is a pixel of Gb, and the other surrounding pixels G are pixels of Gr. Although not shown in the drawing, when the target pixel G is a pixel of Gr, other surrounding pixels G are pixels of Gb, and the surrounding pixel adding unit 521 adds, to the pixel data for Gr, the pixel data of the surrounding eight pixels of R, Gb and B.

While the pixel data for green is generated from the pixel data obtained from the region corresponding to the green color filter in the light receiving elements in the intermediate mode, the pixel data for green is generated, in the night-vision mode, from the pixel data obtained from a wider region than the region in the intermediate mode.

When the B pixel is a target pixel as shown in item (c) of FIG. 13, the surrounding pixel adding unit 521 adds, to the pixel data for B as the target pixel, the pixel data of the surrounding eight pixels of R and G.

While the pixel data for blue is generated from the pixel data obtained from the region corresponding to the blue color filter in the light receiving elements in the intermediate mode, the pixel data for blue is generated, in the night-vision mode, from the pixel data obtained from a wider region than the region in the intermediate mode.

The surrounding pixel adding unit 521 may simply add the pixel data of the nine pixels together including the target pixel and the surrounding eight pixels, or may add, to the pixel data of the target pixel, the pixel data of the surrounding eight pixels after being subjected to particular weighting processing.

An amount of weighting performed on the pixel data of the surrounding eight pixels may partly be zero. In other words, the addition of the pixel data of the surrounding pixels to the pixel data of the target pixel implemented by the surrounding pixel adding unit 521, is not limited to the case of adding all the pixel data of the eight pixels to the pixel data of the target pixel.

For example, the surrounding pixel adding unit 521 may only add the pixel data of the vertical-horizontal pixels to the pixel data of the target pixel, excluding the diagonal pixels.

There is a known imaging element capable of collectively reading out a plurality of pixels as a single pixel, which is called binning. When the imaging element possessing the binning function is used as the imaging element 31, the adding processing may be performed not by the surrounding pixel adding unit 521 but by the imaging element with this binning function. The binning processing performed by the imaging element is substantially equivalent to the adding processing performed by the surrounding pixel adding unit 521.

Figure 14:
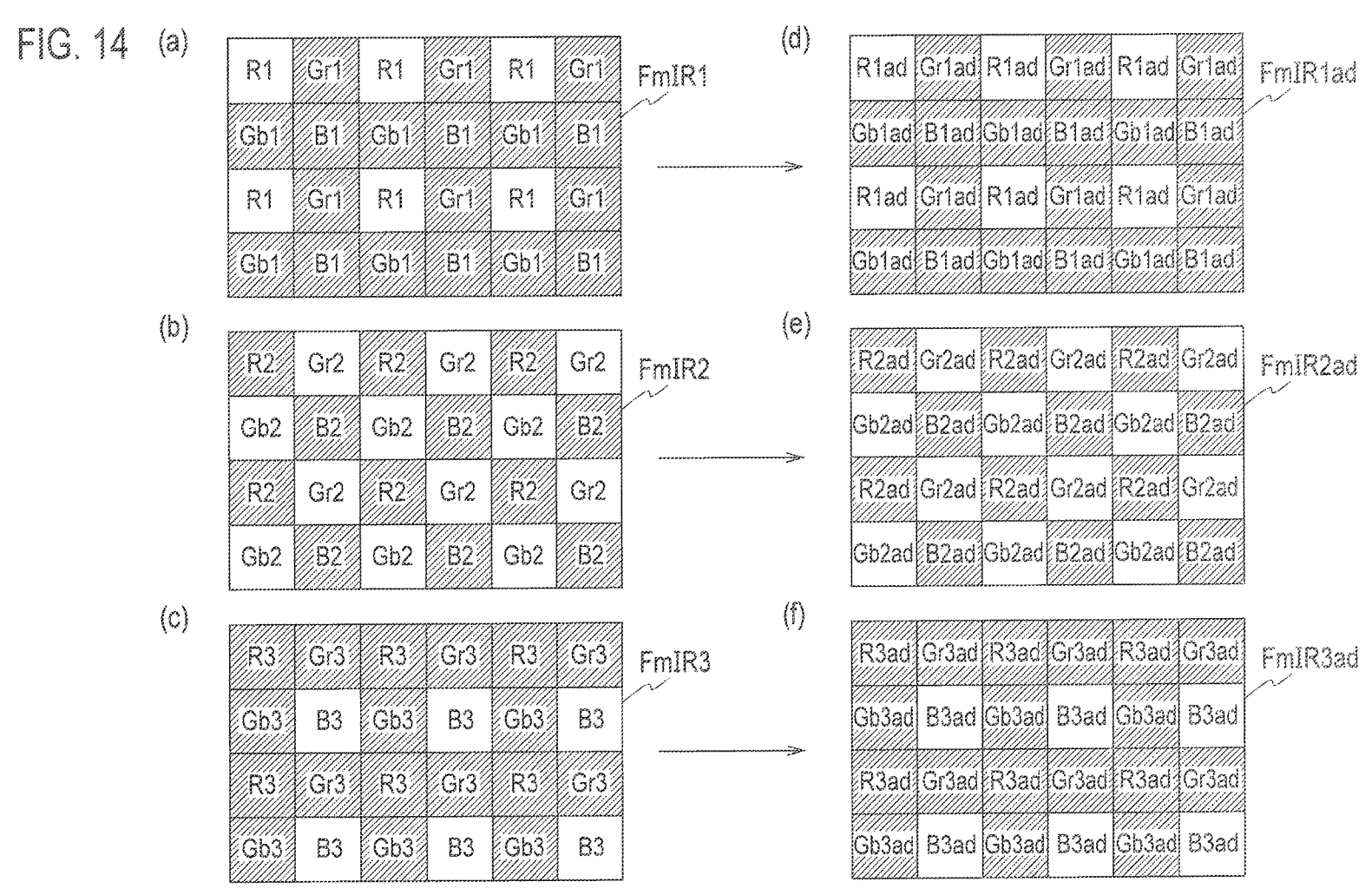

The frame FmIR1, the frame FmIR2, and the frame FmIR3 shown in items (a) to (c) of FIG. 14 are the same as the frame FmIR1, the frame FmIR2, and the frame FmIR3 shown in items (a) to (c) of FIG. 9, respectively. In items (d) to (f) of FIG. 14, each of added pixel data R1*ad*, Gr1*ad*, Gb1*ad*, B1*ad*, R2*ad*, Gr2*ad*, Gb2*ad*, B2*ad*, R3*ad*, Gr3*ad*, Gb3*ad*, and B3*ad* is obtained in a manner such that the pixel data of the surrounding eight pixels are added to the pixel data for each of R, Gr, Gb, and B.

The surrounding pixel adding unit 521 subjects the pixel data in each of the frames FmIR1, FmIR2, and FmIR3 to adding processing shown in FIG. 13, so as to generate frame FmIR1*ad*, frame FmIR2*ad*, and frame FmIR3*ad* shown in items (d) to (f) of FIG. 14.

Figure 15:
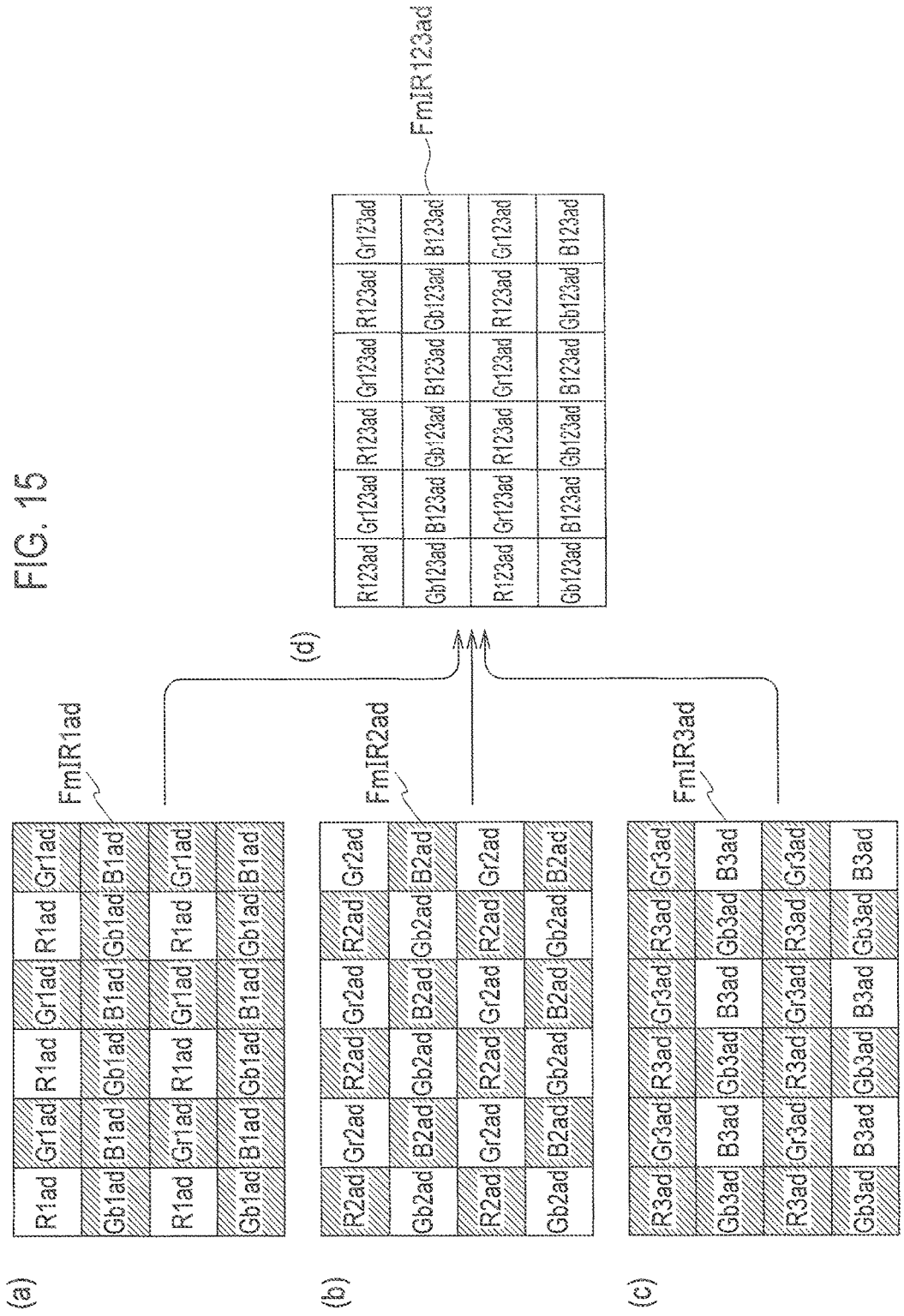
FIG. 15 is a view for describing pre-signal processing when the imaging device according to each embodiment is operating in the first night-vision mode.

The frames FmIR1*ad*, FmIR2*ad*, and FmIR3*ad* shown in items (a) to (c) of FIG. 15 are the same as the frames FmIR1*ad*, FmIR2*ad*, and FmIR3*ad* shown in items (d) to (f) of FIG. 14, respectively.

As in the case of the first intermediate mode, the same-position pixel adding unit 522 adds, to the pixel data R1*ad* located in the frame FmIR1*ad*, the pixel data R2*ad* and R3*ad* located at the same pixel positions in the respective frames FmIR2*ad* and FmIR3*ad*, so as to generate added pixel data R123*ad* according to the formula (1).

The same-position pixel adding unit 522 adds, to the pixel data Gr2*ad* and Gb2*ad* located in the frame FmIR2*ad*, the pixel data Gr1*ad*, Gb1*ad*, Gr3*ad*, and Gb3*ad* located at the same pixel positions in the respective frames FmIR1*ad* and FmIR3*ad*, so as to generate added pixel data Gr123*ad* and Gb123*ad* according to the formula (2).

The same-position pixel adding unit 522 adds, to the pixel data B3*ad* located in the frame FmIR3*ad*, the pixel data B1*ad* and B2*ad* located at the same pixel positions in the respective frames FmIR1*ad* and FmIR2*ad*, so as to generate added pixel data B123*ad* according to the formula (3).

As in the case of the first intermediate mode, the synthesizing unit 523 selects the added pixel data R123*ad* in the frame FmIR1*ad*, the added pixel data Gr123*ad* and Gb123*ad* in the frame FmIR2*ad*, and the added pixel data B123*ad* in FmIR3*ad*, and synthesizes the respective added pixel data. The synthesizing unit 523 thus generates frame FmIR123*ad* of the synthesized image signals shown in item (d) of FIG. 15.

The synthesizing unit 523 generates the frame FmIR123*ad* in which the respective added pixel data R123*ad*, Gr123*ad*, Gb123*ad*, and B123*ad* are arranged so as to have the same array as the filter elements in the color filter 32.

Figure 16:
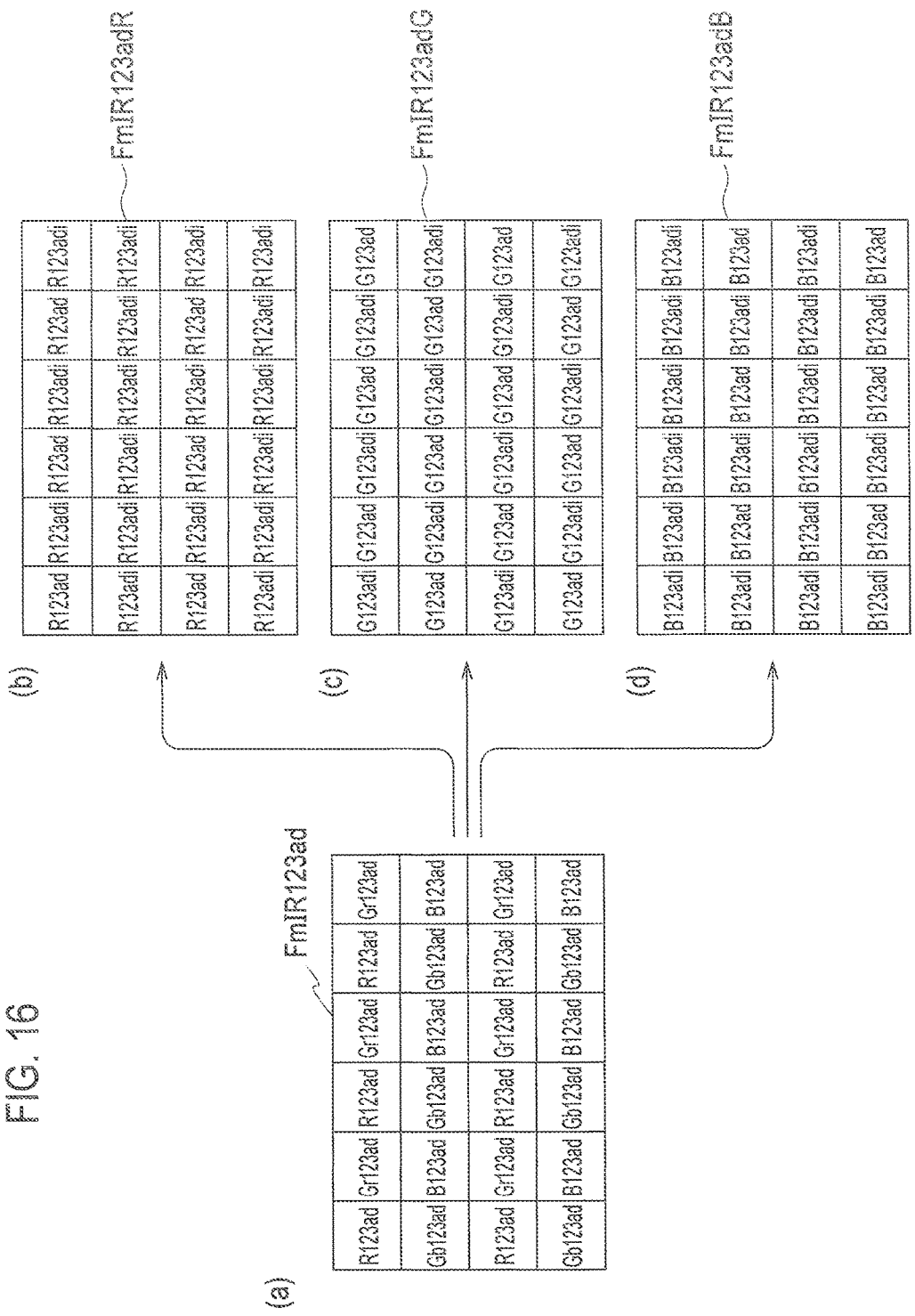
FIG. 16 is a view for describing demosaicing when the imaging device according to each embodiment is operating in the first night-vision mode.

Item (a) of FIG. 16 shows the frame FmIR123*ad*. The demosaicing unit 54 computes pixel data for R for pixel positions where no pixel data for R is present by use of the surrounding pixel data for R, so as to generate interpolated pixel data R123*adi* for R. The demosaicing unit 54 generates R frame FmIR123*ad*R in which all pixels in one frame shown in item (b) of FIG. 16 are composed of the pixel data for R.

The demosaicing unit 54 computes pixel data for G for pixel positions where no pixel data for G is present by use of the surrounding pixel data for G, so as to generate interpolated pixel data G123*adi* for G. The demosaicing unit 54 generates G frame FmIR123*ad*G in which all pixels in one frame shown in item (c) of FIG. 16 are composed of the pixel data for G.

The demosaicing unit 54 computes pixel data for B for pixel positions where no pixel data for B is present by use of the surrounding pixel data for B, so as to generate interpolated pixel data B123*adi* for B. The demosaicing unit 54 generates B frame FmIR123*ad*B in which all pixels in one frame shown in item (d) of FIG. 16 are composed of the pixel data for B.

The first intermediate mode and the first night-vision mode differ from each other in that the surrounding pixel adding unit 521 is inactive in the first intermediate mode, and the surrounding pixel adding unit 521 is active in the first night-vision mode. The mode switching unit 72 is only required to activate the surrounding pixel adding unit 521 when in the night-vision mode.

The operation of the demosaicing unit 54 in the night-vision mode is substantially the same as that in the normal mode and in the intermediate mode. The normal mode, the intermediate mode, and the night-vision mode may share the signal processing unit such as the demosaicing unit 54 in the image processing unit 5.

<Night-Vision Mode: Second Night-Vision Mode>

Figure 17:
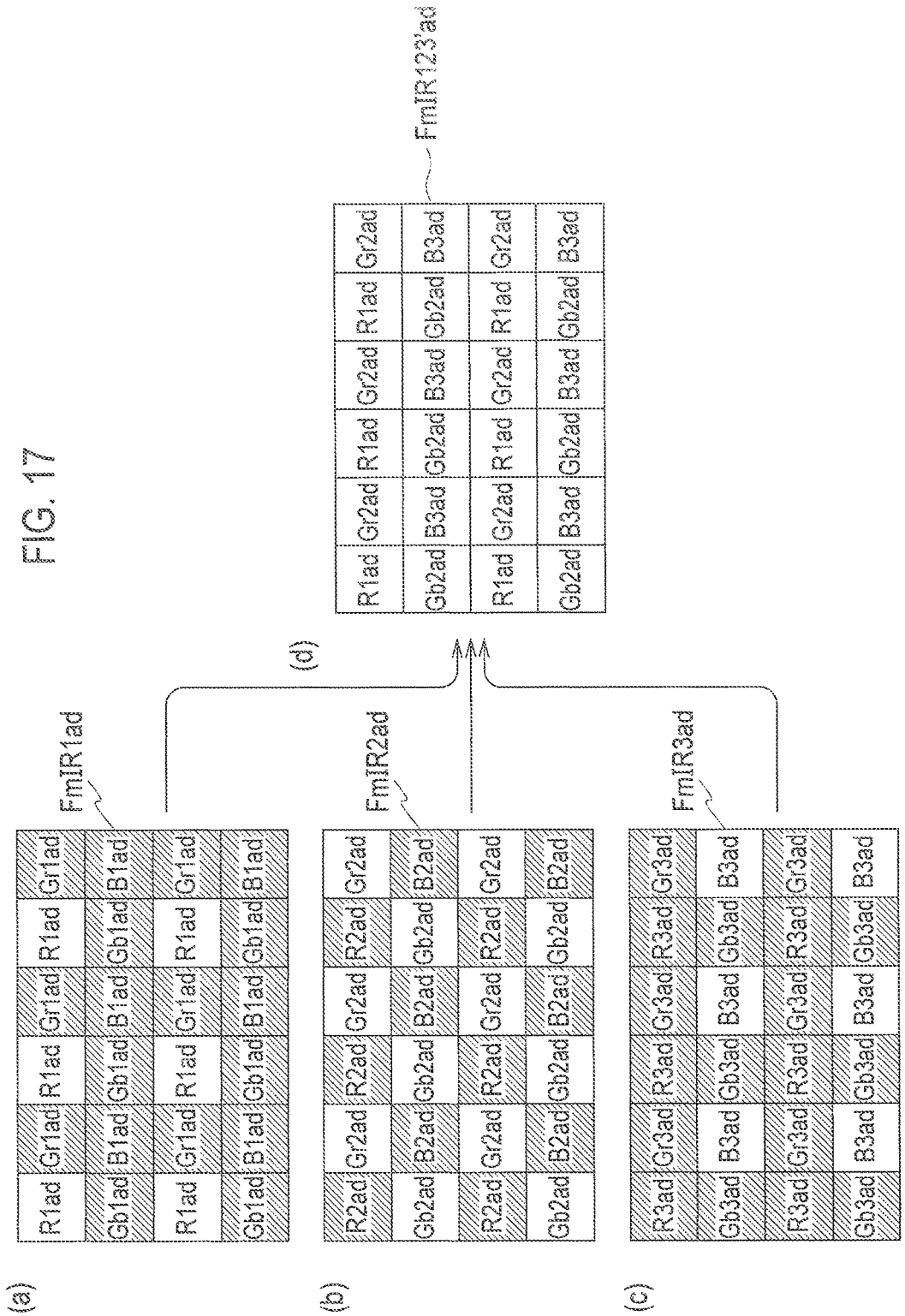
FIG. 17 is a view for describing pre-signal processing when the imaging device according to each embodiment is operating in the second night-vision mode.
Figure 18:
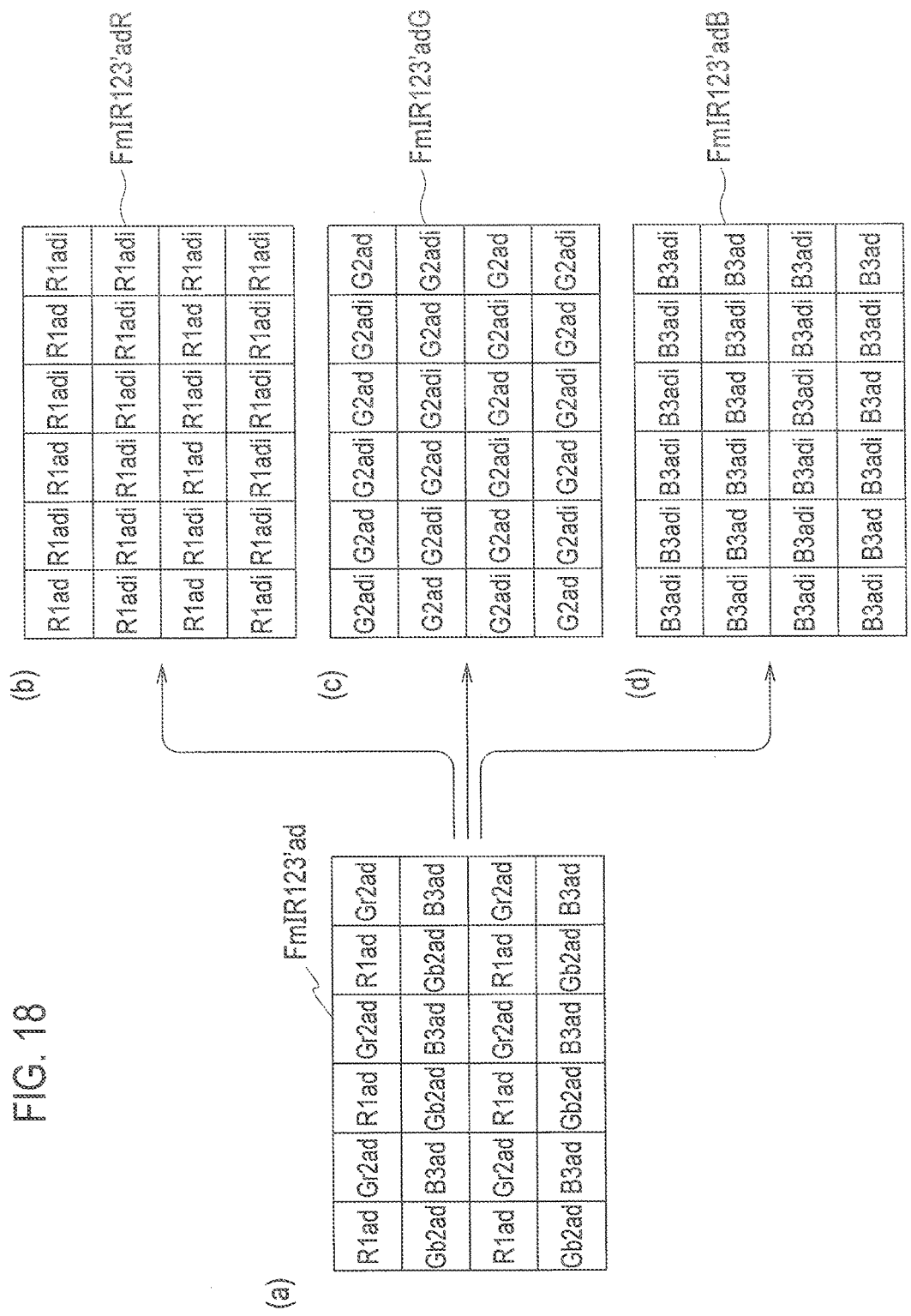
FIG. 18 is a view for describing demosaicing when the imaging device according to each embodiment is operating in the second night-vision mode.

Operations in the second night-vision mode are described below with reference to FIG. 17 and FIG. 18. Note that the same operations as those in the first night-vision mode are not described in the second night-vision mode. The frames FmIR1*ad*, FmIR2*ad*, and FmIR3*ad* shown in items (a) to (c) in FIG. 17 are the same as the frames FmIR1*ad*, FmIR2*ad*, and FmIR3*ad* shown in items (a) to (c) in FIG. 15.

The synthesizing unit 523 selects pixel data R1*ad* for R in the frame FmIR1*ad*, pixel data Gr2*ad* and Gb2*ad* for G in the frame FmIR2*ad*, and pixel data B3*ad* for B in FmIR3*ad*, and synthesizes the respective pixel data. The synthesizing unit 523 thus generates frame FmIR123'*ad* of the synthesized image signals shown in item (d) of FIG. 17.

The synthesizing unit 523 generates the frame FmIR123' ad in which the respective pixel data R1*ad*, Gr2*ad*, Gb2*ad*, and B3*ad* are arranged so as to have the same array as the filter elements in the color filter 32.

As described with reference to FIG. 13, the pixel data R1*ad* for red in the frame FmIR123' ad is generated from the pixel data obtained from a wider region than the region used for generating the pixel data for red when in the intermediate mode.

The pixel data Gr2*ad* for green in the frame FmIR123'*ad* is generated from the pixel data obtained from a wider region than the region used for generating the pixel data for green when in the intermediate mode.

The pixel data B3*ad* for blue in the frame FmIR123'*ad* is generated from the pixel data obtained from a wider region than the region used for generating the pixel data for blue when in the intermediate mode.

As in the case of the second intermediate mode, the same-position pixel adding unit 522 in the second night-vision mode defines the coefficient Ka in the formula (1) as 1 and the other coefficients Kb and Kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data R1*ad* in the frame FmIR1*ad*, the values of the pixel data Gr2*ad* and Gb2*ad* in the frame FmIR2*ad*, and the value of the pixel data B3*ad* in the frame FmIR3*ad* each remain as is.

Accordingly, the synthesizing unit 523 can generate the frame FmIR123'*ad* by selecting the pixel data R1*ad* in the frame FmIR1*ad*, the pixel data Gr2*ad* and Gb2*ad* in the frame FmIR2*ad*, and the pixel data B3*ad* in the frame FmIR3*ad*, in the same manner as the operations in the first night-vision mode.

The demosaicing in the demosaicing unit 54 is described below with reference to FIG. 18. Item (a) of FIG. 18 shows the frame FmIR123'*ad*. The demosaicing unit 54 computes pixel data for R for pixel positions where no pixel data for R is present by use of the surrounding pixel data R1*ad*, so as to generate interpolated pixel data R1*adi* for R. The demosaicing unit 54 generates R frame FmIR123'*ad*R in which all pixels in one frame shown in item (b) of FIG. 18 are composed of the pixel data for R.

The demosaicing unit 54 computes pixel data for G for pixel positions where no pixel data for G is present by use of the surrounding pixel data Gr2*ad* and Gb2*ad*, so as to generate interpolated pixel data G2*adi* for G. The demosaicing unit 54 generates G frame FmIR123'*ad*G in which all pixels in one frame shown in item (c) of FIG. 18 are composed of the pixel data for G.

The demosaicing unit 54 computes pixel data for B for pixel positions where no pixel data for B is present by use of the surrounding pixel data B3*ad*, so as to generate interpolated pixel data B3*adi* for B. The demosaicing unit 54 generates B frame FmIR123'*ad*B in which all pixels in one frame shown in item (d) of FIG. 18 are composed of the pixel data for B.

The second intermediate mode and the second night-vision mode differ from each other in that the surrounding pixel adding unit 521 is inactive in the second intermediate mode, and the surrounding pixel adding unit 521 is active in the second night-vision mode.

While the pixel data for each color is generated from the pixel data obtained from the region corresponding to each color filter in the light receiving elements in the intermediate mode, the pixel data for each color is generated, in the night-vision mode, from the pixel data obtained from a wider region than the region used for generating the pixel data for each color in the intermediate mode, as the surrounding pixels are added in the night-vision mode.

<Example of Mode Switching>

An example of mode switching by the mode switching unit 72 is described below with reference to FIG. 19. Item (a) of FIG. 19 is an example schematically showing a state of change in environmental brightness with the passage of time from daytime to nighttime.

As shown in item (a) of FIG. 19, the brightness gradually decreases with the passage of time from daytime to nighttime, and results in almost total darkness after time t3. Item (a) of FIG. 19 shows the brightness representing a substantial amount of visible light, and indicates that almost no visible light is present after time t3.

The controller 7 can determine the environmental brightness based on a brightness level of image signals (image data) input from the image processing unit 5. As shown item (b) of FIG. 19, the mode switching unit 72 selects the normal mode when the brightness is predetermined threshold Th1 (first threshold) or greater, selects the intermediate mode when the brightness is less than the threshold Th1 and predetermined threshold Th2 (second threshold) or greater, and selects the night-vision mode when the brightness is less than the threshold Th2.

The imaging device 101 according to the present embodiment automatically switches the modes in such a manner as to select the normal mode by time t1 at which the brightness reaches the threshold Th1, select the intermediate mode in the period from time t1 to time t2 at which the brightness reaches the threshold Th2, and select the night-vision mode after time t2. In item (b) of FIG. 19, the intermediate mode may be either the first intermediate mode or the second intermediate mode, and the night-vision mode may be either the first night-vision mode or the second night-vision mode.

Although the brightness immediately before time t3 at which almost no visible light remains is defined as the threshold Th2 in item (a) of FIG. 19, the brightness at time t3 may be defined as the threshold Th2.

As shown in item (c) of FIG. 19, the mode switching unit 72 may divide the intermediate mode into two periods: a first half period toward time t1 as the first intermediate mode in which the amount of visible light is relatively high; and a second half period toward time t2 as the second intermediate mode in which the amount of visible light is relatively low. In item (c) of FIG. 19, the night-vision mode may be either the first night-vision mode or the second night-vision mode.

In the imaging device 101 according to the present embodiment, the projection controller 71 controls the ON/OFF state of the infrared projector 9, and the mode switching unit 72 switches the respective members in the image processing unit 5 between the active state and the inactive state, so as to implement the respective modes.

As shown in FIG. 20, the normal mode is a state where the infrared projector 9 is turned OFF, the surrounding pixel adding unit 521, the same-position pixel adding unit 522, and the synthesizing unit 523 are inactive, and the demosaicing unit 54 is active.

The first intermediate mode is implemented in a state where the infrared projector 9 is turned ON, the surrounding pixel adding unit 521 is inactive, and the same-position pixel adding unit 522, the synthesizing unit 523, and the demosaicing unit 54 are active. The second intermediate mode is implemented in a state where the infrared projector 9 is turned ON, the surrounding pixel adding unit 521 and the same-position pixel adding unit 522 are inactive, and the synthesizing unit 523 and the demosaicing unit 54 are active.

The same-position pixel adding unit 522 can be easily switched between the active state and the inactive state by appropriately setting the coefficients ka to ki in the formulae (1) to (3), as described above.

The first night-vision mode is implemented in a state where the infrared projector 9 is turned ON, and the surrounding pixel adding unit 521, the same-position pixel adding unit 522, the synthesizing unit 523, and the demosaicing unit 54 are all active. The second night-vision mode is implemented in a state where the infrared projector 9 is turned ON, the same-position pixel adding unit 522 is inactive, and the surrounding pixel adding unit 521, the synthesizing unit 523, and the demosaicing unit 54 are active.

The surrounding pixel adding unit 521 can be activated in the processing of adding the surrounding pixels by setting the coefficient to greater than 0 (for example, 1) by which the surrounding pixel data is multiplied in the calculation formula used for adding the surrounding pixel data to the pixel data of the target pixel.

The surrounding pixel adding unit 521 can be inactivated in the processing of adding the surrounding pixels by setting the coefficient to 0 by which the surrounding pixel data is multiplied in the calculation formula.

The surrounding pixel adding unit 521 thus can easily be switched between the active state and the inactive state by setting the coefficient as appropriate.

<First Modified Example of Imaging Device According to First Embodiment>

The method of detecting the environmental brightness by the controller 7 is not limited to the method based on the brightness level of the image signals.

Figure 21:
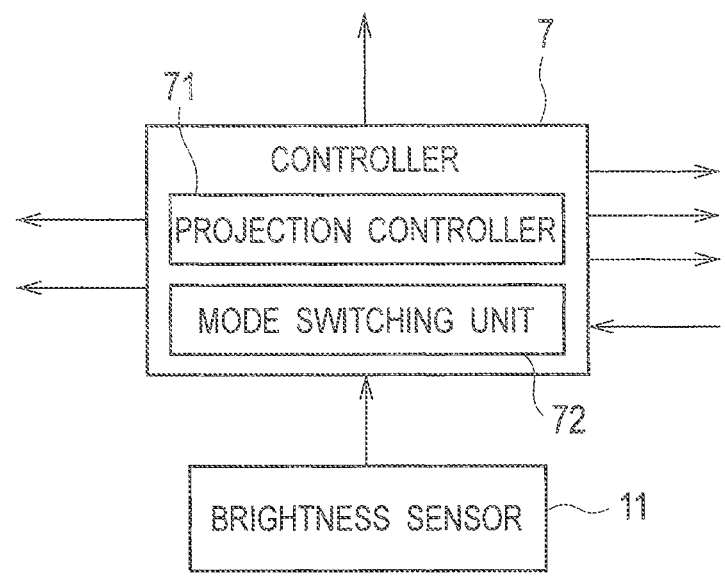
FIG. 21 is a partial block diagram showing a first modified example of the imaging device according to each embodiment.

As shown in FIG. 21, the environmental brightness may be detected by a brightness sensor 11. In FIG. 21, the environmental brightness may be determined based on both the brightness level of the image signals and the environmental brightness detected by the brightness sensor 11.

<Second Modified Example of Imaging Device According to First Embodiment>

The controller 7 may briefly estimate the environmental brightness based on the season (date) and the time (time zone) during a year, instead of the direct detection of the environmental brightness, so as to switch the modes by the mode switching unit 72.

Figure 22:
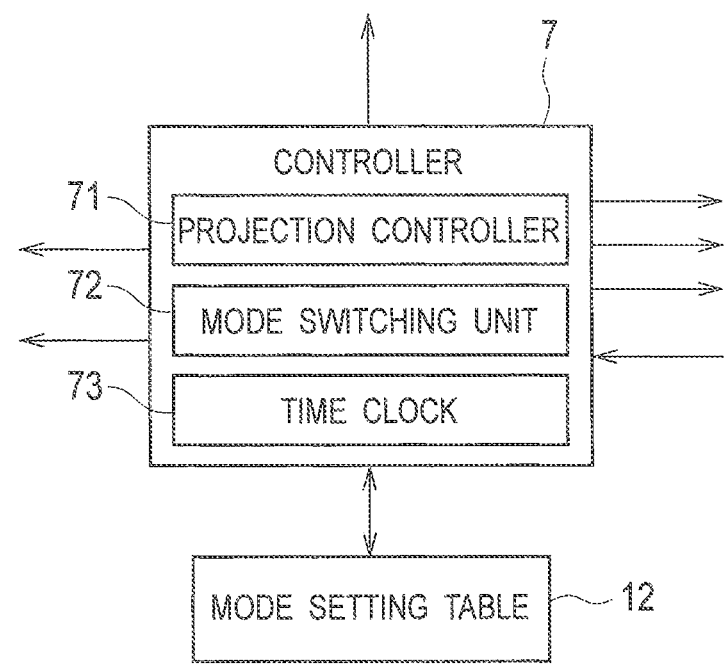
FIG. 22 is a partial block diagram showing a second modified example of the imaging device according to each embodiment.

As shown in FIG. 22, the normal mode, the intermediate mode, and the night-vision mode are set in a mode setting table 12 depending on the combination of the date and the time zone. A time clock 73 in the controller 7 manages the date and the time. The controller 7 refers to the date and the time indicated on the time clock 73 so as to read out the mode set in the mode setting table 12.

The projection controller 71 and the mode switching unit 72 control the imaging device so as to select the mode read from the mode setting table 12.

<Third Modified Example of Imaging Device According to First Embodiment>

Figure 23:
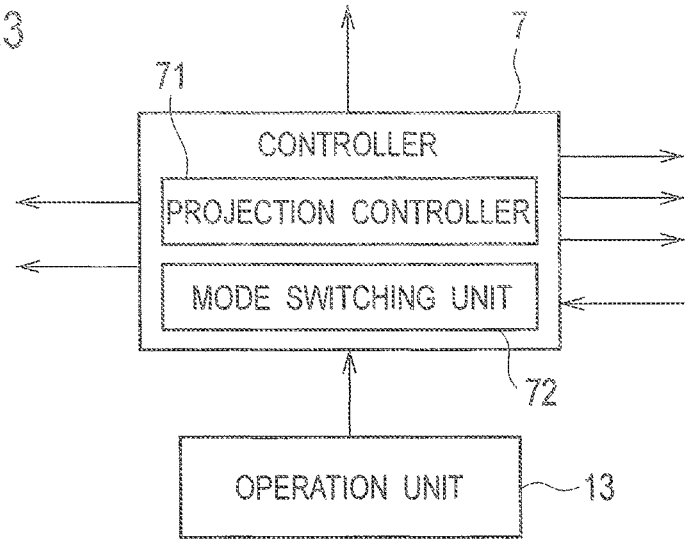
FIG. 23 is a partial block diagram showing a third modified example of the imaging device according to each embodiment.

As shown in FIG. 23, a user may control the imaging device with an operation unit 13 by manually selecting one of the modes, so as to set the projection controller 71 and the mode switching unit 72 to the selected mode. The operation unit 13 may be operated using the operation buttons provided on the casing of the imaging device or by a remote controller.

<Image Signal Processing Method>

The image signal processing method executed by the imaging device 101 shown in FIG. 1 is again described with reference to FIG. 24.

Figure 24:
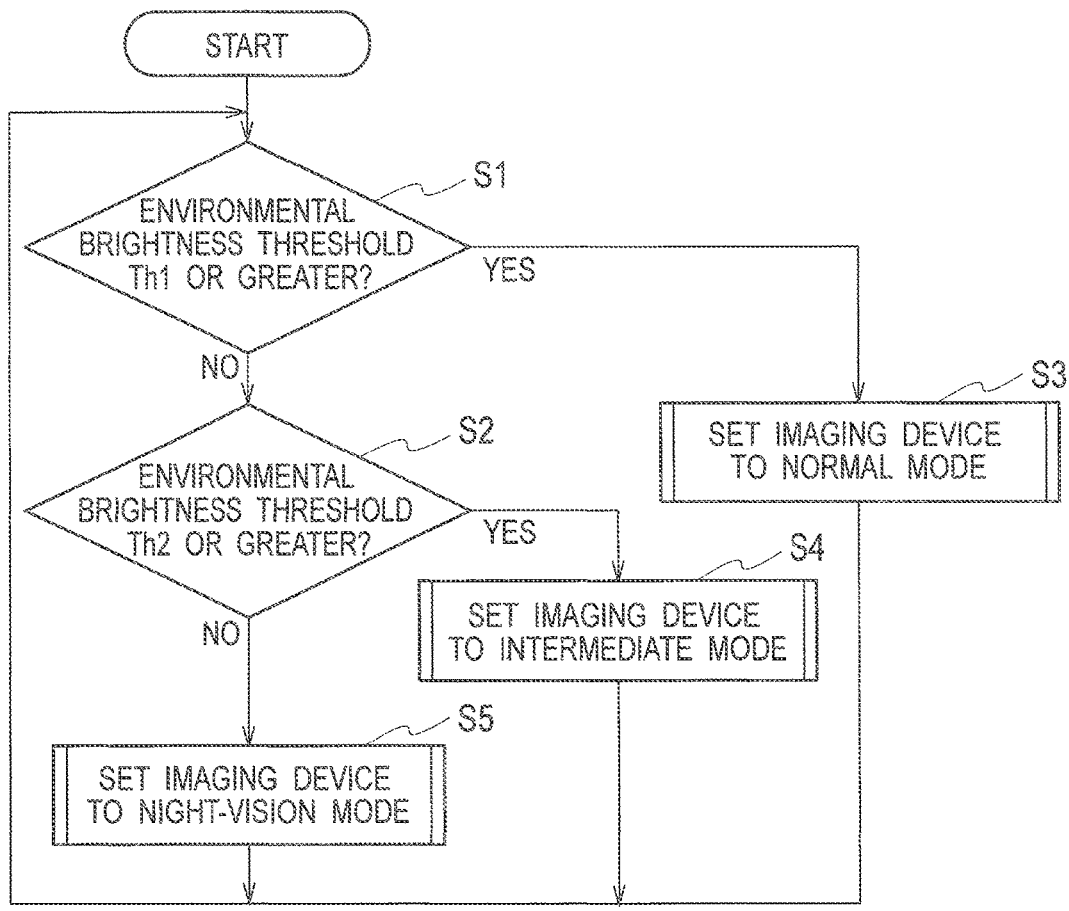
FIG. 24 is a flowchart showing an image signal processing method implemented by the imaging device according to each embodiment.

In FIG. 24, once the imaging device starts operating, the controller 7 determines in step S1 whether the environmental brightness is the threshold Th1 or greater. When the environmental brightness is the threshold Th1 or greater (YES), the controller 7 executes the processing in the normal mode in step S3. When the environmental brightness is not the threshold Th1 or greater (NO), the controller 7 determines in step S2 whether the environmental brightness is threshold Th2 or greater.

When the environmental brightness is the threshold Th2 or greater (YES), the controller 7 executes the processing in the intermediate mode in step S4. When the environmental brightness is not the threshold Th2 or greater (NO), the controller 7 executes the processing in the night-vision mode in step S5.

The controller 7 returns the processing to step S1 after executing the processing from steps S3 to S5, and repeats the respective following steps.

Figure 25:
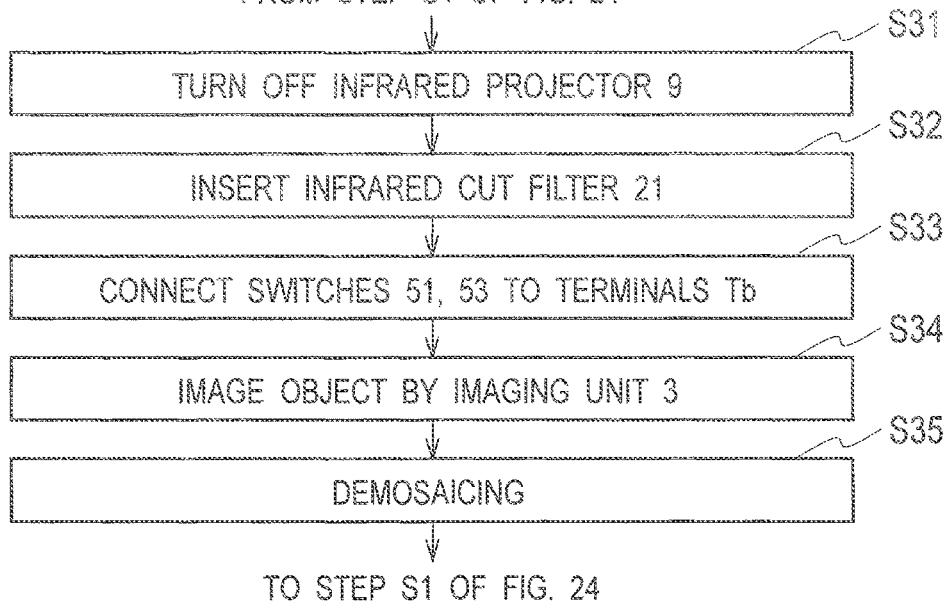
FIG. 25 is a flowchart showing a specific processing step in the normal mode shown in step S3 of FIG. 24.

FIG. 25 shows the specific processing in the normal mode in step S3. In FIG. 25, the controller 7 (the projection controller 71) turns off the infrared projector 9 in step S31. The controller 7 inserts the infrared cut filter 21 in step S32. The controller 7 (the mode switching unit 72) connects the switches 51 and 53 to the respective terminals Tb in step S33. The execution order from steps S31 to S33 is optional. The steps S31 to S33 can be executed simultaneously.

The controller 7 directs the imaging unit 3 to image an object in step S34. The controller 7 controls the image processing unit 5 in step S35 so that the demosaicing unit 54 subjects, to demosaicing, a frame composing image signals generated when the imaging unit 3 images the object.

Figure 26:
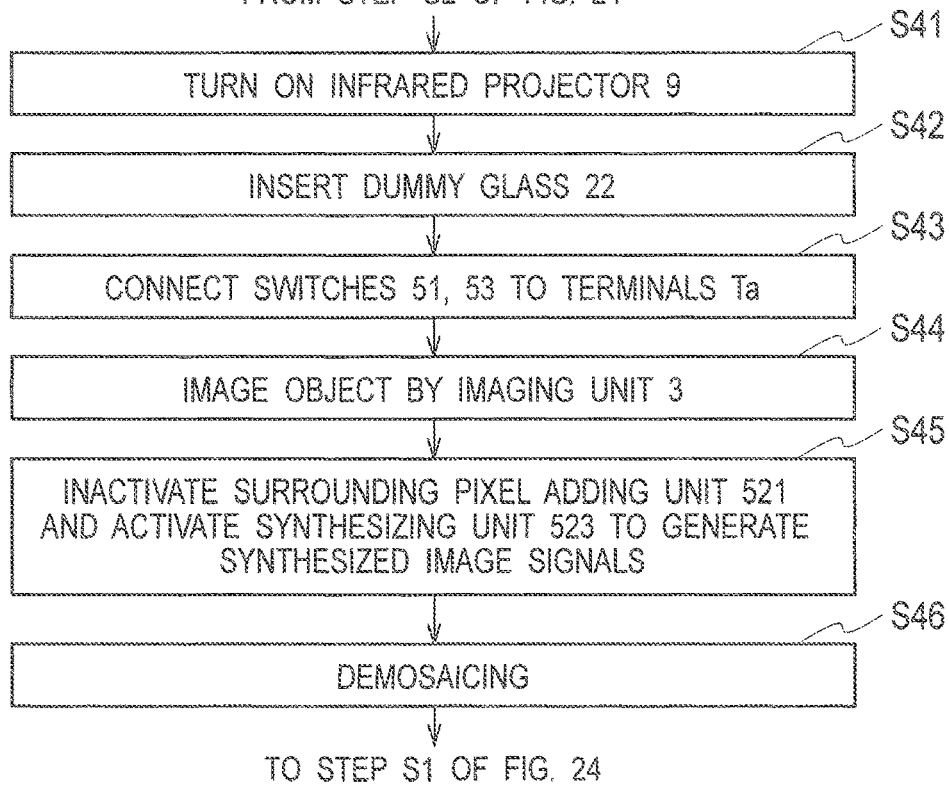
FIG. 26 is a flowchart showing a specific processing step in the intermediate mode shown in step S4 of FIG. 24.

FIG. 26 shows the specific processing in the intermediate mode in step S4. In FIG. 26, the controller 7 (the projection controller 71) turns on the infrared projector 9 in step S41 so that the projecting portions 91 to 93 project infrared light with the respective wavelengths IR1 to IR3 in a time division manner.

The controller 7 inserts the dummy glass 22 in step S42. The controller 7 (the mode switching unit 72) connects the switches 51 and 53 to the respective terminals Ta in step S43. The execution order from steps S41 to S43 is optional. The steps S41 to S43 may be executed simultaneously.

The controller 7 directs the imaging unit 3 to image an object in step S44. The imaging unit 3 images the object in a state where the infrared light with the wavelength IR1 assigned to R, the infrared light with the wavelength IR2 assigned to G, and the infrared light with the wavelength IR3 assigned to B, are each projected.

The controller 7 (the mode switching unit 72) controls the pre-signal processing unit 52 in step S45 so as to inactivate the surrounding pixel adding unit 521 and activate the synthesizing unit 523 to generate synthesized image signals.

The respective frames composing the image signals generated when the imaging unit 3 images the object in the state where the infrared light with the respective wavelengths IR1, IR2 and IR3 is projected, are defined as a first frame, a second frame, and a third frame.

The synthesizing unit 523 arranges the pixel data for the three primary colors based on the pixel data for R in the first frame, the pixel data for G in the second frame, and the pixel data for B in the third frame, so as to have the same array as the filter elements in the color filter 32. The synthesizing unit 523 thus generates the synthesized image signals in a manner such that the image signals in the first to third frames are synthesized in one frame.

The controller 7 controls the image processing unit 5 in step S46 so that the demosaicing unit 54 subjects the frame composing the synthesized image signals to demosaicing.

The demosaicing unit 54 executes, based on the frame of the synthesized image signals, demosaicing for generating an R frame, a G frame, and a B frame, so as to sequentially generate the frames of the three primary colors subjected to demosaicing.

The demosaicing unit 54 can generate the R frame by interpolating the pixel data for R in the pixel positions where no pixel data for R is present. The demosaicing unit 54 can generate the G frame by interpolating the pixel data for G in the pixel positions where no pixel data for G is present. The demosaicing unit 54 can generate the B frame by interpolating the pixel data for B in the pixel positions where no pixel data for B is present.

When executing the operations in the first intermediate mode, the controller 7 activates the same-position pixel adding unit 522 in step S45. When executing the operations in the second intermediate mode, the controller 7 inactivates the same-position pixel adding unit 522 in step S45.

Figure 27:
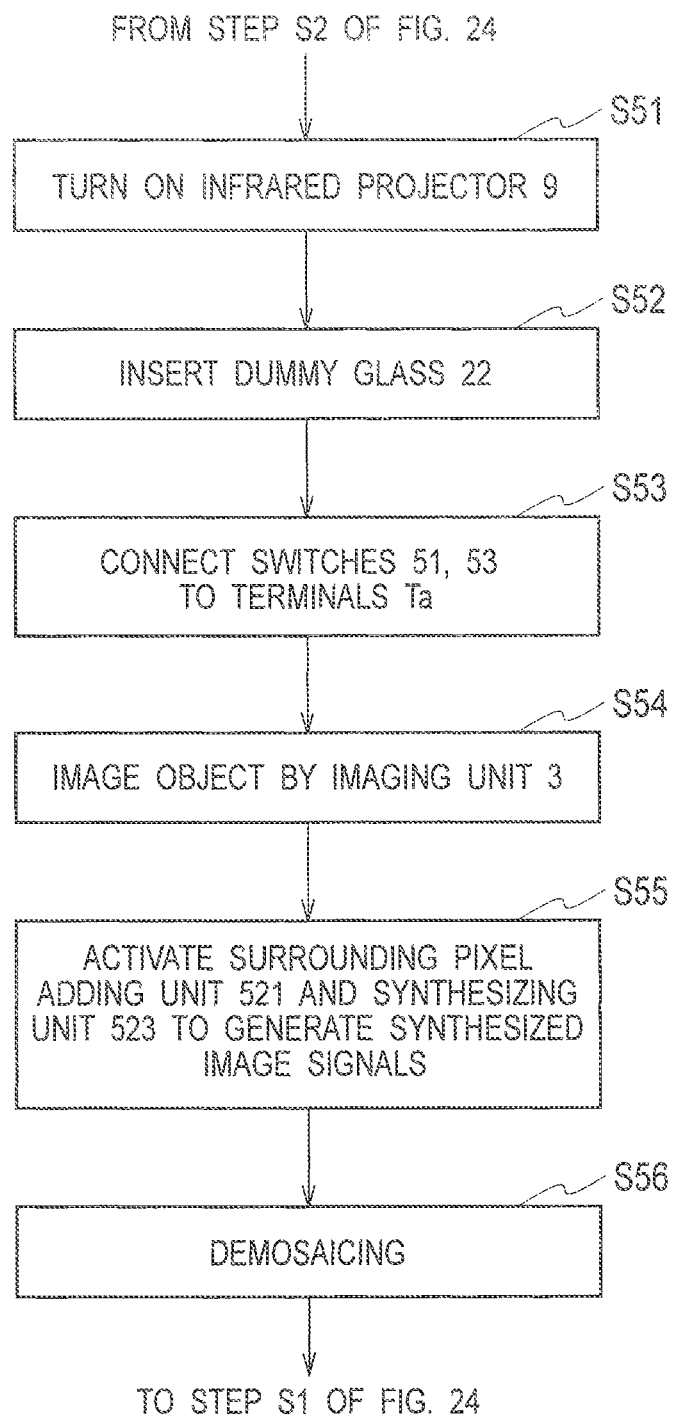
FIG. 27 is a flowchart showing a specific processing step in the night-vision mode shown in step S5 of FIG. 24.

FIG. 27 shows the specific processing in the night-vision mode in step S5. In FIG. 27, the controller 7 (the projection controller 71) turns on the infrared projector 9 in step S51 so that the projecting portions 91 to 93 project infrared light with the respective wavelengths IR1 to IR3 in a time division manner.

The controller 7 inserts the dummy glass 22 in step S52. The controller 7 (the mode switching unit 72) connects the switches 51 and 53 to the respective terminals Ta in step S53. The execution order from steps S51 to S53 is optional. The steps S51 to S53 may be executed simultaneously.

The controller 7 directs the imaging unit 3 to image an object in step S54. The controller 7 (the mode switching unit 72) controls the pre-signal processing unit 52 in step S55 so as to activate the surrounding pixel adding unit 521 and the synthesizing unit 523 to generate synthesized image signals.

The controller 7 controls the image processing unit 5 in step S56 so that the demosaicing unit 54 subjects the frame composing the synthesized image signals to demosaicing.

When executing the operations in the first night-vision mode, the controller 7 activates the same-position pixel adding unit 522 in step S55. When executing the operations in the second night-vision mode, the controller 7 inactivates the same-position pixel adding unit 522 in step S55.

<Image Signal Processing Program>

In FIG. 1, the controller 7 or the integrated portion of the image processing unit 5 and the controller 7 may be composed of a computer (microcomputer), and an image signal processing program (computer program) may be executed by the computer, so as to implement the same operations as those in the imaging device 101 described above.

Figure 28:
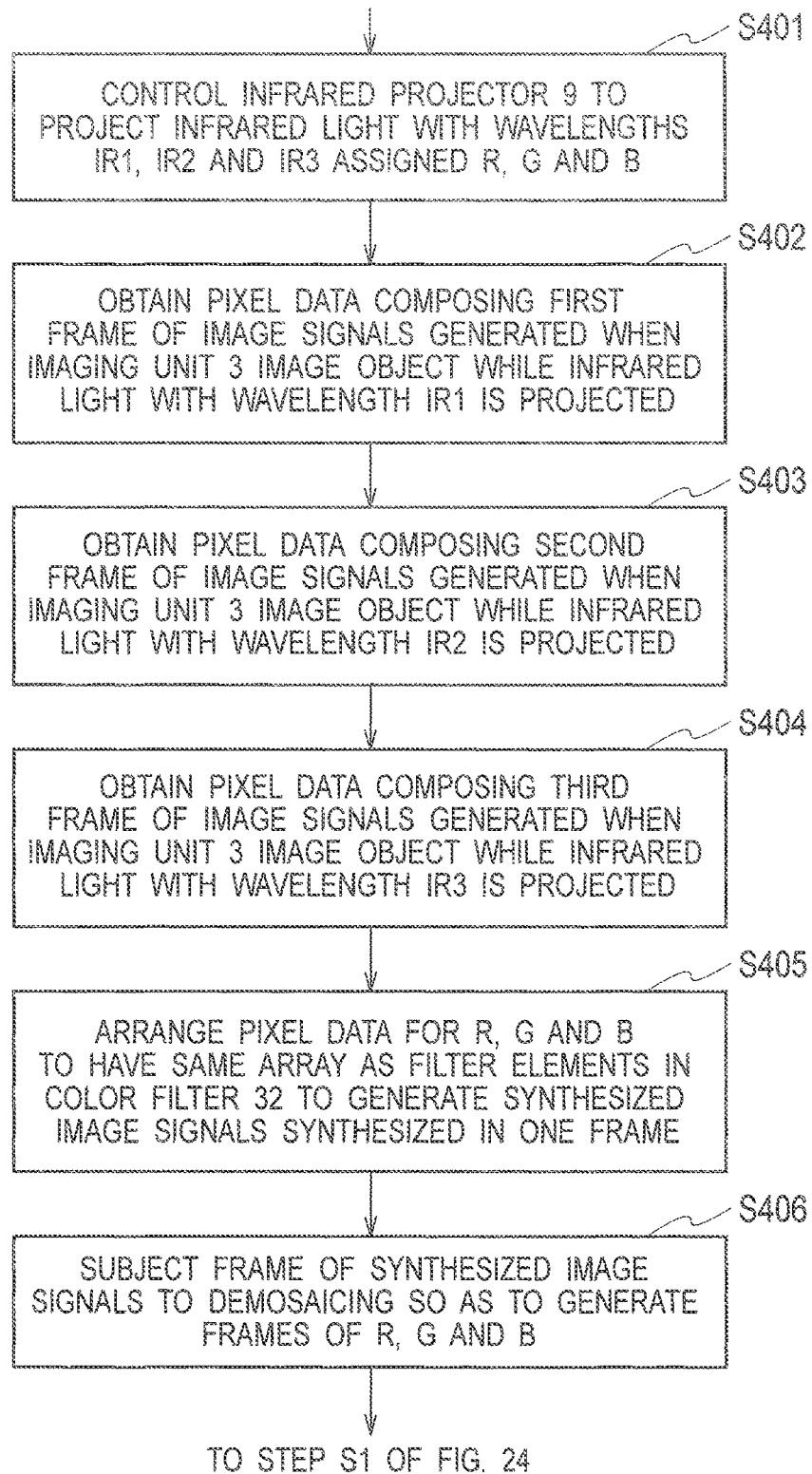
FIG. 28 is a flowchart showing a processing step in which an image signal processing program stored in the imaging device according to each embodiment instructs a computer to implement.

An example of a procedure of the processing executed by the computer when the processing in the intermediate mode executed in step S4 shown in FIG. 24 is included in the image signal processing program, is described below with reference to FIG. 28. FIG. 28 shows the processing executed by the computer instructed by the image signal processing program.

In FIG. 28, the image signal processing program instructs the computer to control the infrared projector 9 in step S401 to project infrared light with the wavelengths IR1, IR2, and IR3 assigned to R, G, and B, respectively.

The step in step S401 may be executed by an external unit outside of the image signal processing program. In FIG. 28, the step of inserting the dummy glass 22 is omitted. The step of inserting the dummy glass 22 may be executed by the external unit outside of the image signal processing program.

The image signal processing program instructs the computer in step S402 to obtain the pixel data composing the first frame of the image signals generated when the imaging unit 3 images the object in the state where the infrared light with the wavelength IR1 is projected.

The image signal processing program instructs the computer in step S403 to obtain the pixel data composing the second frame of the image signals generated when the imaging unit 3 images the object in the state where the infrared light with the wavelength IR2 is projected.

The image signal processing program instructs the computer in step S404 to obtain the pixel data composing the third frame of the image signals generated when the imaging unit 3 images the object in the state where the infrared light with the wavelength IR3 is projected. The execution order from steps S402 to 404 is optional.

The image signal processing program instructs the computer in step S405 to arrange the respective pixel data for R, G, and B in such a manner as to have the same array as the filter elements in the color filter 32, so as to generate the synthesized image signals synthesized in one frame.

In the intermediate mode, the image signal processing program does not instruct the computer to execute the processing of adding the surrounding pixels in step S405.

The image signal processing program instructs the computer in step S406 to subject the frame of the synthesized image signals to demosaicing, so as to generate the frames of R, G, and B.

Although not illustrated in the drawing, the image signal processing program may instruct the computer to execute the processing of adding the surrounding pixels in step S405 shown in FIG. 28 when the processing in the night-vision mode executed in step S5 shown in FIG. 24 is included in the image signal processing program.

The image signal processing program may be a computer program stored in a readable storage medium. The image signal processing program may be provided in a state of being stored in the storage medium, or may be provided via a network such as the Internet in a manner such that the image signal processing program is downloaded to the computer. The storage medium readable on the computer may be an arbitrary non-transitory storage medium, such as CD-ROM and DVD-ROM.

The imaging device configured as shown in FIG. 1 may include two or more sets of the respective members as necessary so as to execute the intermediate mode and the night-vision mode simultaneously. In such a case, the image output unit 6 may output both the image signals generated in the intermediate mode and the image signals generated in the night-vision mode.

The mode switching unit 72 may switch between a state where the image output unit 6 outputs the image signals generated in the intermediate mode and a state where the image output unit 6 outputs the image signals generated in the night-vision mode. In such a case, the mode switching unit 72 may switch the states depending on the environmental brightness or the time, as described above. In addition, the image processing unit 5 (image processing device) may be provided separately from the other members.

Further, the normal mode may be switched directly to the night-vision mode, or the night-vision mode may be switched directly to the normal mode, bypassing the intermediate mode.

When the imaging device does not include the intermediate mode, the imaging device may choose and use either the normal mode or the night-vision mode even under the condition that the intermediate mode is appropriate. Although fine color image signals are not obtained as compared with the case of using the intermediate mode, images can still be captured.

The imaging device equipped with the normal mode and the night-vision mode, without the intermediate mode, can also image objects under the condition that the environmental brightness varies, including the case where a surveillance camera captures objects throughout the day.

Further, the normal mode may be switched to the intermediate mode, and the intermediate mode may be switched to the normal mode, without using the night-vision mode. If the night-vision mode is constantly inactive, the night-vision mode may be eliminated from the imaging device.

The night-vision mode is not necessarily used in an area where, for example, electric lighting is equipped. The imaging device only equipped with the normal mode and the intermediate mode is applicable to the case where the night-vision mode is not necessarily used.

When the imaging device does not include the night-vision mode, the intermediate mode may be used instead, under the condition that the night-vision mode is appropriate. Although fine color image signals are not obtained as compared with the case of using the night-vision mode, images can still be captured.

The imaging device only equipped with the normal mode and the intermediate mode can also image objects in variable conditions of environmental brightness, as in the case described above.

<Method of Synchronizing Infrared Projecting Timing: First Example>

Figure 29:
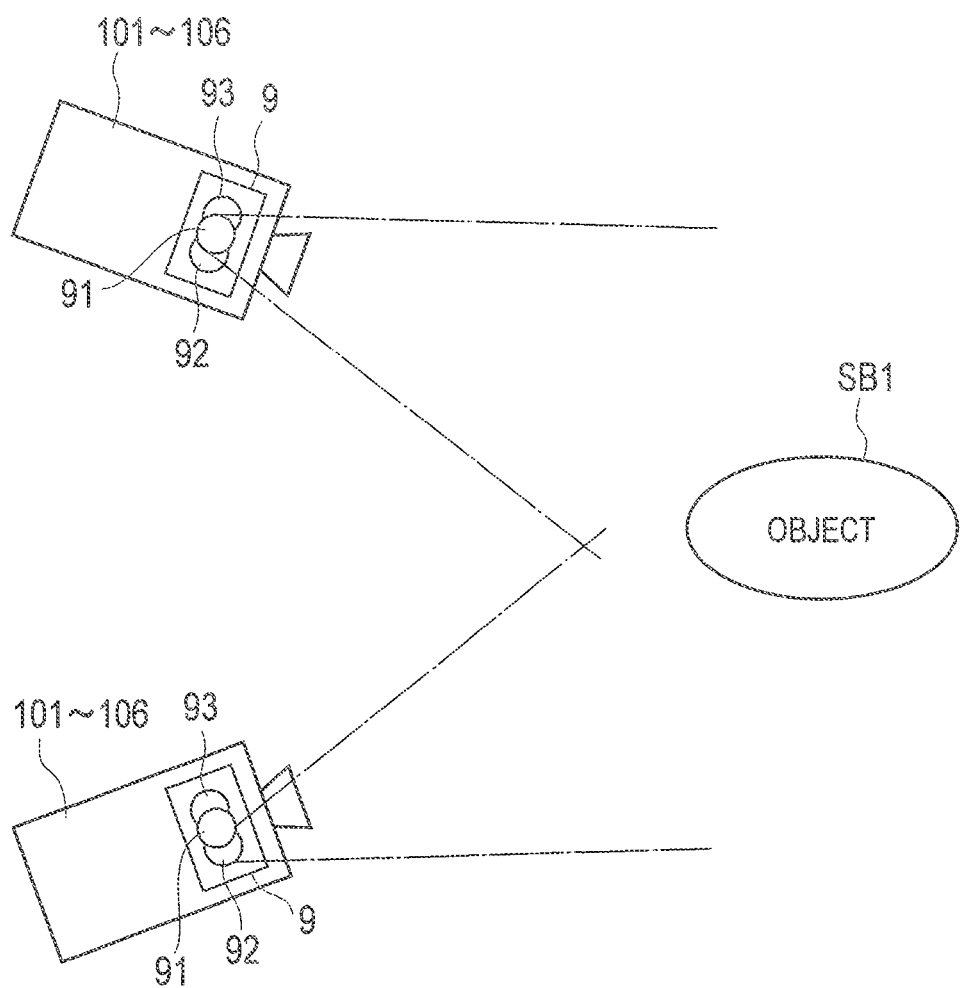
FIG. 29 is a block diagram showing an imaging system including a plurality of imaging devices.

Next, the imaging system including, for example, two imaging devices 101 set to the timing adjusting mode to image object SB1, as shown in FIG. 29, is described below. The timing adjusting mode is configured to synchronize the timings of projecting infrared light from the respective infrared projectors 9. The timing adjusting mode is preferably selected in the nighttime when the amount of visible light is small.

One of the two imaging devices 101 shown in FIG. 29 is defined as the first imaging device 101, and the other one is defined as the second imaging device 101. The two imaging devices 101 are connected to each other in a wired or wireless manner.

Figure 30:
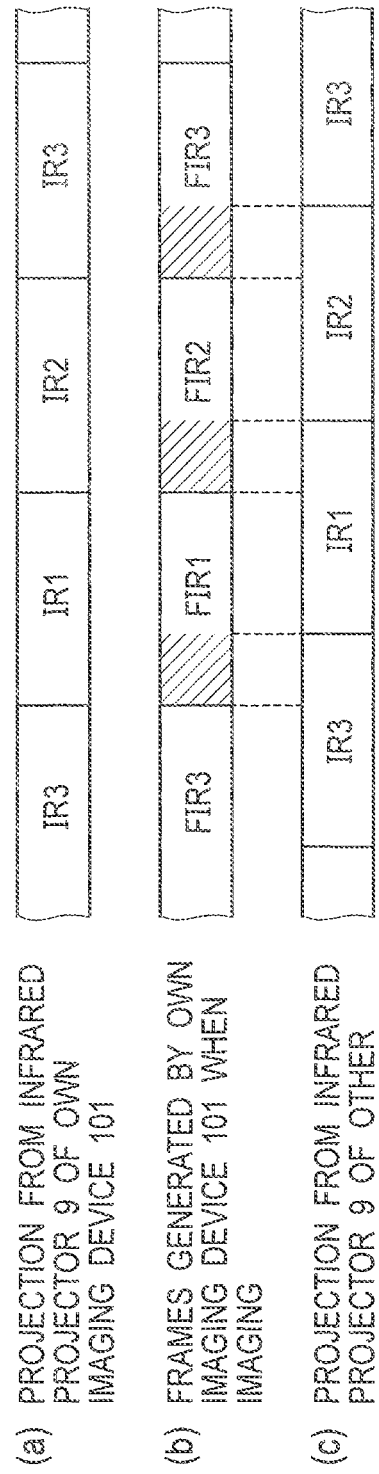
FIG. 30 is a view for describing a problem of a small time lag at the time of projecting infrared light by the plural imaging devices.

Item (a) of FIG. 30 shows infrared projection from the infrared projector 9 of the first imaging device 101, and item (c) of FIG. 30 shows infrared projection from the infrared projector 9 of the second imaging device 101. FIG. 30 shows a case where the phases of projecting the infrared light from the respective infrared projectors 9 of the two imaging devices 101 are not synchronized but are shifted from each other by a gap shorter than a period of projecting infrared light with a single wavelength. Item (b) of FIG. 30 shows exposure intervals of frames (hereinafter, simply referred to as "frames") generated by the first imaging device 100 during imaging.

Since the timings of projecting the infrared light from the respective infrared projectors 9 of the two imaging devices 101 do not conform to each other, mixed infrared light with two different wavelengths is projected during the hatched periods, as shown in item (b) of FIG. 30, which decreases color reproduction performance.

Figure 31:
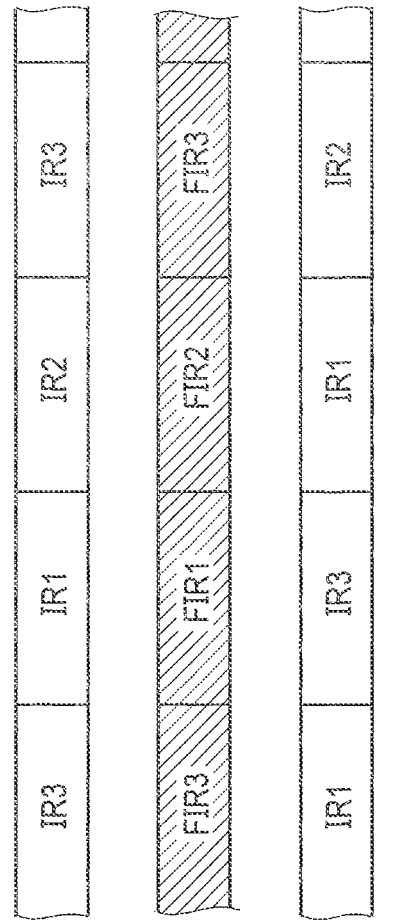
FIG. 31 is a view for describing a problem of a large time lag at the time of projecting infrared light by the plural imaging devices.

Item (a) of FIG. 31 shows infrared projection from the infrared projector 9 of the first imaging device 101, and item (c) of FIG. 31 shows infrared projection from the infrared projector 9 of the second imaging device 101. FIG. 31 shows a case where the phases of projecting the infrared light from the respective infrared projectors 9 of the two imaging devices 101 are not synchronized but shifted from each other by a period of projecting infrared light with a single wavelength. Item (b) of FIG. 31 shows frames generated by the first imaging device 100 during imaging.

Since the timings of projecting the infrared light from the respective infrared projectors 9 of the two imaging devices 101 are completely shifted from each other, mixed infrared light with two different wavelengths is projected in the whole period, as shown in item (b) of FIG. 31, which decreases color reproduction performance throughout.

Since mixed infrared light with different wavelengths is obtained when the respective infrared projectors of the two imaging devices individually project the infrared light, the imaging devices cannot capture color images of which color reproduction is appropriate.

The following are descriptions of a method of synchronizing the timings of projecting infrared light with wavelengths IR1, IR2, and IR3 from the respective infrared projectors 9 of the two imaging devices 101. Although FIG. 29 illustrates the two imaging devices 101, the imaging system may include more than two imaging devices.

Figure 32:
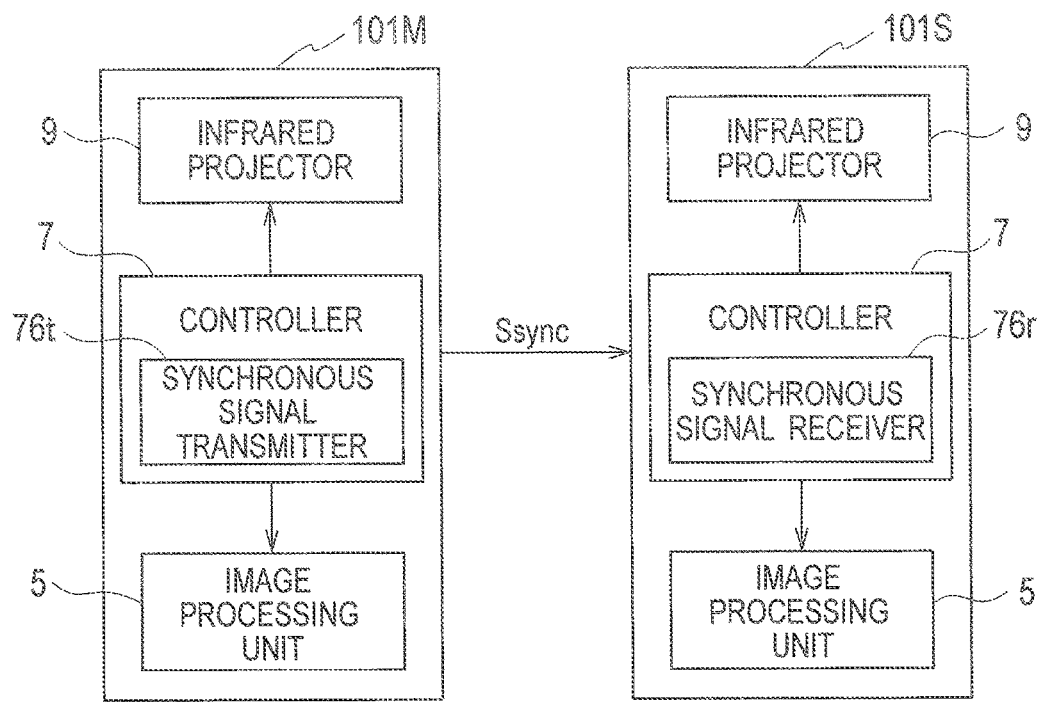
FIG. 32 is a block diagram schematically showing a state where one of the two imaging devices according to a first embodiment serves as a master device, and the other serves as a slave device.

FIG. 32 shows a case where the master/slave setting unit 74 determines that the first imaging device 101 serves as a master imaging device 101M, and the other imaging device 101 serves as a slave imaging device 101S. FIG. 32 schematically shows a configuration of the imaging devices 101 described above with reference to FIG. 1.

The synchronous signal transmitter 76t of the imaging device 101M transmits synchronous signal Ssync to the imaging device 101S. The synchronous signal receiver 76r of the imaging device 101S receives the synchronous signal Ssync. The controller 7 of the imaging device 101S controls the timing of projecting the infrared light with the wavelengths IR1, IR2, and IR3 according to the received synchronous signal Ssync.

The imaging device 101S generates a reference clock based on the received synchronous signal Ssync by use of a PLL circuit (not shown), for example. The imaging device 101S operates the respective components in accordance with the reference clock.

Figure 33:
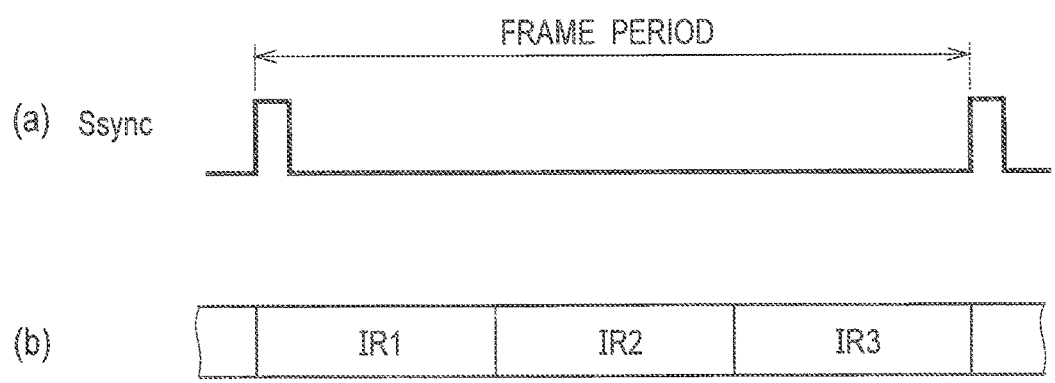
FIG. 33 is a view for describing an example of synchronous signals used in imaging devices according to first to third embodiments.

Item (a) of FIG. 33 shows an example of the synchronous signal Ssync which may be a pulse indicating the beginning of one frame period in which the infrared light with the wavelengths IR1, IR2, and IR3 is projected, as shown in item (b) of FIG. 33. The synchronous signal Ssync may therefore be a pulse of a frame cycle. The frame used herein is a frame of image signals output from the image output unit 6.

The synchronous signal Ssync may be a pulse indicating the beginning of each period in which infrared light with each of the wavelengths IR1, IR2, and IR3 is projected. The synchronous signal Ssync may be a pulse indicating the beginning of a period in which infrared light with one of the wavelengths IR1, IR2, and IR3 is projected. The synchronous signal Ssync is only required to be synchronized with a predetermined period (one frame period) in which infrared light with one or all of the wavelengths IR1, IR2, and IR3 is projected.

The synchronous signal Ssync may be synchronized with one or two periods of three divided periods obtained such that a predetermined period is divided into three. Alternatively, each of the several kinds of synchronous signals Ssync may be assigned to each of the three divided periods.

The supply of the synchronous signal Ssync from the imaging device 101M to the imaging device 101S can, in principle, synchronize the timings of projecting the infrared light with the wavelengths IR1, IR2, and IR3 from the respective infrared projectors 9.

Even through the imaging device 101M and the imaging device 101S are connected in a wired manner, there may still be a time lag between the timings because of a delay in the supply due to long wiring, or because of a difference of internal time delays between the two imaging devices 101.

In order to deal with such a time lag to increase the accuracy of synchronization, the projection of the infrared light is synchronized between the respective infrared projectors 9 such that the timing of projecting the infrared light from the imaging device 101M conforms to the timing of the projecting the infrared light from the imaging device 101S by the following manner.

When the imaging device 101M is set to the timing adjusting mode, the projection controller 71 controls the infrared projector 9 to project infrared light with only one of the wavelengths IR1, IR2, and IR3 in one period of the three divided periods to skip over the other two periods as shown in item (a) of FIG. 34. The wavelength of the infrared light projected may be any of the wavelengths IR1, IR2, and IR3. In the present embodiment, the infrared light with the wavelength IR1 is assumed to be projected.

When the imaging device 101S is set to the timing adjusting mode, the projection controller 71 controls the infrared projector 9 not to project the infrared light during the whole period. The imaging device 101S images the object SB1 and generates frames of image signals in the state where the infrared projector 9 of the imaging device 101M projects only the infrared light with a single wavelength, as shown in item (a) of FIG. 34.

When the imaging devices 101M and 101S are both set to the timing adjusting mode, the imaging device 101M may be arranged to face the imaging device 101S so that the infrared light is effectively projected from the infrared projector 9 of the imaging device 101M toward the imaging device 101S.

Item (b) of FIG. 34 shows a state where the timing of projecting the infrared light shown in item (a) of FIG. 34 conforms to the phase of the frames generated by the imaging device 101S during imaging. The frame FIR1 is a frame for R generated during the period in which the infrared light with the wavelength IR1 is projected. The frames IR2 and IR3 are frames for G and B generated during the periods when no infrared light is projected, although the infrared light with the wavelengths IR2 and IR3 would have been projected during the periods.

As shown in item (b) of FIG. 34, the frame FIR1 for R is bright, and the frames FIR2 and FIR3 for G and B are dark. Item (b) of FIG. 34 shows a state where the brightness level of the frame FIR1 for R evaluated by the brightness level determination unit 75 of the imaging device 101S is only high, and the brightness levels of the frames FIR2 and FIR3 for G and B are extremely low.

Item (c) of FIG. 34 shows a state where the phase of the frames is slightly delayed, and item (d) of FIG. 34 shows a state where the phase of the frames is slightly advanced.

When the phase is delayed as shown in item (c) of FIG. 34, the frame FIR3 for B is slightly dark, but brighter than that in item (b) of FIG. 34 because the projection of the infrared light with the wavelength IR1 starts during the period of generating the frame FIR3 for B. The brightness level of the frame FIR3 for B in item (c) of FIG. 34, evaluated by the brightness level determination unit 75, is therefore slightly higher than that in item (b) of FIG. 34.

When the phase is advanced as shown in item (d) of FIG. 34, the frame FIR2 for G is slightly dark, but brighter than that in item (b) of FIG. 34, because the imaging for generating the frame FIR2 for G in item (d) of FIG. 34 starts before the projection of the infrared light with the wavelength IR1 ends. The brightness level of the frame FIR2 for G in item (d) of FIG. 34, evaluated by the brightness level determination unit 75, is therefore slightly higher than that in item (b) of FIG. 34.

As shown in items (c) and (d) of FIG. 34, each indicating that the frame FIR1 for R is "slightly bright", the brightness level of the FIR1 for R is slightly darker than that in item (b) of FIG. 34.

Figure 35:
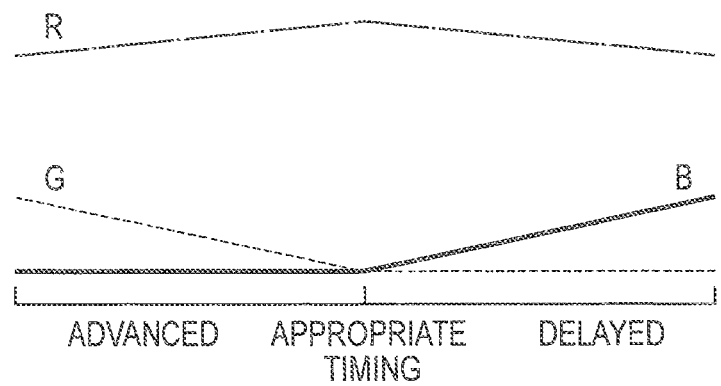
FIG. 35 is a characteristic diagram showing a change in the brightness level of R, G, and B depending on the time lag at the time of projecting infrared light in the first example of the operations of the master and slave devices.

The brightness level of each of R, G, and B varies, as shown in FIG. 35, depending on the timing of projecting the infrared light with the wavelength IR1 from the infrared projector 9 of the imaging device 101M, and the timing of generating the frames FIR1, FIR2, and FIR3 for R, G, and B by the imaging device 101S.

As shown in FIG. 35, the brightness level of R is high, and the brightness levels of G and B are both similarly low, when the timing of projecting the infrared light from the infrared projector 9 of the imaging device 101M appropriately conforms to the phase of the frames generated by the imaging device 101S during imaging. The phrase "similarly low" used herein means that both levels are substantially the same, allowing for a predetermined margin of error.

When the phase of the frames generated by the imaging device 101S during imaging is delayed with respect to the timing of projecting the infrared light from the infrared projector 9 of the imaging device 101M, the brightness level of B is higher than the brightness level of G. The brightness level of R decreases as the phase deviates from the appropriate timing.

When the phase of the frames generated by the imaging device 101S during imaging is advanced with respect to the timing of projecting the infrared light from the infrared projector 9 of the imaging device 101M, the brightness level of G is higher than the brightness level of B. The brightness level of R decreases as the phase deviates from the appropriate timing.

The brightness level determination unit 75 of the imaging device 101S analyzes the relationship of degrees between the brightness level of G and the brightness level of B. The controller 7 advances or delays depending on the relationship of degrees analyzed, the timing of operating the infrared projector 9 and the pre-signal processing unit 52 according to the synchronous signal Ssync for operating the imaging device 101S.

More particularly, when the brightness level of B is higher than the brightness level of G, the projection controller 71 controls the infrared projector 9 to advance the timing of projecting the infrared light with the wavelengths IR1, IR2, and IR3. In association with this control, the projection controller 71 also controls the pre-signal processing unit 52 to advance the timing of generating the frames FIR1, FIR2, and FIR 3 for R, G, and B.

When the brightness level of G is higher than the brightness level of B, the projection controller 71 controls the infrared projector 9 to delay the timing of projecting the infrared light with the wavelengths IR1, IR2, and IR3. In association with this control, the projection controller 71 also controls the pre-signal processing unit 52 to delay the timing of generating the frames FIR1, FIR2, and FIR 3 for R, G, and B.

The controller 7 (the projection controller 71) keeps controlling the infrared projector 9 and the pre-signal processing unit 52 until the brightness levels of G and B reach substantially the same value. The controller 7 stores an adjusted degree, obtained at the point when the brightness levels of G and B reach substantially the same value.

The imaging device 101S controls the respective components, so that the timing of operating the imaging device 101S is shifted by the adjusted degree stored in the timing adjusting mode once the timing adjusting mode is terminated.

As described above, the imaging system configured as shown in FIG. 29 can image the object SB1 while synchronizing the timings of projecting the infrared light from the respective infrared projectors 9 of the imaging devices 101M and 101S. Note that the brightness level of R may be adjusted to be maximized, under the condition that the brightness does not greatly vary.

<Method of Synchronizing Infrared Projecting Timing: Second Example>

The first example of the method of synchronizing the timings of projecting infrared light is illustrated by the case of conforming the timing of projecting infrared light from the infrared projector 9 of the imaging device 101S to the timing of projecting infrared light from the infrared projector 9 of the imaging device 101M, but the reverse is also possible.

The second example of the method of synchronizing the timings of projecting infrared light will be illustrated by the case of conforming the timing of projecting infrared light from the infrared projector 9 of the imaging device 101M to the timing of projecting infrared light from the infrared projector 9 of the imaging device 101S. The same elements as those in the first example are not described in the second example below.

When the imaging device 101S is set to the timing adjusting mode, the projection controller 71 controls the infrared projector 9 to project only the infrared light with the wavelength IR1 among the wavelengths IR1, IR2, and IR3, in one period of the three divided periods to skip over the other two periods, as shown in item (a) of FIG. 36.

When the imaging device 101M is set to the timing adjusting mode, the projection controller 71 controls the infrared projector 9 not to project the infrared light during the whole period. The imaging device 101M images the object SB1 and generates frames of image signals in the state where the infrared projector 9 of the imaging device 101S projects only the infrared light with the wavelength IR1, as shown in item (a) of FIG. 36.

Item (b) of FIG. 36 shows a state in which the timing of projecting the infrared light shown in item (a) of FIG. 36 conforms to the phase of the frames generated by the imaging device 101M during imaging. Item (c) of FIG. 36 shows a state where the phase of the frames is slightly delayed, and item (d) of FIG. 36 shows a state where the phase of the frames is slightly advanced.

Figure 37:
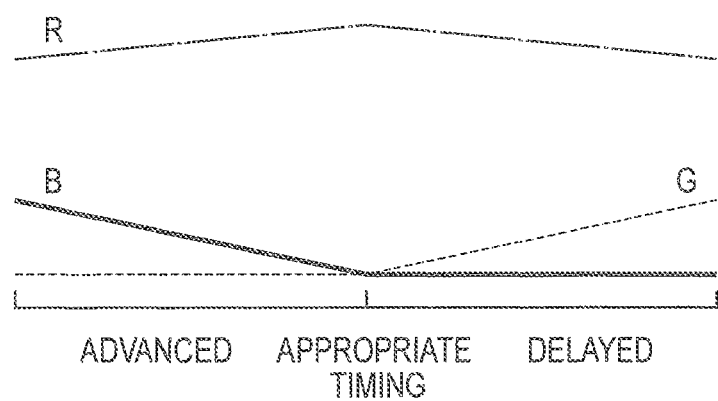
FIG. 37 is a characteristic diagram showing a change in the brightness level of R, G, and B depending on the time lag at the time of projecting infrared light in the second example of the operations of the master and slave devices.

The brightness level of each of R, G, and B in the second example varies, as shown in FIG. 37, depending on the timing of projecting the infrared light with the wavelength IR1 from the infrared projector 9 of the imaging device 101S, and the timing of generating the frames FIR1, FIR2, and FIR3 for R, G, and B by the imaging device 101M.

When the phase of the frames generated by the imaging device 101M during imaging is delayed with respect to the timing of projecting the infrared light from the infrared projector 9 of the imaging device 101S, as shown in FIG. 37, the brightness level of G is higher than the brightness level of B. The brightness level of R decreases as the phase deviates from the appropriate timing.

When the phase of the frames generated by the imaging device 101M during imaging is advanced with respect to the timing of projecting the infrared light from the infrared projector 9 of the imaging device 101S, the brightness level of B is higher than the brightness level of G. The brightness level of R decreases as the phase deviates from the appropriate timing.

The controller 7 of the imaging device 101M keeps controlling the infrared projector 9 and the pre-signal processing unit 52 until the brightness levels of G and B evaluated by the brightness level determination unit 75 reach substantially the same value. The controller 7 stores an adjusted degree, obtained at the point when the brightness levels of G and B reach substantially the same value.

The imaging device 101M controls the respective components so that the timing of operating the imaging device 101M is shifted by the adjusted degree stored in the timing adjusting mode once the timing adjusting mode is terminated.

As described above, the second example of conforming the timing of projecting infrared light from the infrared projector 9 of the imaging device 101M to the timing of projecting infrared light from the infrared projector 9 of the imaging device 101S can also synchronize the timings between the respective infrared projectors 9 of the imaging devices 101M and 101S. The second example is only applicable to the case when the two imaging devices are used.

The first and second examples exemplify the timing adjusting mode in which the imaging device 101M (or 101S) projects only the infrared light with the wavelength IR1, while the imaging device 101S (or 101M) images the object SB1 and generates the frames of the image signals in the state where the infrared projector 9 of the imaging device 101S (or 101M) does not project infrared light. Note that the brightness level of R may be adjusted to be maximized, under the condition that the brightness does not greatly vary.

Instead, the following may be applicable. The imaging device 101M (or 101S), serving as a base for the timing of projecting infrared light, projects the infrared light with the wavelengths IR1, IR2, and IR3 in a normal manner. The imaging device 101S (or 101M), in which the timing of projecting infrared light is adjusted, does not project infrared light but generates imaging signals in a state where the infrared cut filter 21 is inserted.

When the timing adjusting mode is selected at nighttime when the amount of visible light is small, the dummy glass 22 is inserted. However, the imaging device 101S (or 101M), generates imaging signals in the state where the infrared cut filter 21 is inserted instead of the dummy glass 22, so that the imaging device 101M (or 101S) serving as a base may project all the infrared light with the wavelengths IR1, IR2, and IR3.

For example, the projecting portion 91 is assumed to be a light-emitting diode (LED) that emits infrared light with a wavelength of 780 nm. The wavelength range of the light emitted from the LED partly overlaps with the wavelength range of visible light. Imaging in the state where the infrared cut filter 21 is inserted can therefore lead to substantially the same condition where only the infrared light with the wavelength IR1 is projected. Accordingly, the adjustment of the timing of projecting the infrared light is possible, as in the case of projecting only the infrared light with the wavelength IR1. Note that the wavelength IR1 is sufficiently short so as not to be cut by the infrared cut filter 21.

<Configuration and Operation of Imaging Device According to Second Embodiment>

Figure 38:
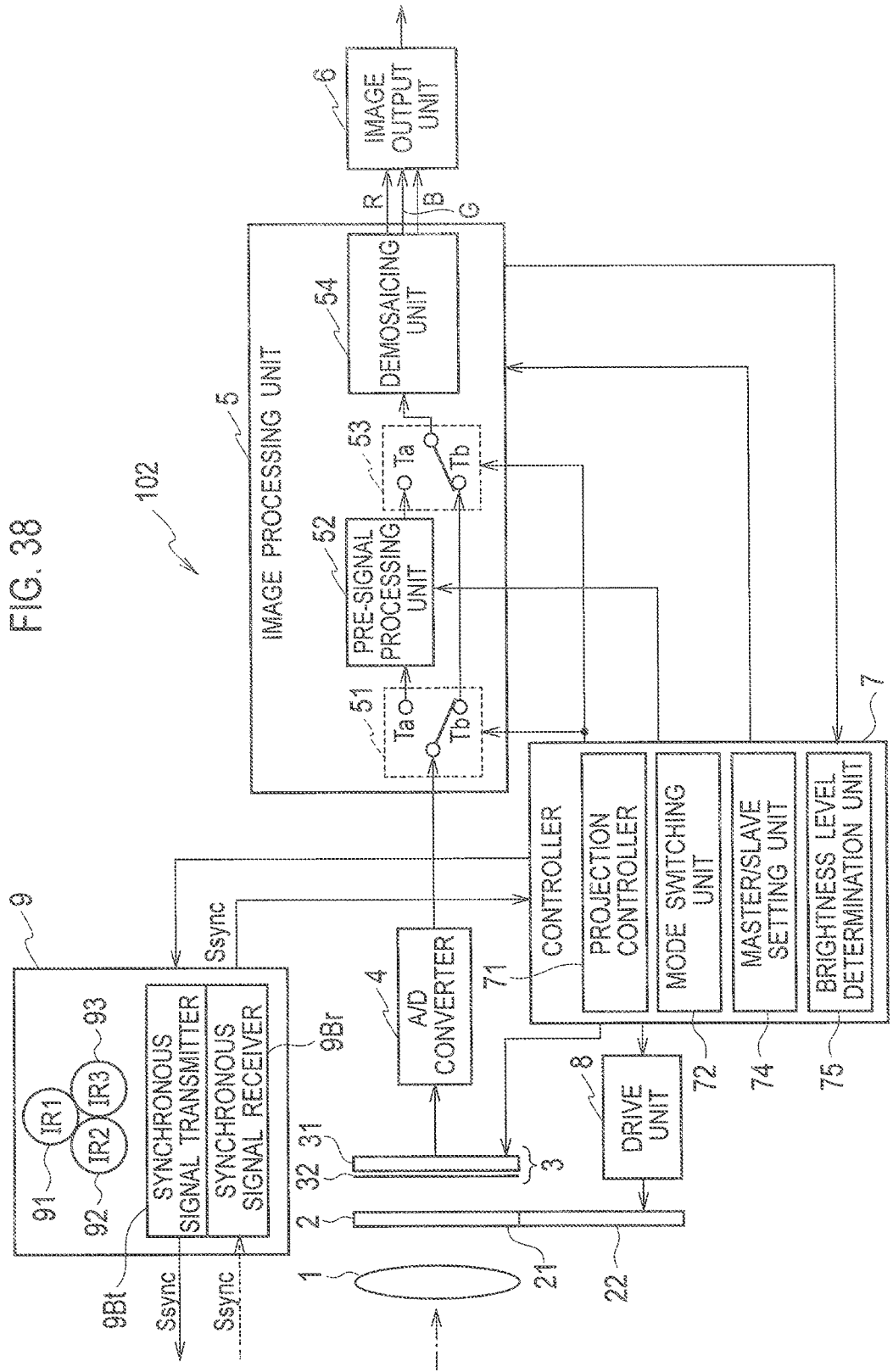
FIG. 38 is a block diagram showing an overall configuration of the imaging device of the second embodiment.

In the imaging device 102 according to the second embodiment as shown in FIG. 38, the same elements as those in the imaging device 101 according to the first embodiment, shown in FIG. 1, are designated by the same reference numerals, and the descriptions of the same elements are not repeated below. As shown in FIG. 29, the imaging system may include a plurality of imaging devices 102.

The imaging device 102 includes an infrared projector 9B instead of the infrared projector 9. The infrared projector 9B generates synchronous signal Ssync indicating the timing of projecting infrared light with wavelengths IR1, IR2, and IR3, and supplies the signal to the controller 7. The infrared projector 9B includes a synchronous signal transmitter 9Bt for transmitting the synchronous signal Ssync, and a synchronous signal receiver 9Br for receiving the synchronous signal Ssync.

The controller 7 of the imaging device 102 has the same configuration as the controller 7 of the imaging device 101, excluding the synchronous signal transmitter 76t and the synchronous signal receiver 76r.

Figure 39:
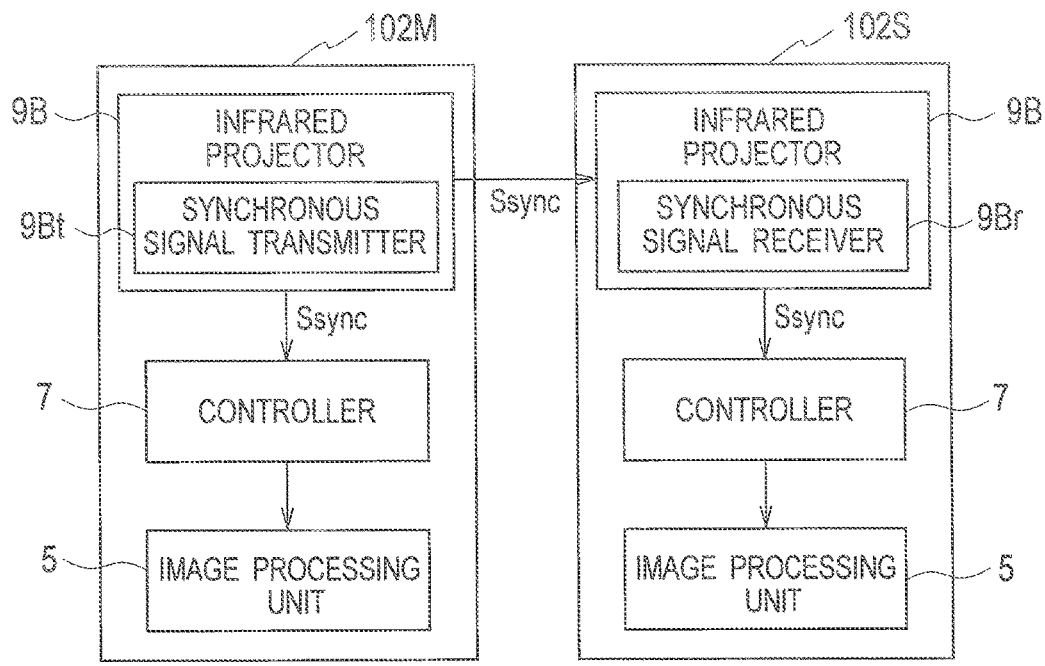
FIG. 39 is a block diagram schematically showing a state where one of the two imaging devices according to the second embodiment serves as a master device, and the other serves as a slave device.

FIG. 39 shows a case where the master/slave setting unit 74 determines that the first imaging device 102 serves as a master imaging device 102M, and the second imaging device 102 serves as a slave imaging device 102S. FIG. 39 schematically shows a configuration of the imaging devices 102, as described above with reference to FIG. 38.

The synchronous signal transmitter 9Bt of the imaging device 102M transmits the synchronous signal Ssync to the imaging device 102S. The synchronous signal receiver 9Br of the imaging device 102S receives the synchronous signal Ssync. As described above, with reference to item (a) of FIG. 33, the synchronous signal Ssync may be a pulse of a frame cycle, indicating the beginning of one frame period in which the infrared light with the wavelengths IR1, IR2, and IR3 is projected.

The imaging device 102S does not generate the synchronous signal Ssync by the own infrared projector 9B. The infrared projector 9B of the imaging device 102S supplies the received synchronous signal Ssync to the controller 7. The infrared projector 9B of the imaging device 102S projects the infrared light with the wavelengths IR1, IR2, and IR3 at the timing based on the received synchronous signal Ssync.

When the imaging device 102M and the imaging device 102S cause a time lag between the timings of projecting the infrared light with the wavelengths IR1, IR2, and IR3, the timings may be adjusted in the same manner as described above with reference to FIG. 34 to FIG. 37.

The projection of the infrared light is thus synchronized between the respective infrared projectors 9B such that the timing of projecting the infrared light from the imaging device 102M conforms to the timing of the projecting the infrared light from the imaging device 102S.

The first to third modified examples shown in FIG. 21 to FIG. 23 may also be applicable to the imaging device 102 according to the second embodiment. The same is applied to the following imaging devices 103 to 106 according to third to sixth embodiments described below.

<Configuration and Operation of Imaging Device According to Third Embodiment>

Figure 40:
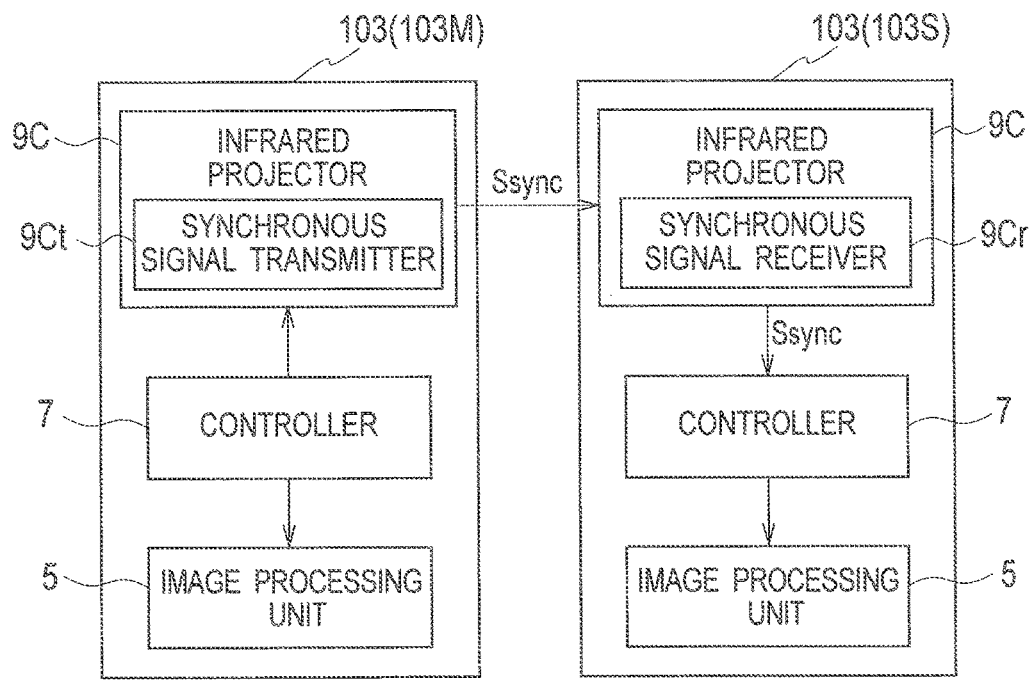
FIG. 40 is a block diagram showing a schematic configuration of the imaging device according to the third embodiment.

In the imaging device 103 according to the third embodiment shown in FIG. 40, the same elements as those in the imaging device 101 according to the first embodiment shown in FIG. 1 are designated by the same reference numerals, and the descriptions of the same elements are not repeated below. FIG. 40 schematically shows a configuration of the imaging devices 103.

As shown in FIG. 29, the imaging system may include a plurality of imaging devices 103. In FIG. 40, the first imaging device 103 is defined as a master imaging device 103M, and the second imaging device 103 is defined as a slave imaging device 103S.

The infrared projector 9C of the master imaging device 103M includes a synchronous signal transmitter 9Ct. The infrared projector 9C projects infrared light with wavelengths IR1, IR2, and IR3 according to the control by the controller 7. The synchronous signal transmitter 9Ct transmits synchronous signal Ssync indicating the timing of projecting the infrared light to the slave imaging device 103S.

The infrared projector 9C of the slave imaging device 103S includes a synchronous signal receiver 9Cr. The imaging device 103S supplies the received synchronous signal Ssync to the controller 7. The infrared projector 9C of the imaging device 103S projects infrared light with wavelengths IR1, IR2, and IR3, at the timing based on the received synchronous signal Ssync. The imaging device 103S may have the same configuration as the imaging device 102S, as shown in FIG. 39.

When the imaging device 103M and the imaging device 103S in the third embodiment cause a time lag between the timings of projecting the infrared light with the wavelengths IR1, IR2, and IR3, the projection of the infrared light is synchronized between the respective infrared projectors 9C such that the timings of projecting the infrared light conform to each other in the same manner as described above.

<Configuration and Operation of Imaging Device According to Fourth Embodiment>

Figure 41:
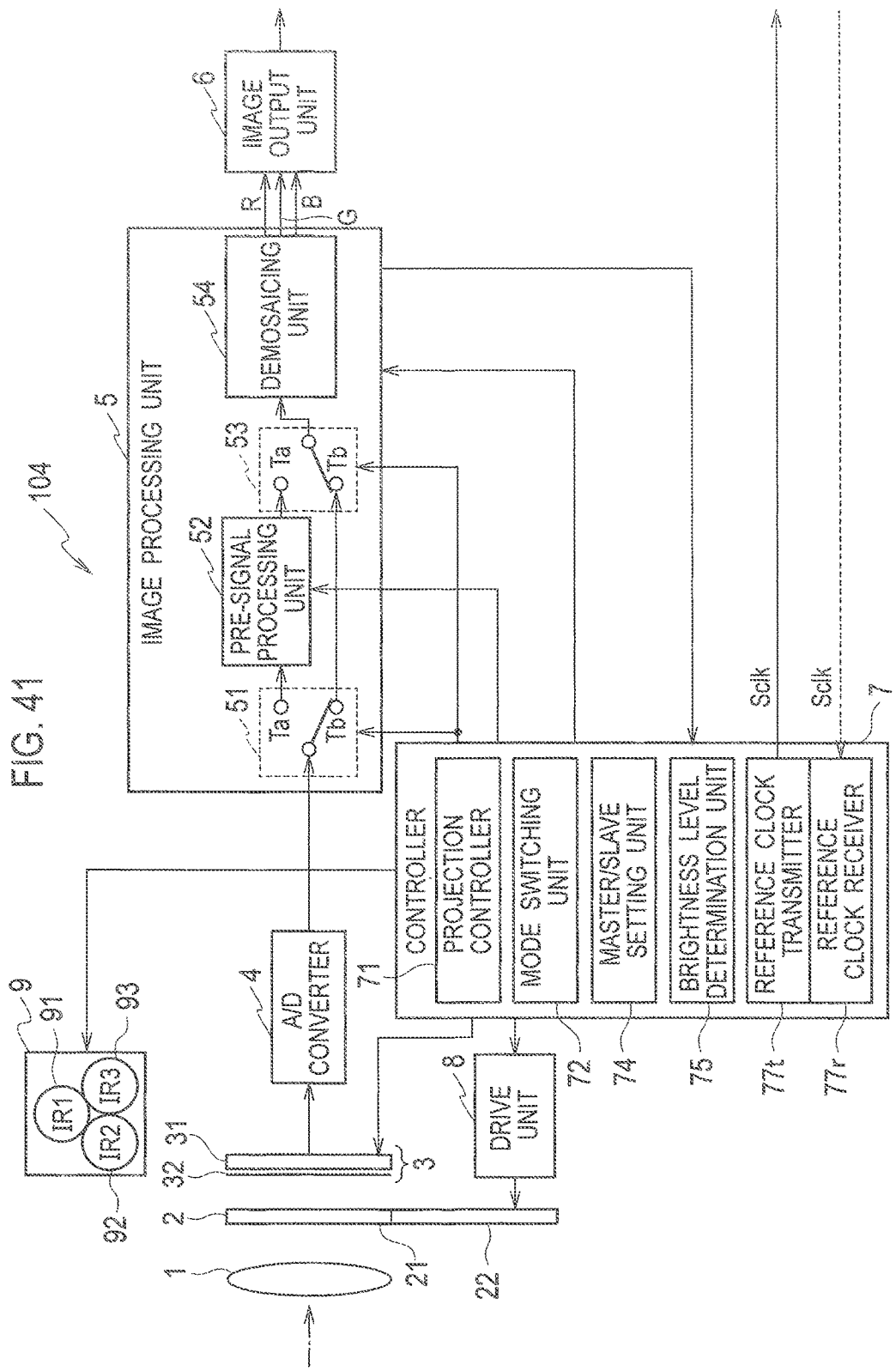
FIG. 41 is a block diagram showing an overall configuration of an imaging device according to a fourth embodiment.

In the imaging device 104 according to the fourth embodiment shown in FIG. 41, the same elements as those in the imaging device 101 of the first embodiment shown in FIG. 1 are designated by the same reference numerals, and the descriptions of the same elements are not repeated below. As shown in FIG. 29, the imaging system may include a plurality of imaging devices 104.

The controller 7 of the imaging device 104 includes a reference clock transmitter 77t and a reference clock receiver 77r instead of the synchronous signal transmitter 76t and the synchronous signal receiver 76r included in the controller 7 of the imaging device 101.

When the imaging device 104 serves as the master device, the reference clock transmitter 77t transmits reference clock Sclk to the other imaging device 104. The reference clock receiver 77r is in an inactive state at this time.

When the imaging device 104 serves as the slave device, the reference clock receiver 77r receives reference clock Sclk transmitted from the other imaging device 104 as the master device. The reference clock transmitter 77t is in an inactive state at this time.

Figure 42:
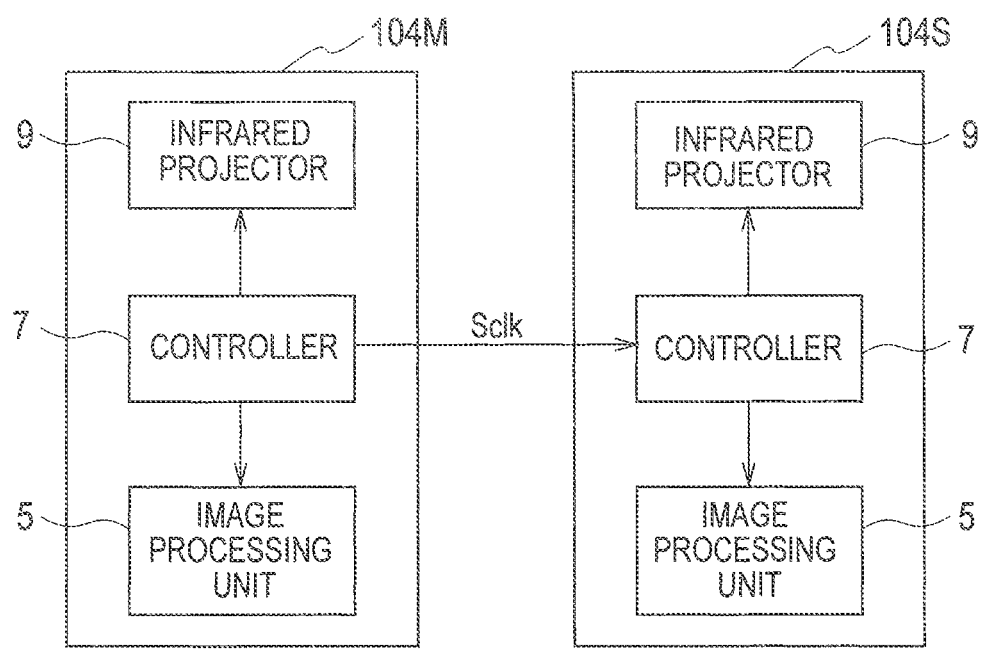
FIG. 42 is a block diagram schematically showing a state where one of the two imaging devices according to the fourth embodiment serves as a master device, and the other serves as a slave device.

FIG. 42 shows a case where the master/slave setting unit 74 determines that the first imaging device 104 serves as a master imaging device 104M, and the second imaging device 104 serves as a slave imaging device 104S. FIG. 42 schematically shows a configuration of the imaging devices 104 described above with reference to FIG. 41.

The reference clock transmitter 77t of the imaging device 104M transmits the reference clock Sclk to the imaging device 104S. The reference clock receiver 77r of the imaging device 104S receives the reference clock Sclk. The imaging devices 104M and 104S are operated while being synchronized with the common reference clock Sclk.

The reference clock Sclk may be a clock of 14.32 MHz, four times as high as a color subcarrier frequency (3.58 MHz) of an image signal, a reference signal called "Gen-Lock (Generator Lock)" used in a broadcasting studio or the like, or a clock of 27 MHz used for MPEG2. The reference clock Sclk is, however, not intended to be limited to these clocks.

The imaging devices 104M and 104S, operated according to the common reference clock Sclk, can be synchronized in terms of frequencies. However, the timings of projecting infrared light with wavelengths IR1, IR2, and IR3 from the respective infrared projectors 9 of the imaging devices 104M and 104S cannot be synchronized.

In view of the preceding, the imaging devices 104 according to the fourth embodiment are configured to be synchronized in the state where the timings of projecting the infrared light from the respective infrared projectors 9 of the imaging devices 104M and 104S conform to each other when the imaging devices 104M and 104S are set to the timing adjusting mode.

FIG. 43 shows a relationship between the timing of projecting the infrared light from the infrared projector 9 of the imaging device 104M, and the phase of the frames generated by the imaging device 104S during imaging, as in the case of FIG. 34. Item (b) of FIG. 43 shows a state in which the timing of projecting the infrared light shown in item (a) of FIG. 43 conforms to the phase of the frames. Item (c) of FIG. 43 shows a state in which the phase of the frames is slightly delayed.

In the imaging device 104 according to the fourth embodiment, as shown in item (d) of FIG. 43, the phase of the frames may be greatly advanced or delayed.

Figure 44:
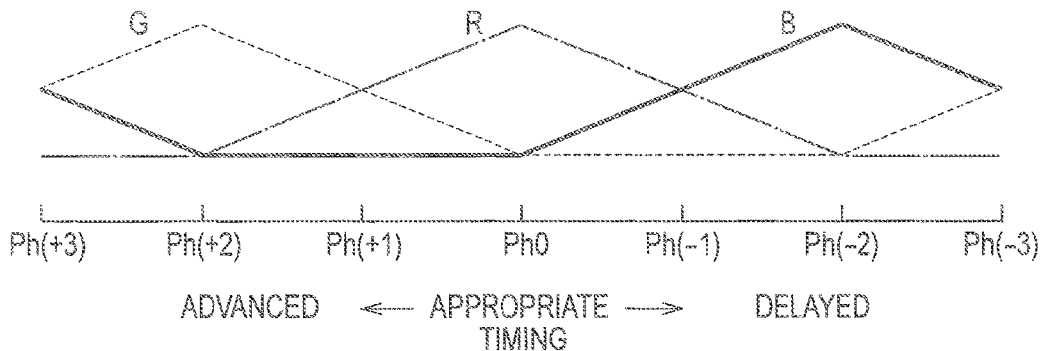
FIG. 44 is a characteristic diagram showing a change in the brightness level of R, G, and B depending on the time lag at the time of projecting infrared light when the imaging devices according to the fourth to sixth embodiments are set to the timing adjusting mode.

The brightness level of each of R, G, and B varies in the fourth embodiment as shown in FIG. 44, depending on the timing of projecting the infrared light with the wavelength IR1 from the infrared projector 9 of the imaging device 104M, and the timing of generating the frames FIR1, FIR2, and FIR3 for R, G, and B by the imaging device 104S.

The characteristic diagram of FIG. 35 corresponds to part of FIG. 44 only showing the region around the appropriate timing. The first to third embodiments are only required to solve the problem of a slight time lag between the timings because of delay due to long wiring, or because of a difference of internal time delays. The fourth embodiment, however, may require a great deal of timing adjustment, as shown in FIG. 44, since the fourth embodiment merely achieves the synchronization in terms of frequencies.

Figure 45:
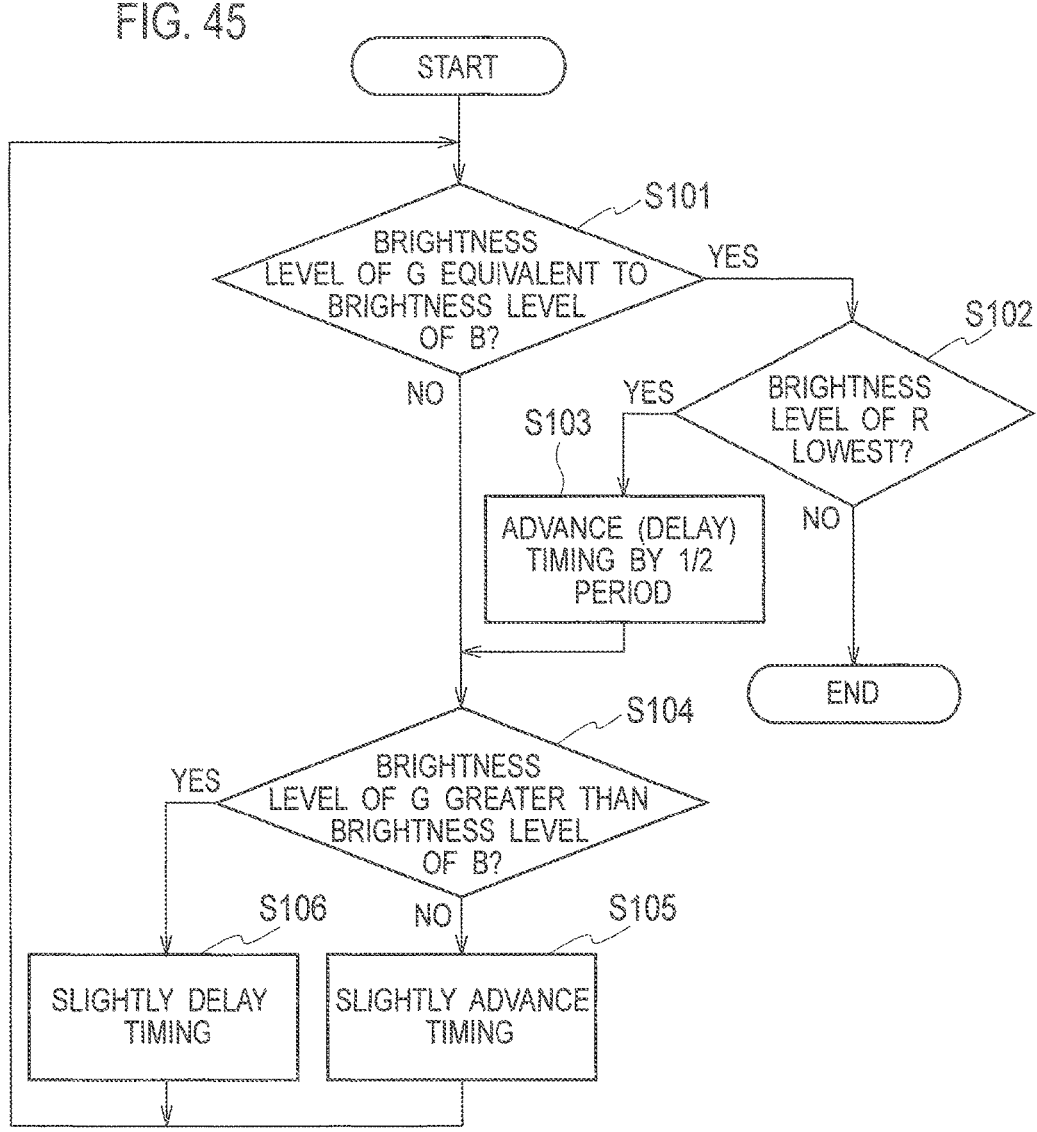
FIG. 45 is a flowchart showing a method of adjusting the timing of projecting infrared light implemented when the imaging devices according to the fourth to sixth embodiments are set to the timing adjusting mode.

The processing of timing adjustment by the controller 7 is described below with reference to the flowchart shown in FIG. 45. As shown in FIG. 45, the controller 7 (the brightness level determination unit 75) determines in step S101 if the brightness level of G is equivalent to the brightness level of B.

The expression "the levels are equivalent" refers to a state in which both brightness levels are located at a position of Ph0 where the phase is in a consonant and appropriate state, a position of Ph(−3) where the phase is delayed, or a position of Ph(+3) where the phase is advanced.

When both brightness levels are equivalent (YES), the controller 7 determines in step S102 if the brightness level of R is lowest. When the brightness level of R is not lowest (NO), the process ends, since the brightness level of R is in the appropriate state at the position of Ph0.

When the brightness level of R is lowest (YES) in step S102, the controller 7 (the projection controller 71) advances or delays the timing by a ½ period in step S103 since the brightness level of R is located at the position of Ph(−3) or Ph(+3), and there is a time lag of a ½ period (delayed or advanced).

When the brightness levels of G and B are not equivalent (NO) in step S101, the controller 7 proceeds to step S104. The controller 7 also proceeds to step S104 when finishing the process of step S103.

The controller 7 determines in step S104 if the brightness level of G is higher than the brightness level of B. When the brightness level of G is higher than the brightness level of B (YES), the controller 7 slightly delays the timing, and returns to step S101. When the brightness level of G is not higher than the brightness level of B (NO), the controller 7 slightly advances the timing, and returns to step S101.

By repeating the process from step S101 to S106 as described above, the imaging devices 104M and 104S can be synchronized in the state where the timings of projecting the infrared light from the respective infrared projectors 9 of the imaging devices 104M and 104S conform to each other.

The imaging device 104S controls the respective components so that the timing of operating the imaging device 104S is shifted by an adjusted degree stored in the timing adjusting mode once the timing adjusting mode is terminated.

Alternatively, the reference clock may be output from another device separated from the imaging devices so that the respective imaging devices receive the reference clock therefrom. For example, a switcher for switching and displaying images of the plural imaging devices may generate and output the reference clock. The imaging device for outputting the reference clock may be separated from the imaging device serving as the master device and operating in the timing adjusting mode.

<Configuration and Operation of Imaging Device According to Fifth Embodiment>

Figure 46:
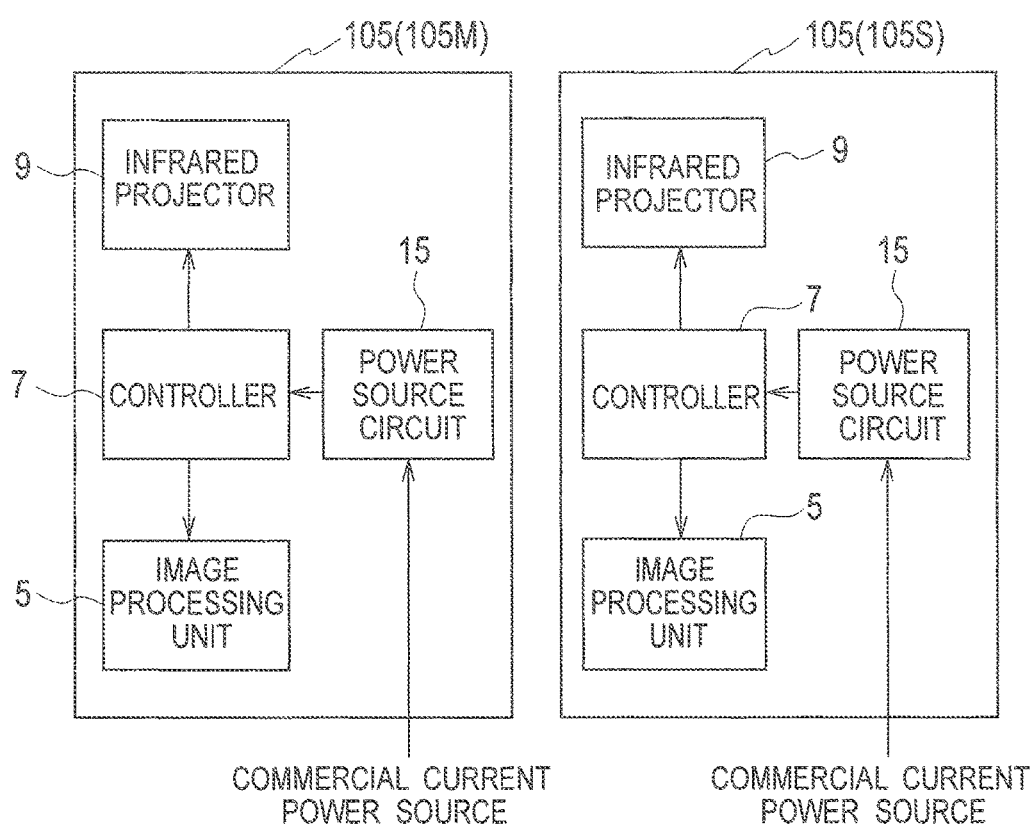
FIG. 46 is a block diagram showing a schematic configuration of the imaging device according to the fifth embodiment.

In the imaging device 105 according to the fifth embodiment shown in FIG. 46, the same elements as those in the imaging device 101 of the first embodiment shown in FIG. 1 are designated by the same reference numerals, and the descriptions of the same elements are not repeated below. As shown in FIG. 29, the imaging system may include a plurality of imaging devices 105.

The imaging device 105 includes a power source circuit 15 that supplies electric power necessary for the respective components of the imaging device 105 from a commercial current power source. The imaging device 105 operates by generating a reference clock synchronized with a frequency of an AC voltage. Accordingly, the master imaging device 105M and the slave imaging device 105S can be synchronized in terms of frequencies.

The imaging device 105S adjusts the timing of projecting infrared light from the infrared projector 9 in the same manner as in the fourth embodiment. Accordingly, the imaging devices 105M and 105S can be synchronized in a state where the timings of projecting the infrared light from the respective infrared projectors 9 of the imaging devices 105M and 105S conform to each other.

<Configuration and Operation of Imaging Device According to Sixth Embodiment>

Figure 47:
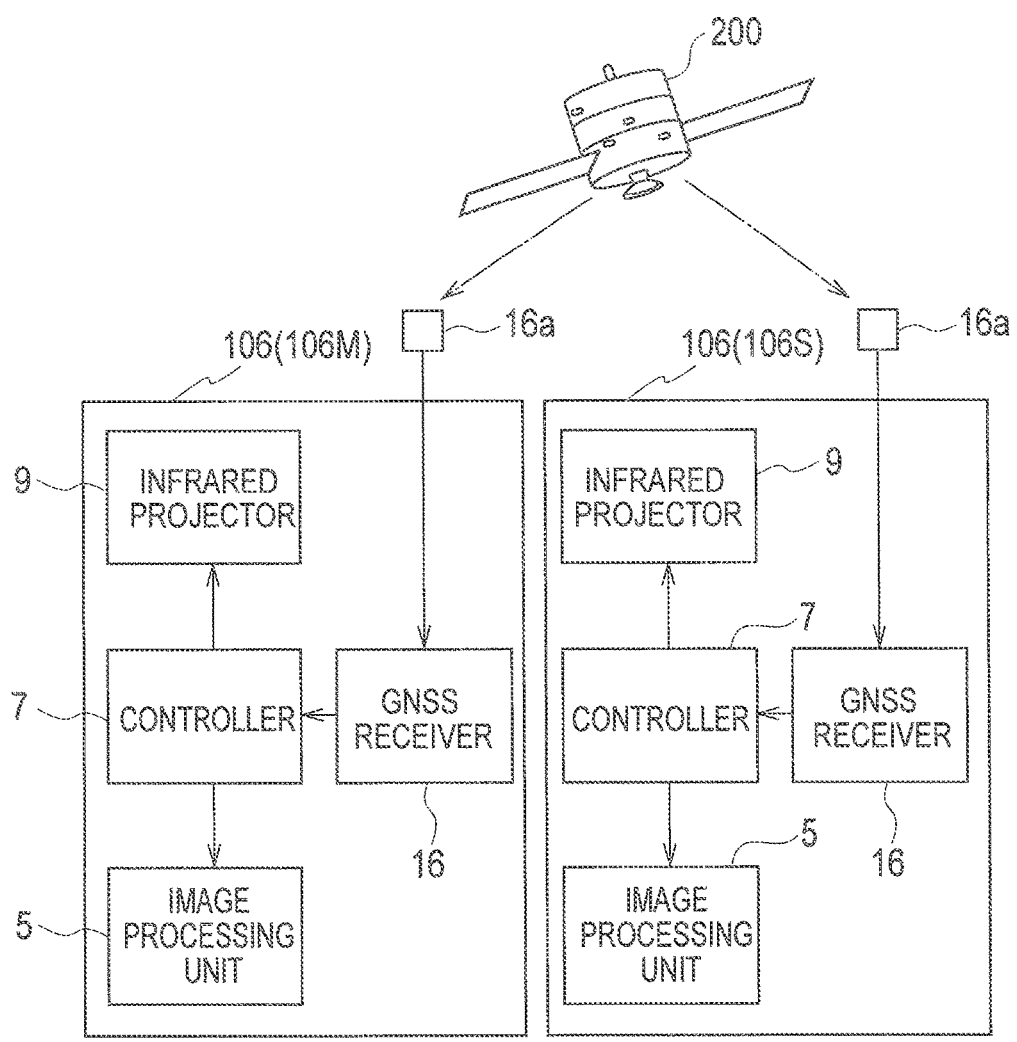
FIG. 47 is a block diagram showing a schematic configuration of the imaging device according to the sixth embodiment.

In the imaging device 106 according to the sixth embodiment shown in FIG. 47, the same elements as those in the imaging device 101 according to the first embodiment shown in FIG. 1 are designated by the same reference numerals, and the descriptions of the same elements are not repeated below. As shown in FIG. 29, the imaging system may include a plurality of imaging devices 106.

The imaging device 106 includes an antenna 16a that receives radio waves from a satellite 200 for a global navigation satellite system (GNSS), and a GNSS receiver 16 that receives GNSS signals output from the antenna 16a. The GNSS signals are RF signals in general. The GNSS is a global positioning system (GPS) in general.

The GNSS receiver 16 generates a clock signal based on time information included in the radio waves from the satellite 200. The time information transmitted from the satellite 200 is synchronized accurately with an atomic clock installed in the satellite 200. The GNSS receiver 16 supplies the clock signal accurately synchronized with the atomic clock to the controller 7. The controller 7 uses the clock signal as a reference clock. The controller 7 operates the imaging device 106 according to the reference clock.

Accordingly, the master imaging device 106M and the slave imaging device 106S can be synchronized in terms of frequencies.

The imaging device 106S adjusts the timing of projecting infrared light from the infrared projector 9 in the same manner as in the fourth embodiment. Accordingly, the imaging devices 106M and 106S can be synchronized in a state where the timings of projecting the infrared light from the respective infrared projectors 9 of the imaging devices 105M and 105S conform to each other.

<Configuration and Operation of Imaging Device According to Seventh Embodiment>

The imaging devices 104 to 106 according to the fourth to sixth embodiments are premised on the synchronization in terms of frequencies according to the common reference clock. The seventh embodiment does not use a common reference clock for a plurality of imaging devices. The imaging devices according to the seventh embodiment each independently include a reference clock generation source for generating an accurate reference clock.

An example of the reference clock generation source for generating an accurate reference clock is a crystal oscillator.

The imaging devices according to the seventh embodiment periodically adjust the timings of projecting infrared light so as to conform to each other in the same manner as in the fourth embodiment. A time interval for adjusting the timings of projecting the infrared light from the plural imaging devices may be determined depending on the allowable range of time lag of the timings.

When high color reproduction performance is required, the time interval is preferably minimized, since the allowable range of the phase difference decreases. The time interval may be set relatively long when not quite high color reproduction performance is required, since the allowable range of the phase difference increases.

<Configuration and Operation of Imaging Device According to Eighth Embodiment>

Figure 48:
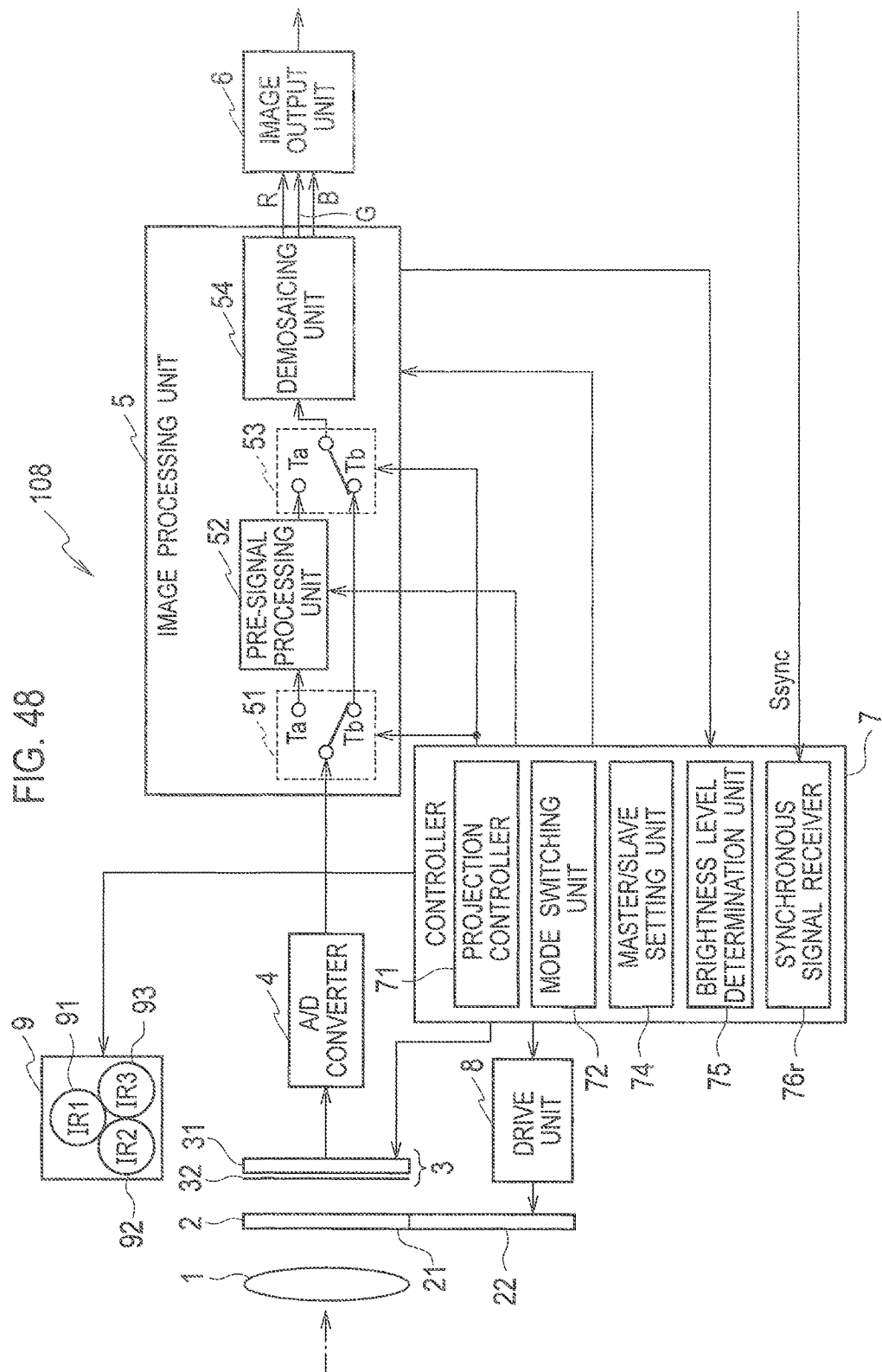
FIG. 48 is a block diagram showing an overall configuration of an imaging device used in an imaging system according to an eighth embodiment.

In the imaging device 108 according to the eighth embodiment shown in FIG. 48, the same elements as those in the imaging device 101 according to the first embodiment shown in FIG. 1 are designated by the same reference numerals, and the descriptions of the same elements are not repeated below.

The imaging device 108 according to the eighth embodiment has the same configuration as the imaging device 101 according to the first embodiment, excluding the synchronous signal transmitter 76t. The synchronous signal receiver 76r receives the synchronous signal Ssync supplied from an external synchronous signal supply device.

Figure 49:
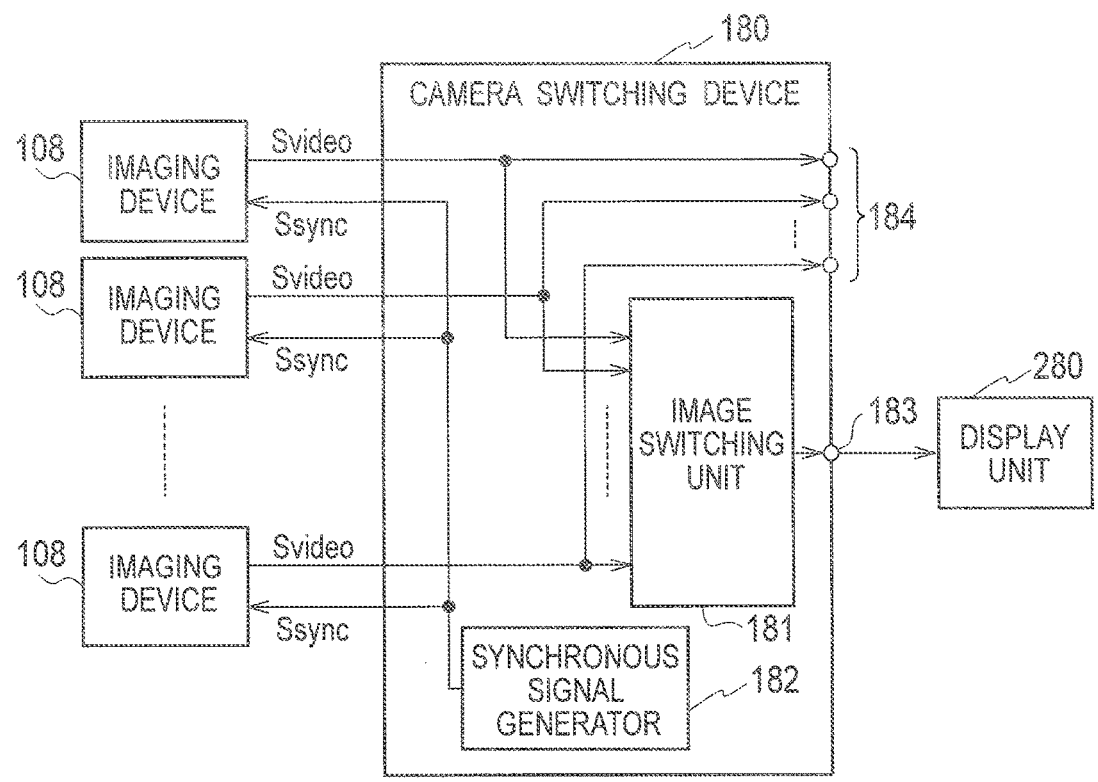
FIG. 49 is a block diagram showing a schematic configuration of the imaging system according to the eighth embodiment.

FIG. 49 shows an example of a configuration of an imaging system including a plurality of imaging devices 108 and a synchronous signal supply device that supplies the synchronous signal Ssync to each of the plural imaging devices 108. FIG. 49 shows a camera switching device 180 as an example of the synchronous signal supply device. The camera switching device 180 is connected with a display unit 280.

An imaging system including a plurality of imaging devices (for example, surveillance cameras) typically includes the camera switching device 180 called a switcher for selecting one or more of image signals output from the plural imaging devices to display on the display unit 280.

The camera switching device 180 is therefore favorably used as the synchronous signal supply device that supplies the synchronous signal Ssync to each of the plural imaging devices 108.

As shown in FIG. 49, the camera switching device 180 includes an image switching unit 181 and a synchronous signal generator 182 that generates the synchronous signal Ssync. Image signals Svideo output from the imaging devices 108 are input into the image switching unit 181.

For example, the respective imaging devices 108 output the image signal Svideo in a frame period and phase synchronized with the synchronous signal Ssync. This facilitates smooth image switching and simultaneous display of several images when the imaging devices 108 according to this embodiment that capture images by sequentially projecting infrared light coexist with other imaging devices that implement normal imaging without the use of infrared light.

The image switching unit 181 selects one or more image signals Svideo to output to an image output terminal 183. The image output terminal 183 is connected to the display unit 280 on which the image signals Svideo selected by the image switching unit 181 are displayed.

The image switching unit 181 may divide the screen of the display unit 280 into four sections to display the image signal Svideo in each section, and minimize the frames of the four image signals Svideo so as to synthesize the minimized frames into one frame. The number of the divided sections of the screen of the display unit 280 is optional.

The camera switching unit 181 includes individual image output terminals 184 that individually output the image signals Svideo output from the respective imaging units 108. The individual image output terminals 184 may be omitted.

Figure 50:
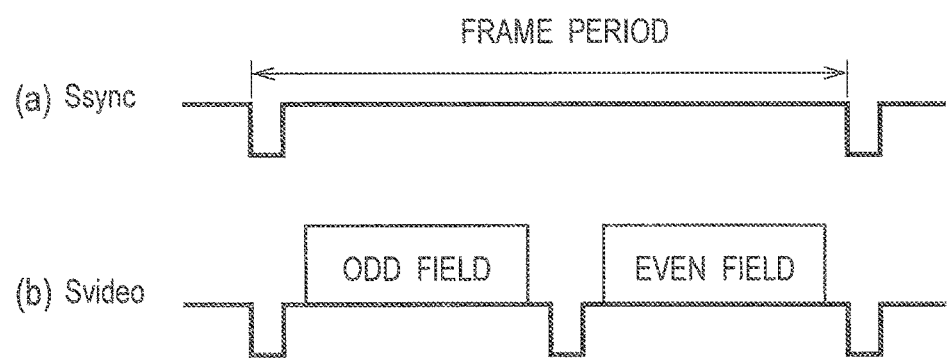
FIG. 50 is a view showing a relationship between a synchronous signal and an image signal in the imaging system according to the eighth embodiment.

The synchronous signal Ssync generated by the synchronous signal generator 182 has a frame period, as shown in item (a) of FIG. 50. While the synchronous signal Ssync shown in item (a) of FIG. 33 is a positive pulse, the synchronous signal Ssync shown in item (a) of FIG. 50 is a negative pulse. The synchronous signal Ssync generated by the synchronous signal generator 182 may, of course, be a positive pulse.

Item (b) of FIG. 50 shows a case in which the image signal Svideo output from the imaging device 108 is in an interlaced format, in which one frame includes two fields of an odd field and an even field.

An example of a relationship between the timing of projecting infrared light from the respective imaging devices 108 and the timing of generating the image signals Svideo is described below, with reference to FIG. 51. The projection controller 71 controls the imaging device 108 to selectively project infrared light at the timing based on the synchronous signals Ssync.

Figure 51:
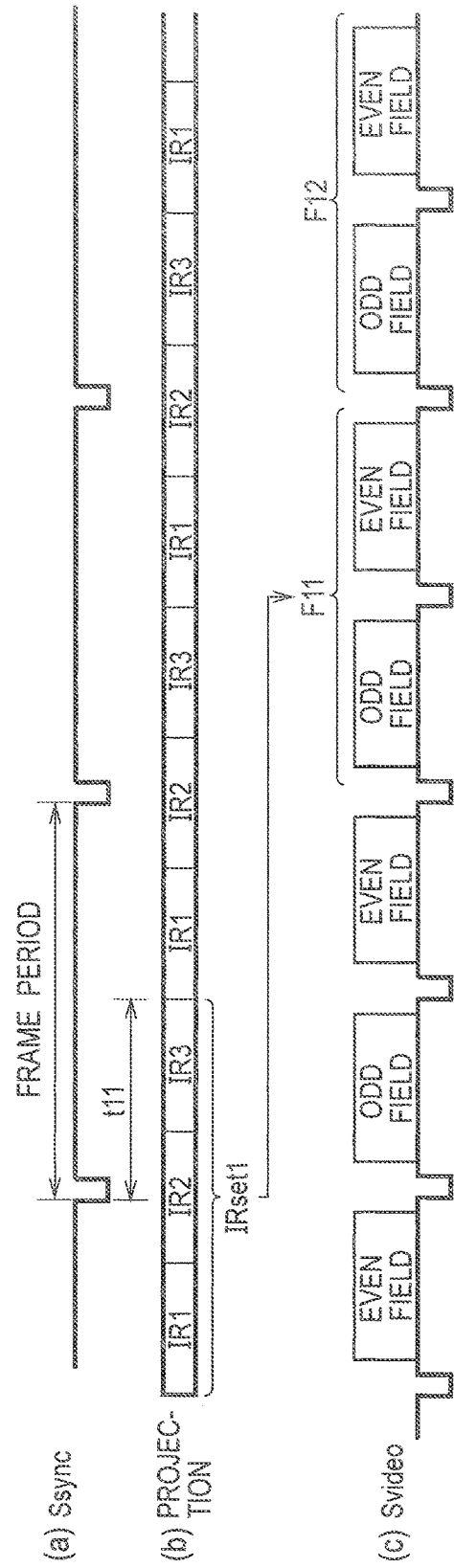
FIG. 51 is a view showing a relationship between a synchronous signal, a projection of infrared light, and an image signal in the imaging system according to the eighth embodiment.

As shown in items (b) and (c) of FIG. 51, a time equivalent to 1.5 frames is required from the point when the infrared projector 9 sequentially projects infrared light with wavelengths IR1, IR2, and IR3, and the imaging unit 3 images an object to the point when the imaging device 108 outputs the image signal Svideo. The frame of the image signal Svideo, obtained on the basis of a set of wavelengths IR1 to IR3 (IRset1) shown in item (b) of FIG. 51, is frame F11 shown in item (c) of FIG. 51.

As shown in items (a) and (b) of FIG. 51, the respective projection controllers 71 preferably control the respective imaging devices 108 to start projecting the infrared light with the wavelength IR1 after a lapse of time t11 equivalent to 0.5 frames once the respective imaging devices 108 receive the synchronous signal Ssync.

If the time t11 is longer than 0.5 frames, the frame F11 of the image signal Svideo cannot be obtained on the basis of the set IRset1 of the wavelengths IR1 to IR3. Instead, the frame obtained should be the following frame F12, which inevitably increases a capacity of a buffer memory for delay.

When the time t11 is shorter than 0.5 frames, the frame F11 of the image signal Svideo can be obtained on the basis of the set IRset1 of the wavelengths IR1 to IR3. However, a decrease of the time t11 increases the delayed amount which increases the capacity of the buffer memory.

The time t11 is therefore preferably set to correspond to a time required to generate a frame of image signal Svideo based on each set of wavelengths IR1 to IR3.

FIG. 51 illustrates a case in which the time t11 is determined in relation to the synchronous signal Ssync and the timing of projecting the infrared light with the wavelength IR1. Alternatively, the time t11 may be determined in relation to the synchronous signal Ssync and the timing of projecting the infrared light with the wavelength IR2 or IR3.

The frame of the image signal Svideo based on the set IRset1 of the wavelengths IR1 to IR3 may be intentionally determined as the frame F12 instead of the frame F11, for predetermined reasons.

The plural imaging devices 108 shown in FIG. 49 may include both the imaging devices 108 that generate the frame F11 on the basis of the set IRset1 of the wavelengths IR1 to IR3 and the imaging devices 108 that generate the frame 12.

The imaging system shown in FIG. 49 supplies the common synchronous signal Ssync to the respective imaging devices 108. Therefore, the plural imaging devices 108 can theoretically synchronize the timings of projecting the infrared light with the wavelengths IR1, IR2, and IR3 from the respective infrared projectors 9 to coincide with each other, as in the case of the imaging devices 101 to 103 according to the first to third embodiments.

When the time lag of the timings of projecting the infrared light with the wavelengths IR1, IR2, and IR3 is caused, the controller 7 may advance or delay the timing of operating the infrared projector 9 and the pre-signal processing unit 52 as described above with reference to FIG. 35. A slight time lag is not necessarily adjusted, because it has less influence on the image qualities.

<Summary of Imaging Devices According to First to Third Embodiments>

The master imaging devices 101M to 103M according to the first to third embodiments are configured as described below.

The projection controller 71 controls the infrared projector 9 to adjust the length and order of the divided three periods of a predetermined period in which infrared light with wavelengths IR1, IR2, and IR3 is selectively projected.

The imaging unit 3 images an object in the state where the infrared light with the respective wavelengths IR1, IR2, and IR3 is selectively projected. The synchronous signal transmitters 76*t*, 9Bt, and 9Ct each transmit a synchronous signal to the outside devices (in particular the slave imaging devices 101S to 103S) other than the master imaging devices 101M to 103M. The synchronous signal is used to synchronize the timing of projecting the infrared light from the infrared projector 9 by the projection controller 71 on the slave side, with the timing of projecting the infrared light from the infrared projector 9 by the projection controller 71 on the master side.

When the master imaging devices 101M to 103M are set to the timing adjusting mode for adjusting the timing of projecting the infrared light from the infrared projector 9 by the projection controller 71 on the slave side, the projection controller 71 controls the infrared projector 9 as follows: the projection controller 71 controls the infrared projector 9 to project infrared light with only one of the wavelengths IR1, IR2, and IR3 in one period of the three divided periods to skip over the other two periods.

When the projection controller 71 and the infrared projector 9 of the master imaging device 101M, 102M, or 103M are respectively defined as a first projection controller and a first infrared projector, the projection controller 71 and the infrared projector 9 of the slave imaging device 101S, 102S, or 103S are respectively defined as a second projection controller and a second infrared projector.

The slave imaging devices 101S to 103S according to the first to third embodiments are configured as described below.

The projection controller 71 controls the infrared projector 9 to adjust the length and order of the divided three periods in which the infrared light with the respective wavelengths IR1, IR2, and IR3 is selectively projected.

The imaging unit 3 images an object in the state where the infrared light with the respective wavelengths IR1, IR2, and IR3 is selectively projected. The image processing unit 5 generates image signals for R, G, and B based on the imaging signals imaged by the imaging unit 3.

The synchronous signal receivers 76*r*, 9Br, and 9Cr each receive the synchronous signal transmitted from the other devices (the master imaging devices 101M to 103M) other than the slave imaging devices 101S to 103S. The synchronous signal is used to synchronize the timing of projecting the infrared light from the infrared projector 9 by the projection controller 71 on the slave side, with the timing of projecting the infrared light from the infrared projector 9 by the projection controller 71 on the master side.

The slave imaging devices 101S to 103S each preferably include the brightness level determination unit 75 that evaluates the brightness levels of the image signals for R, G, and B generated by the image processing unit 5. When the slave imaging devices 101S to 103S are set to the timing adjusting mode for adjusting the timing of projecting the infrared light from the infrared projector 9 by the projection controller 71, the projection controller 71 preferably operates as follows:

The projection controller 71 controls the infrared projector 9 not to project infrared light. While the infrared projector 9 on the master side projects the infrared light with only one of the wavelengths IR1, IR2, and IR3 in one period of the three divided periods, the imaging unit 3 images an object in the state where no infrared light is projected during the other two divided periods.

Alternatively, while the infrared projector 9 on the master side projects the infrared light with all wavelengths, the imaging unit 3 images an object with the infrared cut filter 21 inserted so as to lead to substantially the same condition that the infrared light with only one wavelength is projected. The infrared cut filter 21 that is used is included in the respective slave imaging devices 101S to 103S.

The projection controller 71 adjusts the timing of projecting the infrared light according to the brightness levels of the image signals for R, G, and B evaluated by the brightness level determination unit 75.

When the projection controller 71 and the infrared projector 9 of the slave imaging device 101S, 102S, or 103S are respectively defined as a first projection controller and a first infrared projector, the projection controller 71 and the infrared projector 9 of the master imaging device 101M, 102M, or 103M are respectively defined as a second projection controller and a second infrared projector.

<Summary of Slave Imaging Devices According to First to Seventh Embodiments>

The slave imaging devices 101S to 106S according to the first to sixth embodiments and the slave imaging device according to the seventh embodiment each include the projection controller 71 (first projection controller), the imaging unit 3, the image processing unit 5, and the brightness level determination unit 75. The slave imaging devices set to the timing adjusting mode each operate as follows: the projection controller 71 controls the infrared projector 9 (first infrared projector) not to project the infrared light with the wavelengths IR1, IR2, and IR3.

The imaging unit 3 images an object in the state where the projection controller 71 of the other imaging device controls the infrared projector 9 to project infrared light with only one of the wavelengths IR1, IR2, and IR3 in one period of the three divided periods to skip over the other two periods.

The other imaging device is each of the master imaging devices 101M to 106M according to the first to sixth embodiments, and the master imaging device according to the seventh embodiment. The projection controller 71 of the master imaging device is a second projection controller, and the infrared projector 9 of the master imaging device is a second infrared projector.

Alternatively, the imaging unit 3 images an object with the infrared cut filter inserted, while the second infrared projector projects the infrared light with the wavelengths IR1 to IR3.

The projection controller 71 adjusts the timing of projecting the infrared light according to the brightness levels of the image signals for R, G, and B, evaluated by the brightness level determination unit 75.

The first projection controller preferably adjusts the timing of projecting the infrared light such that the brightness level determination unit 75 evaluates as follows: the brightness levels of the image signals of two colors other than a color corresponding to R projected from the second infrared projector are equivalent to each other and defined as a first level; and the brightness level of an image signal of the color corresponding to R projected from the second infrared projector is defined as a second level greater than the first level.

<Summary of Method for Controlling Imaging Devices According to First to Seventh Embodiments>

The method for controlling the plural imaging devices used in the imaging system is as follows: the plural imaging devices each synchronize the timings of projecting the infrared light with the wavelengths IR1 to IR3 from the respective infrared projectors 9 selectively in the three divided periods, obtained such that a predetermined period is divided into three. The respective imaging devices image an object in the state where the infrared light with the wavelengths IR1 to IR3 is selectively projected.

<Summary of Method for Controlling Imaging Devices According to Fourth to Sixth Embodiments>

The method for controlling the plural imaging devices used in the imaging system is as follows: the plural imaging devices are operated according to the common reference clock. One of the imaging devices serves as a master device, and the other serves as a slave device.

The first projection controller of the master imaging device controls the first infrared projector to project the infrared light with only one of the wavelengths IR1 to IR3 in one period of the three divided periods to skip over the other two periods. Alternatively, the first projection controller controls the first infrared projector to project the infrared light with the respective wavelengths IR1 to IR3 in the respective three divided periods.

The second projection controller of the slave imaging device controls the second infrared projector not to project the infrared light with the wavelengths IR1 to IR3.

The imaging unit 3 of the slave imaging device images an object in the state where the infrared light with only one wavelength is projected, or in the state where the infrared light with the wavelengths IR1 to IR3 are projected with the infrared cut filter inserted. The brightness level determination unit 75 of the slave imaging device evaluates the brightness levels of the image signals for R, G, and B, generated on the basis of the imaging signals imaged by the imaging unit 3.

The second projection controller adjusts the timing of projecting the infrared light with the wavelengths IR1 to IR3 from the second infrared projector according to the brightness levels of the image signals for R, G, and B, evaluated by the brightness level determination unit 75.

<Summary of Imaging System According to Eighth Embodiment>

The imaging system includes the plural imaging devices 108 and the synchronous signal supply device that supplies the synchronous signal Ssync to each of the plural imaging devices 108.

The camera switching device 180 for switching the image signals Svideo output from the respective imaging devices 108 favorably includes the synchronous signal generator 182, so that the camera switching device 180 serves as a synchronous signal supply device.

The imaging devices 108 each include the synchronous signal receiver 76r for receiving the synchronous signal Ssync, the projection controller 71, and the imaging unit 3. The projection controller 71 controls the infrared projector 9, capable of projecting the infrared light with the respective wavelengths, to selectively project the infrared light at the timing based on the synchronous signal Ssync, received by the synchronous signal receiver 76r. The imaging unit 3 images an object in the state where the infrared projector 9 projects the infrared light.

The present invention is not limited to the embodiments described above, and various modifications and improvements can be made without departing from the scope of the present invention. For example, in the respective imaging devices shown in FIGS. 1, 38, 40, 41, 46, 47, and 48, the infrared projector 9 may be removable from the casing of the imaging device. Alternatively, the infrared projector 9 may be provided as an external component of the imaging device. The imaging device is only required to control the infrared projector 9 once the infrared projector 9 is attached thereto.

When the timings of projecting infrared light are synchronized between the plural imaging devices, the timing of emitting the infrared light and the timing of turning out the infrared light do not necessarily completely coincide with each other. During an exposure interval corresponding to predetermined infrared light in the master imaging device, the slave imaging device is only required to be prevented from projecting infrared light other than the predetermined infrared light.

The slave imaging device may be allowed to project, for a period of time, infrared light other than the predetermined infrared light during the exposure interval corresponding to the predetermined infrared light in the master imaging device, as long as the projection during the period has less influence on imaging.

For example, the slave imaging device is only required to be prevented from projecting infrared light other than the predetermined infrared light for more than half of the exposure interval corresponding to the predetermined infrared light in the master imaging device.

The present invention is not limited to the embodiments described above, and may be applied to other imaging techniques using infrared light. The controller 7 and the image processing unit 5 may be implemented with one or more hardware processors.

The respective embodiments described above may have different definitions of the master device and the slave device.

According to the imaging devices of the respective embodiments and the method for controlling the imaging devices, preferable images can be captured even when the first imaging device for imaging an object by projecting infrared light coexists with another imaging device for imaging an object by projecting infrared light. According to the imaging system of the embodiment and the method for controlling the imaging system, preferable images can be captured even when a plurality of imaging devices for imaging objects by projecting infrared light coexist.

What is claimed is:

1. An imaging device comprising:
    a first projection controller configured to control a first infrared projector, capable of projecting infrared light with multiple wavelengths, to project selectively the infrared light with the multiple wavelengths;
    an imaging unit configured to image an object in a state where the first infrared projector projects the infrared light; and
    a synchronous signal transmitter configured to transmit outward a synchronous signal for synchronizing a timing of projecting infrared light from a second infrared projector controlled by a second projection controller included in another imaging device other than the imaging device, with a timing of projecting the infrared light from the first infrared projector controlled by the first projection controller.

2. The imaging device according to claim 1, wherein:
the first projection controller controls the first infrared projector to adjust a length and order of three divided periods obtained such that a predetermined period is divided into three, so as to selectively project, in the respective three divided periods, the infrared light including a first infrared light having a first wavelength and assigned red, a second infrared light having a second wavelength and assigned green, and a third infrared light having a third wavelength and assigned blue;
the imaging unit images the object in a state where the first to third infrared lights are selectively projected; and
the synchronous signal transmitter transmits, to the other imaging device, the synchronous signal for synchronizing the timing of projecting the infrared light including first to third infrared lights from the second infrared projector controlled by the second projection controller, with the timing of projecting the first to third infrared lights from the first infrared projector controlled by the first projection controller.

3. The imaging device according to claim 2, wherein, when the imaging device is set to a timing adjusting mode for adjusting the timing of projecting the first to third infrared lights from the second infrared projector controlled by the second projection controller, the first projection controller controls the first infrared projector to project only one of the first to third infrared lights in one of the three divided periods and skip over the other two periods.

4. The imaging device according to claim 1, wherein the synchronous signal is a signal based on the timing of projecting the infrared light from the first infrared projector.

5. An imaging device comprising:
a first projection controller configured to control a first infrared projector, capable of projecting infrared light with multiple wavelengths, to project selectively the infrared light with the multiple wavelengths;
an imaging unit configured to image an object in a state where the first infrared projector projects the infrared light; and
a synchronous signal receiver configured to receive a synchronous signal for synchronizing a timing of projecting the infrared light from the first infrared projector controlled by the first projection controller, with a timing of projecting infrared light from a second infrared projector controlled by a second projection controller included in another imaging device other than the imaging device, wherein
the first projection controller controls the first infrared projector in accordance with the synchronous signal received by the synchronous signal receiver.

6. The imaging device according to claim 5, wherein:
the first projection controller controls the first infrared projector to adjust a length and order of three divided periods obtained such that a predetermined period is divided into three, so as to selectively project, in the respective three divided periods, the infrared light including a first infrared light having a first wavelength and assigned red, a second infrared light having a second wavelength and assigned green, and a third infrared light having a third wavelength and assigned blue;
the imaging unit images the object in a state where the first to third infrared lights are selectively projected;
the synchronous signal receiver receives a synchronous signal transmitted from the other imaging device to synchronize the timing of projecting the first to third infrared lights from the first infrared projector controlled by the first projection controller, with the timing of projecting the infrared light including first to third infrared lights from the second infrared projector controlled by the second projection controller; and
the first projection controller controls the first infrared projector to synchronize the first to third infrared lights with the synchronous signal received by the synchronous signal receiver, so as to project the first to third infrared lights.

7. The imaging device according to claim 6, further comprising a brightness level determination unit configured to evaluate brightness levels of image signals for red, green, and blue generated by an image processing unit,
wherein, when the imaging device is set to a timing adjusting mode for adjusting the timing of projecting the first to third infrared lights from the first infrared projector controlled by the first projection controller, the first projection controller controls the first infrared projector not to project the first to third infrared lights,
the imaging unit images the object in a state where the second infrared projector projects only one of the first to third infrared lights in one of the three divided periods and skip over the other two periods, or in a state where the second infrared projector projects the first to third infrared lights with an infrared cut filter inserted, so as to lead to a substantially identical condition that only one of the first to third infrared lights is projected, and
the first projection controller adjusts the timing of projecting the first to third infrared lights according to the brightness levels of the image signals for red, green, and blue evaluated by the brightness level determination unit.

8. The imaging device according to claim 5, wherein the synchronous signal is a signal based on the timing of projecting the infrared light from the second infrared projector.

9. The imaging signal according to claim 7, wherein the first projection controller adjusts the timing of projecting the first to third infrared lights to a timing at which the brightness level determination unit determines that the brightness levels of the image signals assigned two colors other than red projected from the second infrared projector are equivalent to each other and defined as a first level, and that the brightness level of the image signal assigned red projected from the second infrared projector is defined as a second level greater than the first level.

10. A method for controlling a plurality of imaging devices included in an imaging system, the method comprising the steps of:
synchronizing timings of selectively projecting infrared light from each infrared projector of the respective imaging devices; and
imaging an object in a state where the imaging devices each selectively project the infrared light.

11. The method for controlling the imaging devices according to claim 10, wherein:
the synchronizing includes synchronizing the timings of selectively projecting, from each infrared projector of the respective imaging devices, a first infrared light having a first wavelength and assigned red, a second infrared light having a second wavelength and assigned green, and a third infrared light having a third wavelength and assigned blue, in three divided periods obtained such that a predetermined period is divided into three; and the imaging includes imaging the object in a state where the imaging devices each selectively project the first to third infrared lights.

12. The method for controlling the imaging devices according to claim 11, wherein:

the imaging devices are operated according to a common reference clock;

one of the imaging devices serves as a master device, and each device other than the master device serves as a slave device;

a first projection controller included in the master imaging device controls a first infrared projector to project one of the first to third infrared lights in one of the three divided periods and skip over the other two periods, or project each of the first to third infrared lights in each of the three divided periods;

a second projection controller included in the slave imaging device controls a second infrared projector not to project the first to third infrared lights;

an imaging unit included in the slave imaging device images an object in a state where one of the infrared lights is projected, or in a state where the first to third infrared lights are projected with an infrared cut filter inserted;

a brightness level determination unit included in the slave imaging device evaluates brightness levels of image signals for red, green, and blue generated according to imaging signals obtained by the imaging unit; and the second projection controller adjusts the timing of projecting the first to third infrared lights from the second infrared projector according to the brightness levels of the image signals for red, green, and blue evaluated by the brightness level determination unit.

* * * * *